United States Patent
Arroyo et al.

(10) Patent No.: US 12,315,283 B2
(45) Date of Patent: May 27, 2025

(54) METHODS, SYSTEMS, ARTICLES OF MANUFACTURE, AND APPARATUS FOR DECODING IMAGES

(71) Applicant: Nielsen Consumer LLC, Chicago, IL (US)

(72) Inventors: Roberto Arroyo, Madrid (ES); Jose Javier Yebes Torres, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 404 days.

(21) Appl. No.: 17/872,801

(22) Filed: Jul. 25, 2022

(65) Prior Publication Data

US 2023/0230408 A1 Jul. 20, 2023

Related U.S. Application Data

(60) Provisional application No. 63/299,804, filed on Jan. 14, 2022.

(51) Int. Cl.
*G06V 30/42* (2022.01)
*G06Q 30/0201* (2023.01)
(Continued)

(52) U.S. Cl.
CPC ......... *G06V 30/42* (2022.01); *G06Q 30/0201* (2013.01); *G06V 10/82* (2022.01);
(Continued)

(58) Field of Classification Search
None
See application file for complete search history.

(56) References Cited

U.S. PATENT DOCUMENTS

| 3,323,135 A | 6/1967 | Miller |
| 5,410,611 A | 4/1995 | Huttenlocher et al. |

(Continued)

FOREIGN PATENT DOCUMENTS

| CA | 2957433 C | 6/2020 |
| CN | 103123685 A | 5/2013 |

(Continued)

OTHER PUBLICATIONS

Leicester et al., "Using Scanner Technology to Collect Expenditure Data," Fiscal Studies, vol. 30, Issue 3-4, 2009, 29 pages.
(Continued)

*Primary Examiner* — Dov Popovici
(74) *Attorney, Agent, or Firm* — Hanley, Flight & Zimmerman, LLC

(57) ABSTRACT

An example apparatus to decode an image comprises interface circuitry to receive an image of a purchase document, and processor circuitry to execute the machine readable instructions to extract text from the image of the purchase document, the image of the purchase document to memorialize a transaction that includes at least one product; determine a type of the purchase document to which the image corresponds; apply one of a first pipeline or a second pipeline to the image of the purchase document based on the type of the purchase document; obtain purchase facts corresponding to a respective one of the at least one product memorialized in the image of the purchase document; and map the obtained purchase facts against a products database to identify the at least one product memorialized in the image of the purchase document.

20 Claims, 27 Drawing Sheets

(51) Int. Cl.
  *G06V 10/82* (2022.01)
  *G06V 30/10* (2022.01)
  *G06V 30/413* (2022.01)
  *G06V 30/414* (2022.01)
  *G06V 30/416* (2022.01)

(52) U.S. Cl.
  CPC ............ *G06V 30/10* (2022.01); *G06V 30/413* (2022.01); *G06V 30/414* (2022.01); *G06V 30/416* (2022.01)

(56) References Cited

U.S. PATENT DOCUMENTS

| | | |
|---|---|---|
| 5,606,690 A | 2/1997 | Hunter et al. |
| 7,454,063 B1 | 11/2008 | Kneisl et al. |
| 7,792,709 B1 | 9/2010 | Trandal et al. |
| 8,285,047 B2 | 10/2012 | Nagarajan et al. |
| 8,494,281 B2 | 7/2013 | Nagarajan |
| 8,787,695 B2 | 7/2014 | Wu |
| 8,792,141 B2 | 7/2014 | Moore et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu |
| 9,262,686 B1 | 2/2016 | Singer |
| 9,290,022 B2 | 3/2016 | Makabe |
| 9,298,685 B2 | 3/2016 | Barrus |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,389 B1 | 7/2016 | Sankaranarayanan |
| 9,384,839 B2 | 7/2016 | Avila et al. |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun et al. |
| 9,824,270 B1 | 11/2017 | Mao |
| 9,875,385 B1 | 1/2018 | Humphreys |
| 10,026,061 B2 | 7/2018 | Cheek |
| 10,032,072 B1 | 7/2018 | Tran et al. |
| 10,157,425 B2 | 12/2018 | Chelst et al. |
| 10,235,585 B2 | 3/2019 | Deng |
| 10,242,285 B2 | 3/2019 | Thrasher et al. |
| 10,395,772 B1 | 8/2019 | Lucas et al. |
| 10,679,283 B1 | 6/2020 | Pesce |
| 11,256,760 B1 | 2/2022 | Corcoran |
| 11,257,049 B1 | 2/2022 | Durazo Almeida |
| 11,321,956 B1 | 5/2022 | Geng |
| 11,410,446 B2 | 8/2022 | Shanmuganathan et al. |
| 11,414,053 B2 | 8/2022 | Tanaami et al. |
| 11,468,491 B2 | 10/2022 | Dalal |
| 11,476,981 B2 | 10/2022 | Wei et al. |
| 11,562,557 B2 | 1/2023 | Miginnis et al. |
| 11,587,148 B2 | 2/2023 | Elder |
| 11,593,552 B2 | 2/2023 | Sarkar |
| 11,609,956 B2 | 3/2023 | Jain |
| 11,625,930 B2 | 4/2023 | Rodriguez et al. |
| 11,809,985 B2 | 11/2023 | Polania Cabrera |
| 11,810,383 B2 | 11/2023 | Patel et al. |
| 11,842,035 B2 | 12/2023 | Jahjah et al. |
| 2002/0037097 A1 | 3/2002 | Hoyos et al. |
| 2003/0185448 A1 | 10/2003 | Seeger et al. |
| 2006/0232619 A1 | 10/2006 | Otsuka et al. |
| 2007/0041642 A1 | 2/2007 | Romanoff et al. |
| 2008/0205759 A1 | 8/2008 | Zandifar et al. |
| 2009/0164422 A1 | 6/2009 | Pacella |
| 2010/0306080 A1 | 12/2010 | Trandal et al. |
| 2011/0122443 A1 | 5/2011 | Otsuka et al. |
| 2011/0243445 A1 | 10/2011 | Uzelac et al. |
| 2011/0289395 A1 | 11/2011 | Breuel et al. |
| 2011/0311145 A1 | 12/2011 | Bern et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa et al. |
| 2014/0064618 A1 | 3/2014 | Janssen, Jr. |
| 2014/0188647 A1 | 7/2014 | Argue |
| 2014/0195891 A1 | 7/2014 | Venkata Radha Krishna Rao et al. |
| 2015/0039479 A1 | 2/2015 | Gotanda |
| 2015/0127428 A1 | 5/2015 | Gharachorloo |
| 2015/0169951 A1 | 6/2015 | Khintsitskiy et al. |
| 2015/0254778 A1 | 9/2015 | Kmak et al. |
| 2015/0317642 A1 | 11/2015 | Argue |
| 2015/0363792 A1 | 12/2015 | Arini |
| 2015/0363822 A1 | 12/2015 | Rowe |
| 2016/0005189 A1 | 1/2016 | Gray |
| 2016/0034863 A1 | 2/2016 | Ross |
| 2016/0063469 A1 | 3/2016 | Etzion |
| 2016/0125383 A1 | 5/2016 | Chan |
| 2016/0171585 A1 | 6/2016 | Singh |
| 2016/0203625 A1 | 7/2016 | Khan et al. |
| 2016/0210507 A1 | 7/2016 | Abdollahian |
| 2016/0234431 A1 | 8/2016 | Kraft et al. |
| 2016/0307059 A1 | 10/2016 | Chaudhury et al. |
| 2016/0342863 A1 | 11/2016 | Kwon et al. |
| 2017/0206536 A1* | 7/2017 | Brelig ................ G06Q 10/0875 |
| 2017/0293819 A1 | 10/2017 | Deng |
| 2017/0364450 A1 | 12/2017 | Struttmann |
| 2018/0005345 A1 | 1/2018 | Apodaca et al. |
| 2018/0053045 A1* | 2/2018 | Lorenzini ............ G06Q 20/209 |
| 2018/0060302 A1 | 3/2018 | Liang et al. |
| 2018/0317116 A1 | 11/2018 | Komissarov et al. |
| 2018/0336509 A1 | 11/2018 | Guttmann |
| 2019/0026803 A1 | 1/2019 | De Guzman |
| 2019/0050639 A1 | 2/2019 | Ast |
| 2019/0080207 A1 | 3/2019 | Chang |
| 2019/0171900 A1 | 6/2019 | Thrasher et al. |
| 2019/0244020 A1 | 8/2019 | Yoshino et al. |
| 2019/0272360 A1 | 9/2019 | Kursun |
| 2019/0325211 A1 | 10/2019 | Ordonez et al. |
| 2019/0332662 A1 | 10/2019 | Middendorf et al. |
| 2019/0354818 A1 | 11/2019 | Reisswig et al. |
| 2020/0097718 A1 | 3/2020 | Schäfer |
| 2020/0142856 A1 | 5/2020 | Neelamana |
| 2020/0151444 A1 | 5/2020 | Price et al. |
| 2020/0151902 A1 | 5/2020 | Almazán |
| 2020/0175267 A1 | 6/2020 | Schäfer et al. |
| 2020/0249803 A1 | 8/2020 | Sobel et al. |
| 2020/0279107 A1 | 9/2020 | Staar |
| 2020/0364451 A1 | 11/2020 | Ammar et al. |
| 2020/0401798 A1 | 12/2020 | Foncubierta Rodriguez et al. |
| 2020/0410231 A1 | 12/2020 | Chua et al. |
| 2021/0004880 A1 | 1/2021 | Benkreira et al. |
| 2021/0009163 A1 | 1/2021 | Urtasun |
| 2021/0019287 A1 | 1/2021 | Prasad et al. |
| 2021/0034856 A1 | 2/2021 | Torres et al. |
| 2021/0090694 A1 | 3/2021 | Colley et al. |
| 2021/0117665 A1 | 4/2021 | Simantov et al. |
| 2021/0117668 A1 | 4/2021 | Zhong et al. |
| 2021/0142092 A1 | 5/2021 | Zhao et al. |
| 2021/0149926 A1 | 5/2021 | Komninos et al. |
| 2021/0158038 A1 | 5/2021 | Shanmuganathan et al. |
| 2021/0216765 A1 | 7/2021 | Xu |
| 2021/0248420 A1 | 8/2021 | Zhong et al. |
| 2021/0295101 A1 | 9/2021 | Tang et al. |
| 2021/0319217 A1 | 10/2021 | Wang et al. |
| 2021/0334737 A1 | 10/2021 | Balaji |
| 2021/0343030 A1 | 11/2021 | Sagonas et al. |
| 2021/0357710 A1 | 11/2021 | Zhang et al. |
| 2021/0406533 A1 | 12/2021 | Arroyo et al. |
| 2022/0004756 A1 | 1/2022 | Jennings |
| 2022/0114821 A1 | 4/2022 | Arroyo et al. |
| 2022/0180113 A1 | 6/2022 | Patel |
| 2022/0189190 A1 | 6/2022 | Arroyo et al. |
| 2022/0198185 A1 | 6/2022 | Prebble |
| 2022/0350946 A1 | 11/2022 | Hjerrild |
| 2022/0383651 A1 | 12/2022 | Shanmuganathan et al. |
| 2022/0397809 A1 | 12/2022 | Talpade et al. |
| 2022/0414630 A1* | 12/2022 | Yebes Torres ......... G06V 30/42 |
| 2023/0004748 A1 | 1/2023 | Rodriguez et al. |

(56) References Cited

U.S. PATENT DOCUMENTS

| | | | |
|---|---|---|---|
| 2023/0005286 A1* | 1/2023 | Yebes Torres | G06Q 30/0283 |
| 2023/0008198 A1 | 1/2023 | Gadde et al. | |
| 2023/0057687 A1 | 2/2023 | Mantri | |
| 2023/0196806 A1 | 6/2023 | Ramalingam et al. | |
| 2023/0214899 A1* | 7/2023 | Martínez Cebrián | G06V 30/10 |
| | | | 705/26.62 |
| 2023/0230408 A1 | 7/2023 | Arroyo et al. | |
| 2023/0394859 A1 | 12/2023 | Montero et al. | |
| 2024/0013562 A1 | 1/2024 | Montero | |

FOREIGN PATENT DOCUMENTS

| | | |
|---|---|---|
| CN | 104866849 A | 8/2015 |
| CN | 108229397 A | 6/2018 |
| CN | 108829397 A | 11/2018 |
| CN | 109389124 A | 2/2019 |
| CN | 112446351 A | 3/2021 |
| CN | 112560862 A | 3/2021 |
| DE | 202013005144 U1 | 10/2013 |
| GB | 2595412 A | 11/2021 |
| JP | H0749529 A | 2/1995 |
| JP | 2008210850 A | 9/2008 |
| JP | 2008211850 A | 9/2008 |
| JP | 2019139737 A | 8/2019 |
| JP | 7049529 B2 | 4/2022 |
| KR | 101831204 B1 | 2/2018 |
| WO | 2013044145 A1 | 3/2013 |
| WO | 2018054326 A1 | 3/2018 |
| WO | 2018201423 A1 | 11/2018 |
| WO | 2020194004 A1 | 10/2020 |
| WO | 2022006295 A1 | 1/2022 |
| WO | 2022123199 A1 | 6/2022 |

OTHER PUBLICATIONS

United States and Patent and Trademark Office, "Non-Final Office Action," issued in connection with U.S. Appl. No. 17/566,135, dated Mar. 27, 2024, 13 pages.
European Patent Office, "Communication pursuant to Article 94(3) EPC," issued in connection with European Patent Application No. 19 921 870.2-1207, on Apr. 9, 2024, 7 pages.
United States Patent and Trademark Office, "Non-Final Office Action," issued in connection with U.S. Appl. No. 18/476,978, dated Apr. 18, 2024, 20 pages.
United States Patent and Trademark Office, "Notice of Allowance and Fee(s) Due," issued in connection with U.S. Appl. No. 17/710,538, dated Apr. 19, 2024, 8 pages.
United States Patent and Trademark Office, "Non-Final Office Action," issued in connection with U.S. Appl. No. 17/710,660, on May 28, 2024, 9 pages.
Canadian Intellectual Property Office, "Office Action," issued in connection with Canadian Patent Application No. 3,182,471, dated May 28, 2024, 5 pages.
United States Patent and Trademark Office, "Notice of Allowance and Fee(s) Due," issued in connection with U.S. Appl. No. 17/598,792, dated Jun. 17, 2024, 9 pages.
United States Patent and Trademark Office, "Notice of Allowance and Fee(s) Due," issued in connection with U.S. Appl. No. 18/191,642, dated Jun. 17, 2024, 9 pages.
Levenshtein, "Binary Codes Capable of Correcting Deletions, Insertions, and Reversals," Soviet Physics—Doklady, Cybernetics and Control Theory, vol. 10, No. 8, Feb. 1966, 4 pages.
Smith et al., "Identification of Common Molecular Subsequences," Reprinted Journal of Molecular Biology, Academic Press Inc., dated 1981, 3 pages.
Govindan et al., "Character Recognition—A Review," Pattern Recognition, vol. 23, No. 7, Jul. 1990, 13 pages.
Poulovassilis et al., "A Nested-Graph Model for the Representation and Manipulation of Complex Objects," ACM Transactions on Information Systems, 1994, 34 pages.

Hochreiter et al., "Long Short-Term Memory," Neural Computation 9, 1997, 46 pages.
Ng et al., "On Spectral Clustering: Analysis and an Algorithm," 14th International Conference on Neural Information Processing Systems: Natural and Synthetic, Jan. 2001, 8 pages.
Crandall et al., "Extraction of Special Effects Caption Text Events From Digital Video," IJDAR, Department of Computer Science and Engineering, The Pennsylvania State University, accepted Sep. 13, 2022, 20 pages.
Lowe, "Distinctive Image Features from Scale-Invariant Keypoints," International Journal of Computer Vision (HCV), published Jan. 5, 2004, 20 pages.
Marinai, "Introduction to Document Analysis and Recognition," Machine Learning in Document Analysis and Recognition, published 2008, 20 pages.
Vogel et al., "Parallel Implementations of Word Alignment Tool," Software Engineering, Testing, and Quality Assurance for Natural Language Processing, Jun. 2008, 10 pages.
O'Gorman et al., "Document Image Analysis," IEEE Computer Society Executive Briefings, dated 2009, 125 pages.
Oliveira et al., "A New Method for Text-Line Segmentation for Warped Documents," International Conference Image Analysis and Recognition, Jun. 21, 2010, 11 pages.
Krizhevsky et al., "ImageNet Classification with Deep Convolutional Neural Networks," In International Conference on Neural Information Processing Systems (NIPS), published 2012, 9 pages.
Chung et al. "Empirical Evaluation of Gated Recurrent Neural Networks on Sequence Modeling," ArXiv abs/1412.3555, dated 2014, 9 pages.
Nshuti, "Mobile Scanner and OCR (A First Step Towards Receipt to Spreadsheet)," Stanford University, published 2015, 3 pages.
Ronneberger et al., "U-Net: Convolutional Networks for Biomedical Image Segmentation," Medical Image Computing and Computer-Assisted Intervention (MICCAI), dated May 18, 2015, 8 pages.
Lecun et al., "Deep Learning," Nature, vol. 521, dated May 28, 2015, 9 pages.
Genereux et al., "NLP Challenges in Dealing with OCR-ed Documents of Derogated Quality," Workshop on Replicability and Reproducibility in Natural Language Processing, IJCAI 2015, Jul. 2015, 6 pages.
Ren et al., "Faster R-CNN: Towards Real-Time Object Detection with Region Proposal Networks," In International Conference on Neural Information Processing Systems (NIPS), Dec. 7, 2015,14 pages.
Kim et al., "Character-Aware Neural Language Models," Thirtieth AAAI Conference on Artificial Intelligence (AAAI'IO), 2016, 9 pages.
Redmon et al., "You Only Look Once: Unified, Real-Time Object Detection," In Conference on Computer Vision and Pattern Recognition (CVPR), dated May 9, 2016, 10 pages.
Osindero et al., "Recursive Recurrent Nets with Attention Modeling for OCR in the Wild," Conference on Computer Vision and Pattern Recollection (CVPR), Jun. 27, 2016, 10 pages.
Joulin et al., "Bag of Tricks for Efficient Text Classification," 15th Conference of the European Chapter of the Association for Computational Linguistics, dated Aug. 9, 2016, 5 pages.
Konda et al., "Magellan: Toward Building Entity Matching Management Systems Over Data Science Stacks," Proceedings of the VLDB Endowment, vol. 9, No. 13, dated 2016, 4 pages.
Kipf et al., "Semi-Supervised Classification with Graph Convolutional Networks," 5th International Conference on Learning Representations, Apr. 24, 2017, 14 Pages.
Bojanowski et al., "Enriching Word Vectors with Subword Information," In Journal Transactions of the Association for Computational Linguistics, 2017, vol. 5, dated Jun. 2017, 12 pages.
Ozhiganov et al., "Deep Dive Into OCR for Receipt Recognition," DZone, dated Jun. 21, 2017, 18 pages.
Bartz et at, "STN-OCT: A Single Neural Network for Text Detection and Text Recognition," Computer Vision and Pattern Recognition, dated Jul. 27, 2017, 9 pages.
Vaswani et al., "Attention is all you need," 31st Conference on Neural Information Processing Systems (NIPS 2017), last revised Dec. 6, 2017, 15 pages.

(56) References Cited

OTHER PUBLICATIONS

Hui, "mAP (mean Average Precision) for Object Detection," URL:[https://medium.com/@jonathan hui/map-mean-average-precision-for-object-detection-45c1 21a311731], Mar. 6, 2018, 2 pages.
Veličković et al. "Graph Attention Networks," International Conference on Learning Representations, Feb. 4, 2018, 12 pages.
Mudgal et al., "Deep Learning for Entity Matching: A Design Space Exploration," Proceedings of the 2018 International Conference on Management of Data, dated Jun. 10, 2018, 16 pages.
Wick et al., "Calamari—A High-Performance Tensorflow-Based Deep Learning Package for Optical Character Recognition," Digital Humanities Quarterly, Jul. 5, 2018, 12 pages.
Akbik et al., "Contextual String Embeddings for Sequence Labeling," Proceedings of the 27th International Conference on Computational Linguistics (COLING), dated Aug. 2018, 12 pages.
Follmann et al., "MVTec D2S: Densely Segmented Supermarket Dataset," European Conference on Computer Vision (ECCV), dated 2018, 17 pages.
Ray et al., "U-PC: Unsupervised Planogram Compliance," European Conference on Computer Vision (ECCV), 2018, 15 pages.
Li et al., "Extracting Figures and Captions from Scientific Publications," Short Paper, CIKM18, Oct. 22, 2018, 4 pages.
Elfwing et al. "Sigmoid-Weighted Linear Units for Neural Network Function Approximation in Reinforcement Learning," Neural Networks: Journal of the International Neural Network Society, vol. 107, Nov. 2, 2018, 18 pages.
Huang et al., "Mask R-CNN with Pyramid Attention Network for Scene Text Detection", arXiv:1811.09058v1, Nov. 22, 2018, 9 pages.
Wikipedia, "Precision & Recall," URL:[https://en.wikipedia.org/wiki/Precision_and_recall], last updated Dec. 17, 2018, 12 pages.
A2ia, "Historic Document Conversion," Artificial Intelligence & Image Analysis, Industry Paper, accessed on Jan. 30, 2019, 4 pages.
A2ia, "Intelligent Automation Eliminates Manual Data Entry From Complex Documents," Artificial Intelligence & Image Analysis, White Paper, accessed on Jan. 30, 2019, 3 pages.
Loshchilov et al., "Decoupled Weight Decay Regularization," 2019 International Conference on Learning Representations, May 6, 2019, 19 pages.
Nathancy, "How Do I Make Masks to Set All of Image Background, Except the Text, to White?", URL:[https://stackoverflow.com/questions/56465359/how-do-i-make-masks-to-set-all-of-image-background-except-the-text-to-white], Jun. 5, 2019, 5 pages.
Devlin et al., "BERT: Pre-training of Deep Bidirectional Transformers for Language Understanding," Conference of the North American Chapter of the Association for Computational Linguistics (NAACL-HLT), dated Jun. 24, 2019, 16 pages.
Qasim et al., "Rethinking Table Recognition using Graph Neural Networks," Inernational Conference on Document Analysis and Recognition (ICDAR), dated Jul. 3, 2019, 6 pages.
Feng et al., "Computer Vision Algorithms and Hardware Implementations: A Survey," Integration: The VLSI Journal, vol. 69, dated Jul. 27, 2019, 12 pages.
Hu et al.,"Hierarchical Graph Convolutional Networks for Semi-supervised Node Classification," ArXiv abs/1902.06667, Jun. 10, 2019, 8 Pages.
Oliveira et al., "dhSegment: A Generic Deep-Learning Approach for Document Segmentation," 16th International Conference on Frontiers in Handwriting Recognition (ICFHR), dated Aug. 14, 2019, 6 pages.
Zhong et al., "PubLayNet: largest dataset ever for document layout analysis," International Conference on Document Analysis and Recognition (ICDAR), arXiv: Aug. 16, 2019, 8 pages.
Guillaume et al., "FUNSD: A Dataset for Form Understanding in Noisy Scanned Documents," International Conference on Document Analysis and Recognition (ICDAR), arXiv: Oct. 29, 2019, 6 pages.

Yadati et al., "HyperGCN: Hypergraph Convolutional Networks for Semi-Supervised Classification," 33rd International Conference on Neural Information Processing Systems, arXiv: Jan. 26, 2019 18 pages.
International Searching Authority, "Written Opinion," issued in connection with International Patent Application No. PCT/IB2019/000299, mailed on Dec. 23, 2019, 4 pages.
International Searching Authority, "International Search Report," issued in connection with International Patent Application No. PCT/IB2019/000299, mailed on Dec. 23, 2019, 2 pages.
Github, "Tesseract OCR," Tesseract Repository on GitHub, URL:[https://github.com/tesseract-ocr/], dated 2020, 3 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Zacharias et al., "Image Processing Based Scene-Text Detection and Recognition with Tesseract," arXiv (CoRR), dated Apr. 17, 2020, 6 pages.
Liu et al., "RoBERTa: A Robustly Optimized BERT Pretraining Approach," ArXiv abs/1907.11692, Jul. 26, 2019, 13 pages.
Xu et al., "LayoutLM: Pre-Training of Text and Layout for Document Image Understanding," in International Conference on Knowledge Discovery & Data Mining (SIGKDD), arXiv: Jun. 16, 2020, 9 pages.
Dong et al., "HNHN: Hypergraph Networks with Hyperedge Neurons," ArXiv abs/2006.12278, dated Jun. 22, 2020, 11 pages.
Yu et al., "PICK: Processing Key Information Extraction from Documents using Improved Graph Learning-Convolutional Networks," International Conference on Pattern Recognition (ICPR), ArXiv, dated Jul. 18, 2020, 8 pages.
Chen et al., "HGMF: Heterogeneous Graph-Based Fusion for Multimodal Data with Incompleteness," 26th ACM SIGKDD International Conference on Knowledge Discovery & Data Mining, dated Aug. 20, 2020, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.
Zhu et al., "Heterogeneous Mini-Graph Neural Network and Its Application to Fraud Invitation Detection," 2020 IEEE International Conference on Data Mining (ICDM), Nov. 17, 2020, 9 pages.
Bandyopadhyay et al., "Hypergraph Attention Isomorphism Network by Learning Line Graph Expansion," 2020 IEEE International Conference on Big Data, 2020, 10 pages.
Arroyo et al., "Multi-Label Classification of Promotions in Digital Leaflets Using Textual and Visual Information," Proceedings of the Workshop on Natural Language Processing in E-Commerce (EComNLP), Dec. 12, 2020, 10 pages.
Deepdive, "Distant Supervision," Stanford University, URL:[retrieved from: http://deepdive.stanford.edu/distantsupervision], retrieved on Apr. 1, 2022, 2 pages.
Nguyen et al., "End-to-End Hierarchical Relation Extraction for Generic Form Understanding," International Conference on Pattern Recognition (ICPR), ArXiv, Jun. 2, 2021, 8 pages.
International Searching Authority, "Written Opinion," issued in connection with International Patent Application No. PCT/US2020/061269, mailed on Mar. 11, 2021, 4 pages.
International Searching Authority, "International Search Report," mailed in connection with International Patent Application No. PCT/US2020/061269, mailed on Mar. 11, 2021, 3 pages.
United States Patent and Trademark Office, "Non-Final Office Action," issued in connection with U.S. Appl. No. 16/692,797, dated Mar. 16, 2021, 12 pages.
Google, "Detect Text in Images," URL:[http://cloud.google.com/vision/docs/ocr], Mar. 29, 2021, 16 pages.
Xu et al., "LayoutXLM: Multimodal Pre-training for Multilingual Visually-rich Document Understanding," arXiv, Sep. 92021, 10 pages.
Ma et al., "Graph Attention Networks with Positional Embeddings," arXiv, abs/2105.04037, ArXiv, Oct. 24, 2021, 13 pages.

(56) References Cited

OTHER PUBLICATIONS

Chen et al., "TextPolar: Irregular Scene Text Detection Using Polar Representation," International Journal on Document Analysis and Recognition (IJDAR), May 23, 2021, 9 pages.
Li et al., "SelfDoc: Self-Supervised Document Representation Learning," 2021 IEEE/CVF Conference on Computer Vision and Pattern Recognition (CVPR), arXiv, Jun. 7, 2021, 10 pages.
Hwang et al., "Spatial Dependency Parsing for Semi-Structured Document Information Extraction," International Joint Conference on Natural Language Processing (IJCNLP), arXiv, Jul. 1, 2021, 14 pages.
Li et al., "StructuralLM: Structural Pre-training for Form Understanding," 59th Annual Meeting of the Association for Computational Linguistics, arXiv, May 24, 2021, 10 pages.
Xu et al., "LayoutLMv2: Multi-modal Pre-training for Visually-rich Document Understanding," Association for Computational Linguistics 59th Annual Meeting, arXiv, Jan. 10, 2022, 13 pages.
Huang et al. "UniGNN: A Unified Framework for Graph and Hypergraph Neural Networks," 30th International Joint Conference on Artificial Intelligence (IJCAI), arXiv, May 3, 2021, 9 pages.
Tang et al., "MatchVIE: Exploiting Match Relevancy between Entities for Visual Information Extraction," Proceedings of the Thirtieth International Joint Conference on Artificial Intelligence (IJCAI), 2021, 7 pages.
Qian et al., "A Region-Based Hypergraph Network for Joint Entity-Relation Extraction," Knowledge-Based Systems. vol. 228, Sep. 2021, 8 pages.
Powalski et al.,"Going Full-TILT Boogie on Document Understanding with Text-Image-Layout Transformer," International Conference on Document Analysis and Recognition, arXiv, Mar. 2, 2021, 17 pages.
Davis et al., "Visual FUDGE: Form Understanding via Dynamic Graph Editing," International Conference on Document Analysis and Recognition (ICDAR), arXiv, Jul. 16, 2021, 16 pages.
Prabhu et al., "MTL-FoUn: A Multi-Task Learning Approach to Form Understanding," 2021 International Conference on Document Analysis and Recognition (ICDAR), Sep. 5-10, 2021, 5 pages.
Shen et al., "LayoutParser: A Unified Toolkit for Deep Learning Based Document Image Analysis," in International Conference on Document Analysis and Recognition (ICDAR), arXiv, Jun. 21, 2021, 16 pages.
Garncarek et al. "LAMBERT: Layout-Aware Language Modeling for Information Extraction," International Conference on Document Analysis and Recognition (ICDAR), arXiv, May 28, 2021, 16 pages.
Hong et al., "BROS: A Pre-trained Language Model Focusing on Text and Layout for Better Key Information Extraction from Documents," arXiv (CoRR), arXiv, Sep. 10, 2021, 13 pages.
Appalaraju et al., "DocFormer: End-to-End Transformer for Document Understanding," arXiv (CoRR), Sep. 20, 2021, 22 pages.
International Searching Authority, "International Preliminary Report on Patentability," issued in connection with International Patent Application No. PCT/IB2019/000299, issued on Sep. 28, 2021, 5 pages.
Li et al.,"StrucTexT: Structured Text Understanding with Multi-Modal Transformers," ACM International Conference on Multimedia (ACM Multimedia), arXiv, Nov. 8, 2021, 9 pages.
United States Patent and Trademark Office, "Final Office Action," issued in connection with U.S. Appl. No. 16/692,797, dated Oct. 27, 2021, 14 pages.
International Searching Authority, "Written Opinion," issued in connection with International Patent Application No. PCT/US2021/039931, mailed on Nov. 4, 2021, 4 pages.
International Searching Authority, "International Search Report," issued in connection with International Patent Application No. PCT/US2021/039931, mailed on Nov. 4, 2021, 3 pages.
Hwang et al., "Cost-Effective End-to-end Information Extraction for Semi-structured Document Images," Empirical Methods in Natural Language Processing (EMNLP), arXiv, Aug. 30, 2021, 9 pages.
Zhang et al., "Entity Relation Extraction as Dependency Parsing in Visually Rich Documents," Empirical Methods in Natural Language Processing (EMNLP), Nov. 7, 2021, 10 pages.
Datasetlist, "Annotation Tools for Building Datasets," Labeling Tools—List of Labeling Tools, URL:[https://www.datasetlist.com/tools/], updated Dec. 2021, downloaded on Apr. 1, 2022, 12 pages.
Gu et al., "UniDoc: Unified Pretraining Framework for Document Understanding," 35th Conference on Neural Information Processing Systems (NeurIPS), arXiv, Apr. 28, 2022, 12 pages.
Park et al. "CORD: A Consolidated Receipt Dataset for Post-OCR Parsing," Workshop on Document Intelligence, NeurIPS 2019, 4 pages.
Wang et al. "LiLT: A Simple yet Effective Language-Independent Layout Transformer for Structured Document Understanding," Annual Meeting of the Association for Computational Linguistics (ACL), arXiv, Feb. 28, 2022, 11 pages.
United States Patent and Trademark Office, "Advisory Action," issued inconnection with U.S. Appl. No. 16/692,797, dated Feb. 16, 2022, 4 pages.
Nielsen IQ, Nielsen Brandbank, "Power the Path to Purchase With Brand Approved Content," Product Library, Brandbank, URL:[retrieved from: https://www.brandbank.com/us/product-librarv/], retrieved on Apr. 1, 2022. 5 pages.
Github, "FIAT tool—Fast Image Data Annotation Tool," URL:[https://githnb.com/christopher5106/FastAimotationTool], downloaded on Apr. 1, 2022, 30 pages.
United States Patent and Trademark Office, "Notice of Allowance and Fee(s) Due," issued in connection with U.S. Appl. No. 16/692,797, dated Apr. 5, 2022, 10 pages.
Github, "Doccano tool," URL:[https://github.com/doccano/doccano], downloaded on Apr. 11, 2022, 12 pages.
United States Patent and Trademark Office, "Corrected Notice of Allowability," issued in connection with U.S. Appl. No. 16/692,797, dated Apr. 22, 2022, 3 pages.
International Searching Authority, "International Preliminary Report on Patentability," issued in connection with International Patent Application No. PCT/US2020/061269, issued on May 17, 2022, 5 pages.
Gu et al., "XYLayoutLM: Towards Layout-Aware Multimodal Networks for Visually-Rich Document Understanding," Conference on Computer Vision and Pattern Recognition ( CVPR), Jun. 18, 2022, 10 pages.
Villota et al., "Text Classification Models for Form Entity Linking", arXiv, Dec. 14, 2021, 10 pages.
Datasetlist, "A Tool Using OpenCV to Annotate Images for Image Classification, Optical Character Reading, . . . ," Datasetlist.com, dated Jul. 13, 2022, 30 pages.
United States Patent and Trademark Office, "Non-Final Office Action," issued in connection with U.S. Appl. No. 17/345,940, dated Aug. 18, 2022, 8 pages.
United States Patent and Trademark Office, "Non-Final Office Action," issued in connection with U.S. Appl. No. 17/075,675, dated Sep. 22, 2022, 12 pages.
Huang et al., "LayoutLMv3: Pre-training for Document AI with Unified Text and Image Masking," 30th ACM International Conference on Multimedia, arXiv, Jul. 19, 2022, 10 pages.
Zhang et al.,"Multimodal Pre-training Based on Graph Attention Network for Document Understanding," IEEE Transactions on Multimedia, vol. 25, arXiv, Oct. 23, 2022, 13 pages.
European Patent Office, "Extended European Search Report," issued in connection with European Patent Application No. 19921870.2, dated Oct. 12, 2022, 11 pages.
International Searching Authority, "International Search Report," issued in connection with International Patent Application No. PCT/US2022/034570, mailed on Oct. 20, 2022, 3 pages.
International Searching Authority, "Written Opinion," issued in connection with International Patent Application No. PCT/US2022/034570, mailed on Oct. 20, 2022, 5 pages.
Kim et al., "OCR-free Document Understanding Transformer," arXiv, dated 2021, 29 pages.

(56) References Cited

OTHER PUBLICATIONS

Mexican Institute of Industrial Property, "Office Action," issued in connection with Mexican Patent Application No. MX/a/2022/008170, dated Oct. 27, 2022, 35 pages. [Partial English Translation].
United States Patent and Trademark Office, "Notice of Allowance and Fee(s) Due," issued in connection with U.S. Appl. No. 17/364,419, dated Nov. 4, 2022, 10 pages.
Canadian Intellectual Property Office, "Examiner's Report," issued in connection with Canadian Patent Application No. 3,124,868, dated Nov. 10, 2022, 4 pages.
United States Patent and Trademark Office, "Corrected Notice of Allowability," issued in connection with U.S. Appl. No. 17/364,419, dated Nov. 15, 2022, 2 pages.
Zhong et al., "Hierarchical Message-Passing Graph Neural Networks," Data Mining and Knowledge Discovery, published 17, 28 pages.
European Patent Office, "Extended European Search Report," issued in connection with European Patent Application No. 22180113.7-1207, dated Nov. 22, 2022, 31 pages.
Dwivedi et al., "Benchmarking Graph Neural Networks," Journal of Machine Learning Research, arXiv, Dec. 28, 2022, 49 pages.
European Patent Office, "Extended European Search Report," issued in connection with European Patent Application No. 22184405.3, dated Dec. 2, 2022, 7 pages.
United States Patent and Trademark Office, "Non-Final Office Action," issued in connection with U.S. Appl. No. 17/379,280, dated Dec. 2, 2022, 14 Pages.
International Searching Authority, "International Preliminary Report on Patentability," issued in connection with International Patent Application No. PCT/US2021/039931, issued on Dec. 13, 2022, 5 pages.
United States Patent and Trademark Office, "Corrected Notice of Allowability," issued in connection with U.S. Appl. No. 17/364,419, dated Jan. 4, 2023, 2 pages.
United States Patent and Trademark Office, "Non-Final Office Action," issued in connection with U.S. Appl. No. 17/883,309, dated Jan. 20, 2023, 14 pages.
United States Patent and Trademark Office, "Corrected Notice of Allowability," issued in connection with U.S. Appl. No. 17/364,419, filed Feb. 15, 2023, 2 pages.
United Kingdom Patent Office, "Examination Report Under Section 18(3)," issued in connection with U.K. Patent Application No. 2112299.9, dated Feb. 17, 2023, 2 pages.
United States Patent and Trademark Office, "Final Office Action," issued in connection with U.S. Appl. No. 17/075,675, dated Mar. 7, 2023, 11 pages.
United States Patent and Trademark Office, "Non-Final Office Action," issued in connection with U.S. Appl. No. 17/345,940, dated Mar. 16, 2023, 13 pages.
United States Patent and Trademark Office, "Final Office Action," issued in connection with U.S. Appl. No. 17/379,280, dated May 5, 2023, 17 pages.
United States and Patent and Trademark Office, "Notice of Allowance and Fee(s) Due," issued in connection with U.S. Appl. No. 17/883,309, dated May 11, 2023, 14 pages.
European Patent Office, "Extended European Search Report," issued in connection with European Patent Application No. 22214553.4, dated May 17, 2023, 9 pages.
United States Patent and Trademark Office, "Advisory Action," issued in connection with U.S. Appl. No. 17/075,675, dated May 30, 2023, 3 pages.
International Searching Authority, International Search Report, issued in connection with International Patent Application No. PCT/US2023/011859, mailed on Jun. 1, 2023, 3 pages.
International Searching Authority, Written Opinion, issued in connection with International Patent Application No. PCT/US2023/011859, mailed on Jun. 1, 2023, 4 pages.

United States Patent and Trademark Office, "Notice of Allowance and Fee(s) Due," issued in U.S. Appl. No. 17/075,675, mailed on Jun. 26, 2023, 8 pages.
United States Patent and Trademark Office, "Notice of Allowance and Fee(s) Due," issued in connection with U.S. Appl. No. 17/345,940, mailed on Jul. 7, 2023, 8 pages.
United Kingdom Intellectual Property Office, "Intention to Grant Under Section 18(4)," issued in connection with U.K. Patent Application No. 2112299.9, dated Jul. 13, 2023, 2 pages.
United States Patent and Trademark Office, "Advisory Action," issued in connection with U.S. Appl. No. 17/379,280, dated Jul. 18, 2023, 3 pages.
Gopal et al., "What is Intelligent Document Processing?" Nano Net Technologies, URL:[https://nanonets.com/blog/intelligent-document-processing/], Jul. 19, 2023, 21 pages.
United States Patent and Trademark Office, "Corrected Notice of Allowability," issued in connection with U.S. Appl. No. 17/345,940, dated Jul. 20, 2023, 3 pages.
Canadian Intellectual Property Office, "Examiner's Report," issued in connection with Canadian Patent Application No. 3,124,868, dated Aug. 10, 2023, 5 pages.
United States Patent and Trademark Office, "Corrected Notice of Allowability," issued in connection with U.S. Appl. No. 17/883,309, dated Aug. 17, 2023, 2 Pages.
United Kingdom Intellectual Property Office, "Notification of Grant," issued in connection with U.K. Patent Application No. 2112299.9, dated Aug. 29, 2023, 2 pages.
Amazon, "Intelligent Document Processing," Amazon Web Services, URL:[https://aws.amazon.com/machine-learning/ml-use-cases/document-processing/fintech/], retrieved on Sep. 8, 2023, 6 pages.
United States Patent and Trademark Office, "Corrected Notice of Allowability," issued in connection with U.S. Appl. No. 17/075,675, dated Oct. 10, 2023, 2 pages.
United States Patent and Trademark Office, "Non-Final Office Action," issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
United States Patent and Trademark Office, "Non-Final Office Action," issued in connection with U.S. Appl. No. 17/598,792, dated Dec. 29, 2023, 17 pages.
International Searching Authority, "International Preliminary Report on Patentability," issued in connection with International Patent Application No. PCT/US2022/034570, issued on Jan. 4, 2024, 7 pages.
United States Patent and Trademark Office, "Non-Final Office Action," issued in connection with U.S. Appl. No. 18/191,642, dated Feb. 7, 2024, 18 pages.
European Patent Office, "Communication pursuant to Article 94(3) EPC," issued in connection with European Patent Application No. 22214553.4, dated Jan. 7, 2025 2 pages.
European Patent Office, "Communication pursuant to Article 94(3) EPC," issued in connection with European Patent Application No. 22180113.7-1207, Jan. 7, 2025, 6 pages.
United States Patent and Trademark Office, "Supplemental Notice of Allowability," issued in connection with U.S. Appl. No. 17/710,538, dated May 8, 2024, 3 pages.
United States Patent and Trademark Office, "Corrected Notice of Allowability," issued in connection with U.S. Appl. No. 17/598,792, dated Jul. 3, 2024, 2 pages.
United States Patent and Trademark Office, "Final Office Action," issued in connection with U.S. Appl. No. 17/566,135, dated Jul. 25, 2024, 17 pages.
United States Patent and Trademark Office, "Final Office Action," issued in connection with U.S. Appl. No. 18/476,978, dated Aug. 14, 2024, 22 pages.
International Searching Authority, "International Preliminary Report on Patentability," issued in connection with International Application No. PCT/US2023/011859, mailed on Aug. 15, 2024, 6 pages.
United States Patent and Trademark Office, "Notice of Allowance and Fee(s) Due," issued in connection with U.S. Appl. No. 17/598,792, dated Aug. 27, 2024, 9 pages.

(56) References Cited

OTHER PUBLICATIONS

United States Patent and Trademark Office, "Notice of Allowance and Fee(s) Due," issued in connection with U.S. Appl. No. 17/710,538, dated Sep. 11, 2024, 3 pages.

United States Patent and Trademark Office, "Non-Final Office Action," issued in connection with U.S. Appl. No. 17/710,649, dated Sep. 16, 2024, 12 pages.

United States Patent and Trademark Office, "Second Notice of Allowability," issued in connection with U.S. Appl. No. 18/191,642, dated Sep. 16, 2024, 2 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Advisory Action," issued in connection with U.S. Appl. No. 18/476,978, dated Oct. 7, 2024, 3 pages.

United States Patent and Trademark Office, "Corrected Notice of Allowability," issued in connection with U.S. Appl. No. 17/710,660, dated Oct. 9, 2024, 2 pages.

United States Patent and Trademark Office, "Corrected Notice of Allowability," issued in connection with U.S. Appl. No. 17/598,792, dated Oct. 10, 2024, 2 pages.

United States Patent and Trademark Office, "Notice of Allowance and Fee(s) Due," issued in connection with U.S. Appl. No. 17/566,135, dated Oct. 11, 2024, 9 pages.

United States Patent and Trademark Office, "Corrected Notice of Allowability," issued in connection with U.S. Appl. No. 18/191,642, dated Oct. 11, 2024, 2 pages.

United States Patent and Trademark Office, "Corrected Notice of Allowability," issued in connection with U.S. Appl. No. 17/566,135, dated Oct. 23, 2024, 3 pages.

United States Patent and Trademark Office, "Corrected Notice of Allowability," issued in connection with U.S. Appl. No. 17/710,660, dated Oct. 30, 2024, 2 pages.

United States Patent and Trademark Office, "Notice of Allowability," issued in connection with U.S. Appl. No. 17/710,538, dated Nov. 20, 2024, 3 pages.

United States Patent and Trademark Office, "Second Corrected Notice of Allowability," issued in connection with U.S. Appl. No. 18/191,642, dated Nov. 22, 2024, 2 pages.

United States Patent and Trademark Office, "Corrected Notice of Allowability," issued in connection with U.S. Appl. No. 17/598,792, dated Dec. 5, 2024, 2 pages.

United States Patent and Trademark Office, "Notice of Allowance and Fee(s) Due," issued in connection with U.S. Appl. No. 18/476,978, dated Dec. 13, 2024, 11 pages.

United States Patent and Trademark Office, "Notice of Allowance and Fee(s) Due," issued in connection with U.S. Appl. No. 17/822,664, dated Dec. 31, 2024, 7 pages.

United States Patent and Trademark Office, "Notice of Allowance and Fee(s) Due," issued in connection with U.S. Appl. No. 18/148,947, dated Jan. 8, 2025, 12 pages.

United States Patent and Trademark Office, "Non-Final Office Action," issued in connection with U.S. Appl. No. 18/176,273, dated Apr. 24, 2025, 7 pages.

\* cited by examiner

FIG. 17

LABEL ANNOTATION

KPI    TASK LIST    COMPLETED TASK LIST    LABEL ANNOTATION WORKFLOW

SEARCH

| COUNTRY | JOB IDENTIFIER | STORE IDENTIFIER |
| --- | --- | --- |
| START DATE | END DATE | STATUS |

JOB LIST

| JOB ID | JOB STATUS | RECEIVED DATE | COMPLETION DATE | COMPLETED BY | IMAGE COUNT |
| --- | --- | --- | --- | --- | --- |
| 234_539 | P | 2021-09-07 | | | 1 |
| 849_995 | C | 2021-09-07 | 2021-09-07 | John Doe | 1 |
| 583_159 | P | 2021-09-07 | | | 5 |
| 698_489 | C | 2021-09-07 | 2021-09-07 | Jane Doe | 1 |
| 357_159 | P | 2021-09-07 | | | 1 |
| 232_147 | P | 2021-09-07 | | | |

METHODS, SYSTEMS, ARTICLES OF MANUFACTURE, AND APPARATUS FOR DECODING IMAGES

RELATED APPLICATION

This patent claims the benefit of U.S. Provisional Patent Application No. 63/299,804, which was filed on Jan. 14, 2022. U.S. Provisional Patent Application No. 63/299,804 is hereby incorporated herein by reference in its entirety. Priority to U.S. Provisional Patent Application No. 63/299,804 is hereby claimed.

FIELD OF THE DISCLOSURE

This disclosure relates generally to computer-based image analysis and, more particularly, to methods, systems, articles of manufacture, and apparatus for decoding an images.

BACKGROUND

Artificial intelligence (AI) leverages computers and machines to mimic problem solving and decision making challenges that typically require human intelligence. For example, computer Vision (CV) and Natural Language Processing (NLP) are two powerful AI techniques that may be combined to process an image. In recent years, there has been a trend of combining both AI techniques for use in multi-modal applications, thereby creating innovative solutions to business goals.

BRIEF DESCRIPTION OF THE DRAWINGS

FIG. 17 is an illustration of an example graphical window of the example label annotation circuitry of FIGS. 1 and/or 16.

FIG. 19 is an illustration of another example graphical window of the example label annotation circuitry of FIGS. 1 and/or 16.

Figure 1:
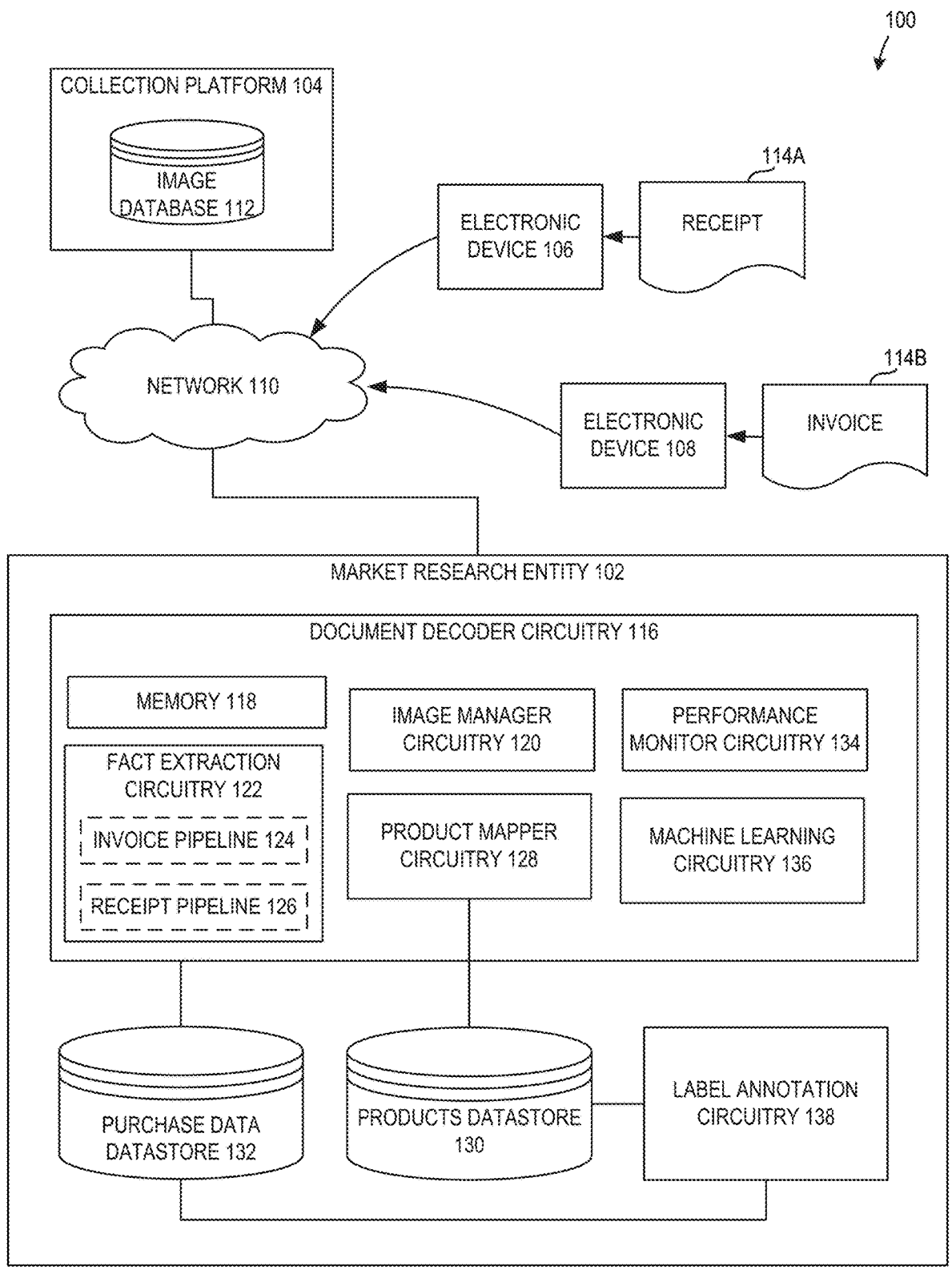
FIG. 1 is a schematic illustration of an example system to decode an image of a purchase document, including example document decoder circuitry, structured in accordance with the teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Marketing intelligence entities provide manufacturers and retailers with a complete picture of the complex marketplace and actionable information that brands need to grow their businesses. To do so, marketing intelligence companies often collect and analyze purchase related data to extract insights. When a retailer is unable or unwilling to provide purchase data to the research marketing entity, the entity can rely on other sources to collect the purchase data. At least one such source includes purchase documents from a plurality of retailers or other vendors. Purchase documents such as receipts and invoices memorialize a transaction between a consumer and a retailer. Purchase documents can include different information such as, but not limited to, retailer information, a purchase document identifier (e.g., an invoice number, receipt number, etc.), a purchase date, and/or purchase facts (e.g., information). Purchase facts can include a list of purchased products (e.g., in the form of product descriptions), product codes, prices paid, and quantities purchased.

The market research entity can gather purchase documents from a variety of resources, such as market cooperators (e.g., retailers, auditors, cooperating consumers, etc.) and/or another entity that collects purchase documents from consumers and/or retailers. In some examples, the market research entity obtains a digital version of a purchase document. However, the market research entity often acquires an image of the purchase document captured by a market cooperator via an electronic device such as a cellphone, a mobile computer having a camera, etc. For example, the market cooperator can capture an image of a receipt or an invoice and transmit the image to the entity for processing (e.g., extraction and decoding). Such a collection process can result in issues with image quality, document defects, image perspective and/or viewpoint issues, etc. resulting in difficult or otherwise non-readable purchase documents. These challenges decrease an effectiveness, efficiency, and accuracy of a traditional, manual decoding process. Accordingly, there is a need to transform the manual data collection by auditors and to provide new tools that can revolutionize current processes towards technology driven product organization.

To decode the purchase document, the market research entity associates purchased products listed in the purchase document with product identifiers such as a universal product code (UPC), an international article number such as a European Article Number (EAN), etc. that can be used for cross-coding. As disclosed herein, to cross-code means to apply a code (e.g., a standardized numeric identifier, an alphanumeric identifier, a barcode, a European Article Number (EAN), etc.) to the purchase facts corresponding to purchased products in a purchase document that directs a user to pertinent information at another location, such as an EAN database, other databases having information concerning the product, etc. In some examples, a workforce can manually process the purchase document to extract purchase-related information (e.g., purchase facts) used to decode the purchase document. For example, the workforce can transcribe, digitize, and store extracted purchase facts that can be used to identify products listed in the purchase document (e.g., by searching the purchase data against a data library of products). However, human involvement has been shown to cause significant problems with processing time due to the vast quantity of purchase documents to decode and the vast quantity of candidate products to consider when decoding. Additionally, human involvement exhibits erroneous and/or biased results. Any degree of automation and/or the elimination of human discretionary input applied to the decoding process could have a large impact on the productivity, accuracy, and digitalization of marketing intelligence entities.

Recent advances in artificial intelligence (AI) enable marketing intelligence entities to solve new and challenging business use cases, such as automatic extraction and decoding of information from an image. For example, applying AI techniques to the extraction of purchase information from purchase documents improves productivity of marketing intelligence entities and facilitates their digitalization, resulting in more cost effective processes. As noted above, CV and NLP are two powerful AI techniques that may be combined to process an image. CV is a field of AI that trains computers and machines to interpret and understand an image and to act accordingly. NLP is a field of AI concerned with giving computers the ability to understand human language as it is written. In other words, CV and NLP use artificial intelligence to process real world input and make sense of it in a way a computer can understand.

Disclosed herein are example methods, systems, articles of manufacture, and apparatus for decoding (e.g., automatically) purchase documents to generate purchase data. Examples disclosed herein simplify the collection of purchase data by automatically detecting and extracting the purchase facts from a purchase document (e.g., a receipt, an invoice, etc.) uploaded by a market cooperator. Technological (e.g., automatic) examples disclosed herein facilitate collection of purchase data from a purchase document to provide a large improvement on the productivity, error reduction, and digitalization of a marketing intelligence entity. Further, technological examples disclosed herein can boost the entity's throughput by enabling the entity to process more purchase documents with improved accuracy, collect more purchase data, and increase the entity's profits.

Automating the decoding process poses several technological, analytical, and/or real-world challenges. As noted above, there are inherent challenges in processing purchase document images based on the nature of the collection process. For example, purchase document images are often captured by mobile devices, which means they can be taken in uncontrolled (e.g., less than desirable) conditions. Common issues related to the capture environment include difficult lighting conditions leading to shadowing effects, blurred image(s) due to movement during capture, and/or occluded or partially visible images. Moreover, purchase documents can vary depending on a type of purchase document (e.g., invoice, receipt, etc.), form of the purchase document (e.g., printed versus hand-written), country or retailers from which the purchase document corresponds, etc. All this variance in the appearance of the images makes the captured images difficult to understand (e.g., by a human and/or by a machine). A new technological solution for extraction and decoding of purchase facts from an image of a purchase document is needed that can generalize well to new formats (e.g., based on large collections of purchase document images).

To overcome the foregoing challenges, example methods, systems, articles of manufacture, and apparatus disclosed herein utilize AI (e.g., CV and/or NLP) techniques to efficiently extract text of interest (e.g., purchase facts) from collected images of purchase documents (e.g., invoices, receipts, etc.). Generally, purchase facts of interest to a market research entity include a product code (e.g., a numerical identifier of a product), a product description (e.g., textual information about a product), a quantity (e.g., total purchased units of a product), and a price (e.g., total value of the units of the product). However, additional or alternative purchase facts can be extracted in other examples. In some examples, the purchase facts can vary depending on a country from which the purchase document originates.

CV techniques can be applied to an image to obtain distinctive features from the purchase document image and to perform optical character recognition (OCR) on the image to generate machine-readable text. NLP techniques can be used to understand the text extracted by OCR and to perform tasks such as entity-tagging and/or facts classification. Techniques based on OCR examine images pixel by pixel, looking for shapes that match character traits. A standard out-of-the-box OCR engine can detect text, generate text boxes (e.g., bounding boxes) corresponding to the text, determine locations (e.g., coordinates) of the text boxes, and transcribe the text. While OCR engines are generally capable of recognizing, detecting, and transcribing text, the OCR output does not guarantee a strict top-to-bottom, left-to-right ordering in the list of obtained words. Further, OCR engines tend to struggle to properly align and arrange detected words in purchase documents because purchase documents are often wrinkled (e.g., resulting in non-flat deformations), worn, and/or otherwise difficult for the OCR engine to read. Further, purchase documents vary in layout (e.g., based on type, origin, etc.) and can be captured with differing viewpoints and/or perspectives. In some examples, failure of an OCR engine to properly align text in a purchase document can result in improperly associated products and purchase facts during decoding, which can reduce the usefulness of the purchase document image.

Example methods, systems, articles of manufacture, and apparatus disclosed herein correct the above-noted deficiencies by post-processing the OCR output to properly align the detected text. Typically, an invoice organizes purchase facts in a table-like structure. Receipts, on the other hand, do not organize purchase facts in such a structure, resulting in a more challenging recognition process that necessitates a different approach. Accordingly, examples disclosed herein employ an invoice pipeline and a receipt pipeline, each of which utilize different techniques and AI models to efficiently perform tasks that are currently resource intensive and error prone. In doing so, examples disclosed herein improve automation of decoding the purchase document image via the invoice pipeline and/or the receipt pipeline.

Example methods, systems, articles of manufacture, and apparatus disclosed herein input an invoice image and respective OCR output into the invoice pipeline to extract text of interest about purchased products (e.g., purchase facts) that are organized in an invoice table. In some examples, an example AI-based column detection model is applied to the invoice image to identify columns in the invoice table. In some such examples, the column detection model outputs bounding boxes (e.g., column bounding boxes) corresponding to columns in the invoice table. Certain examples apply a row detection process to the invoice table that utilizes a heuristic-based algorithm(s) to detect rows, which can be used to identify a header of each column. For example, the row detection process can include, at least, horizontally sorting column bounding boxes, grouping text boxes (e.g., bounding boxes from the OCR output) into the column bounding boxes, and vertically sorting the text boxes. Certain examples identify a row that corresponds to column headers by identifying a first row of the invoice table that does not include a number. In some examples, the headers of each column are classified using text from the OCR output to recognize different facts in each column, row, and/or cell. In some examples, the invoice pipeline outputs purchase facts associated with a respective invoice image.

Examples disclosed herein input a receipt image and respective OCR output into the receipt pipeline to extract purchase facts. Receipt images necessitate a different approach to identifying text of interest (e.g., purchase facts) than invoice images because receipts do not include tabular facts. In some examples, the OCR output is analyzed to identify and directly tag detected text corresponding to one of the purchase facts as text of interest, a process referred to herein as entity-tagging. Certain examples apply state-of-the-art algorithms using NLP techniques for entity tagging.

Typically, purchase facts within a row correspond to a specific purchased product listed in the receipt image. Examples disclosed herein thus apply a line detection process to detect rows within the receipt image and associate purchase facts identified during entity-tagging with a product listed with the same row. Certain examples perform line detection by applying an AI model based on a graph neural network (e.g., GNN) to the receipt image to detect rows. However, other line detection techniques or AI models can be used to detect lines in additional or alternative examples. In some examples, more than one line can correspond to one purchased product. For example, a purchased product may have a long or otherwise complex description that occupies multiple lines within the receipt. Certain examples thus apply a heuristics-based post-processing technique to the detected lines to facilitate grouping of product lines. In some examples, the line detection technique and/or post-processing technique are referred to as entity linking. Following the entity-tagging and entity-linking processes, the receipt pipeline outputs purchase facts associated with a respective receipt image.

Examples disclosed herein utilize the extracted purchase facts (e.g., from the invoice pipeline and/or the receipt pipeline) to decode the purchase document. In some examples, the extracted purchase facts from the purchase document can include a list of purchased products that includes, for each purchased product, a product description, a price, a code, and/or a quantity. Examples disclosed herein decode the purchase document by matching (e.g., associating, mapping, etc.) purchase facts for a purchased product with a corresponding product. For example, the extracted purchase facts can be searched against a database of products to decode the purchase document. In this manner, purchase facts extracted from the receipt image can be associated with a product having a product identifier.

Certain examples include a human-in-the-loop component to an decoding output. That is, certain examples include an example labelling tool (e.g., program, application, etc.) designed to enable fact checking of purchase fact predictions provided by the receipt pipeline and/or the invoice pipeline. The labeling tool can be implemented to ensure accuracy of data generated in the collecting process. In some examples, the labelling tool can be used to provide curated ground truth annotations, facilitating a mechanism for feedback that can be used to re-train and/or revise AI models thereby providing for continuous learning. In some examples, a back office of a market research entity can transmit an image and associated purchase facts (e.g., extracted by the invoice pipeline and/or the receipt pipeline) to a database, which can be accessed by a labelling team via the labeling tool. For example, the labeling process can be implemented by a label annotation platform (e.g., LAP) that supports the labeling team with a robust design and friendly interface. The labeling team can review the predicted regions (e.g., column(s), row(s), line(s), etc.), predicted text (e.g., from the OCR output), and predicted purchase facts to provide final annotations. In this sense, the interface allows the labeling team to review the output of the automated solution and refine it. Certain examples thus provide improvements in the efficiency and productivity of the decoding process by applying the ground truth annotations to the ML models.

Examples disclosed herein may be part of a larger document decoding service (DDS) that can extract and/or decode various types of documents. In some examples, a purchase document is uploaded a market research entity's back office for processing. In some examples, the purchase document is uploaded to a backend service that is structured to decode the purchase document. For example, the decoding process can be deployed as a cloud service (e.g., Software as a Service. Function as a Service, etc.) by a cloud service provider. In some such examples, the decoded purchase data can be forwarded to the entity's back office (e.g., via a backend server) for trend analysis and insight extraction. In some examples, the decoding service can be deployed as a micro-service application (e.g., an application comprising independent components that run each application process as a service.)

Examples disclosed herein are applied to an image to predict a fact(s) corresponding to a purchase document. Disclosed examples may be used to transform manual data collection performed by a human (e.g., auditor) to an automated process. Certain examples provide novel techniques to reduce or otherwise eliminate the manual work currently required. That is, certain examples include a novel architecture designed using recent advances in Artificial Intelligence (AI) and Machine Learning (ML) to facilitate the transition to the automation of at least some aspects of a purchase fact extraction process.

AI, including ML, deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, different types of machine learning models are used. In some examples, a neural network (e.g., a graph neural network, a convolution neural network, etc.) is used to train a model. A neural network may enable identification of relationships in a data set via a process that mimics how the human brain works. In some examples disclosed herein, a classification model is used. In some examples, machine learning models/architectures used in examples disclosed herein include a black box network in which interconnections are not visible outside the model. However, other types of machine learning models could additionally or alternatively be used such as decision trees, support vector machines (SVM), regression analysis, Bayesian models, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using different algorithms, depending on the type of model. Training is performed using hyperparameters that control how the learning is performed (e.g., a learning rate, a number of layers to be used in the machine learning model, etc.). Training is performed using training data. In some examples disclosed herein, the training data originates from images of purchase documents (e.g., processed by a labeling team). Because supervised training is used in some examples, the training data in such examples is labeled. In some examples re-training may be performed.

Once training is complete, the model is deployed for use as an executable construct that processes an input and provides an output based on the network of nodes and connections defined in the model. The model is stored at a document decode server (e.g., in a database, etc.). The model may then be executed by a component of example extracting circuitry.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is a schematic illustration of an example document decode system 100 for decoding images of purchase documents (e.g., invoices, receipts, etc.) to generate purchase data in accordance with the teachings of this disclosure. The example document decode system 100 includes an example market research entity 102, an example collection platform 104, a first example electronic device 106, and a second example electronic device 108, which are communicatively coupled via an example network 110. The market research entity 102 can be, for example, an entity that collects and/or generates purchase data from which to generate insights for use by market participants, such as retailers and manufacturers. In some examples, the market research entity 102 is implemented by one or more servers. For example, the market research entity 102 can be a physical processing center including servers. In some examples, at least some functionality of the market research entity 102 is implemented via an example cloud and/or Edge network (e.g., AWS®, etc.). In some examples, the market research entity 102 is absent. In some such examples, the functionality of the market research entity 102 may implemented by any suitable device or combination of devices (e.g., the electronic devices 106, 108, etc.).

The collection platform 104 can be, for example, a global, national, and/or regional platform that collects data for processing. For example, the collection platform 104 can collect image data related to purchase documents used to generate purchase data. In some examples, the collection platform 104 includes channels from which to collect and/or process data, such as retailer channels, manufacturer channels, etc. In some examples, the collection platform 104 includes an example image database 112, which is structured to store images of purchase documents and/or other market data.

The electronic devices 106, 108 of FIG. 1 are devices associated with market cooperators (e.g., auditors, consumers, etc.) to provide purchase documents to the entity 102. The electronic devices 106, 108 can be, for example, a personal computing (PC) device such as a laptop, a smartphone, an electronic tablet, a hybrid or convertible PC, etc. In some examples, the electronic devices 106, 108 are mobile devices that include an image capturing device (e.g., an image sensor, a camera, etc.). The electronic devices 106, 108 enable a market cooperator to scan, capture, or otherwise obtain an image of a purchase document recording a transaction between a retailer and a consumer. For example, the first electronic device 106 can be used to capture an image of a first example purchase document (e.g., a receipt) 114A. Similarly, the second electronic device 108 can be used to capture an image of a second example purchase document (e.g., an invoice) 114B. In some examples, a market cooperator(s) transmits an image of a purchase document 114A, 114B to the collection platform 104 and/or the market research entity 102 via the electronic device 106, 108 and the network 110. For example, a market cooperator can capture and transmit an image of a purchase document 114A, 114B (e.g., via an electronic device 106, 108) to the collection platform 104 for storage in the image database 112.

In the illustrated example of FIG. 1, the network 110 is the Internet. However, the example network 110 may be implemented using any other network over which data can be transferred. The example network 110 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 110 is an enterprise network (e.g., within businesses, corporations, etc.), a home network, among others.

The market research entity 102 includes example document decoder circuitry 116, which is structured to decode an image of a purchase document 114A, 114B to generate purchase data. For example, the document decoder circuitry 116 can extract purchase facts from the image, which can be used to identify products listed in the purchase document. The document decoder circuitry 116 can be implemented in any suitable manner, such as, but not limited to, by one or more servers, via an example cloud and/or Edge network, as a micro-service application, etc. For example, the document decoder circuitry 116 can be implemented as an application programming interface (API) that employs at least one micro-service. In some examples, the document decoder circuitry 116 implements a remote procedure call (RPC) framework that can efficiently connect services in and across data centers. For example, the document decoder circuitry 116 can employ the RPC to communicate between the microservices that wrap ML models used to extract and decode the purchase documents 114A, 114B.

In some such examples, data exchanged between the micro-services can be in a specific format, such as a JavaScript Object Notation (JSON) format, Extensible Markup Language (XML) format, etc. In some examples, the document decoder circuitry 116 includes pluggable support for load balancing (e.g., distributing traffic across multiple servers), tracing (e.g., tracking an incoming request, corresponding events, timings of the events, etc.), health checking (e.g., monitoring traffic to ensure the document decoder circuitry 116 is handling requests), and/or authentication (e.g., token-based authentication, Application Layer Transport Security (ALTS), etc.).

The example document decoder circuitry 116 includes example memory 118, which is structured to store information for use by the document decoder circuitry 116. In some examples, the memory 118 can be implemented using volatile memory device(s) such as dynamic random access memory, static random access memory, dual in-line memory module, etc. In some examples, the memory 118 is implemented using persistent memory technologies, such as memristors and phase change memory. In some examples, the memory 118 can be implemented using non-volatile memory that stores images, AI models, and/or other data used by the document decoder circuitry 116. In some examples, the memory 118 is implemented by a remote server.

In the example of FIG. 1, the memory 118 of FIG. 1 is an in-memory data structure server that can support different kinds of data structures. For example, the memory 118 can be an in-memory key-value database, such as Remote Dictionary Server (REDIS), Memcached, etc. In some examples, the memory 118 can be used to connect data between components of the document decoder circuitry 116, other components of the market research entity 102, and/or microservices employed by the document decoder circuitry 116.

The example document decoder circuitry 116 includes example image manager circuitry 120, which is structured to manage communication for the document decoder circuitry 116. In some examples, the image manager circuitry 120 uses a recognition queue to receive or otherwise retrieve an image corresponding to a purchase document 114A, 114B. For example, the image manager circuitry 120 can retrieve and/or receive a purchase document image from the image database 112 of the collection platform 104. In some examples, the image manager circuitry 120 manages received outputs using a notification queue.

The document decoder circuitry 116 includes example fact extraction circuitry 122, which is structured to extract purchase facts from an input image(s) corresponding to a purchase document(s). For example, the fact extraction circuitry 122, described in further detail below in relation to FIG. 6, can apply different ML models to the input image(s) to compute predictions for the purchase document(s). In some examples, the ML models vary, depending on whether the purchase document is an invoice or a receipt and/or depending on a country from which the purchase documents originates. As noted above, invoices typically organize purchase facts in a table-like structure, resulting in a simpler extraction process. Receipts, on the other hand, do not typically follow such an organized structure, making it more difficult to extract purchase facts from an image of a receipt. A receipt's structure can vary depending on a retailer, store, country, etc. from which the receipt originates. Accordingly, the fact extraction circuitry 122 includes an example invoice pipeline 124 and an example receipt pipeline 126. The invoice pipeline 124 applies different techniques than the receipt pipeline 126 to extract purchase facts of interest. For example, the invoice pipeline 124 is concerned with column detection and classification techniques. On the other hand, the receipt pipeline 126 applies an entity-tagging technique to tag words of interest and a line detection technique to detect lines associated with the words of interest.

Figure 2:
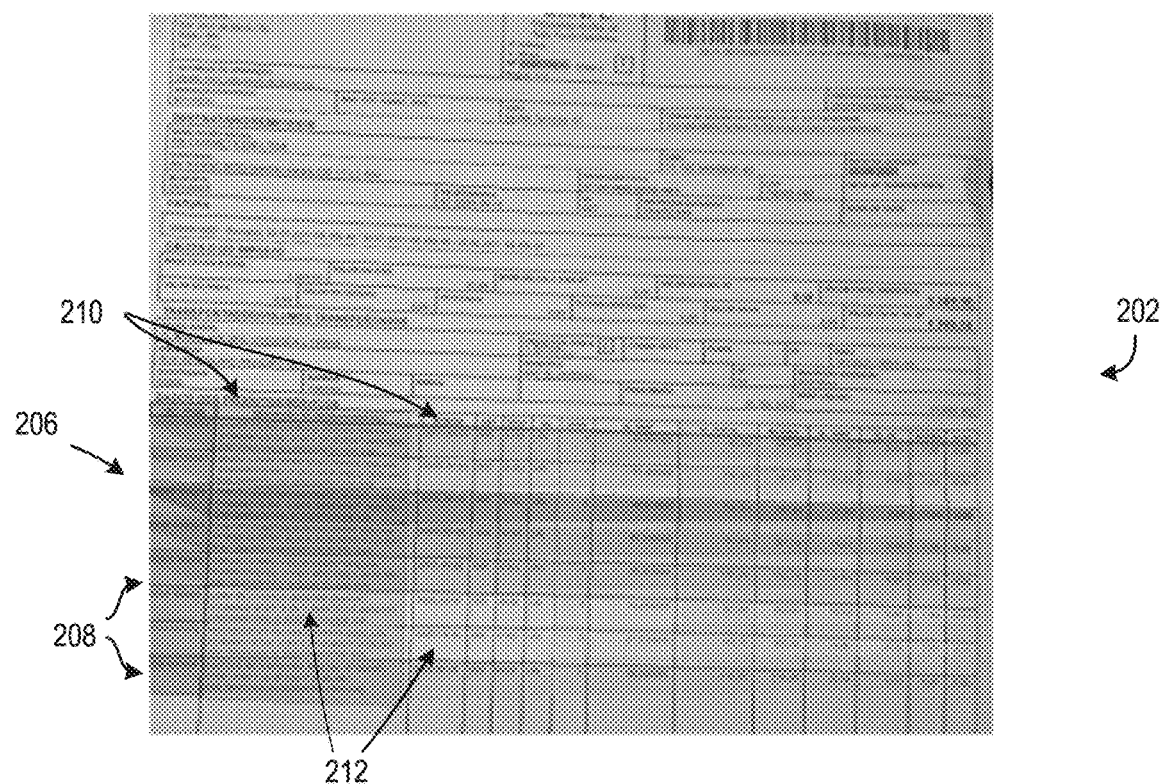
FIG. 2 is an illustration of purchase facts in an example invoice image that may be extracted in accordance with the teachings of this disclosure.

FIG. 2 is an illustration of an example invoice image 202 that can be input into the example fact extraction circuitry 122 of FIG. 1 for purchase fact extraction. FIG. 2 illustrates an example table-like structure 206 in which purchase facts are typically organized in an invoice image 202. The structure 206 includes example rows 208, each of which typically correspond to a purchased product. The structure 206 includes example columns 210, each of which correspond to a purchase fact. At the intersection of each row 208 and column 210 is an example cell 212 that includes a specific purchase fact corresponding to a respective product. The table-like structure 206 of the invoice image 202 typically contains numerous purchase facts. In some examples, a portion of the purchase facts are extracted for the decoding process. For example, the purchase facts of interest can include a product description, a product code (e.g., if included), a product price, and a product quantity.

Figure 3:
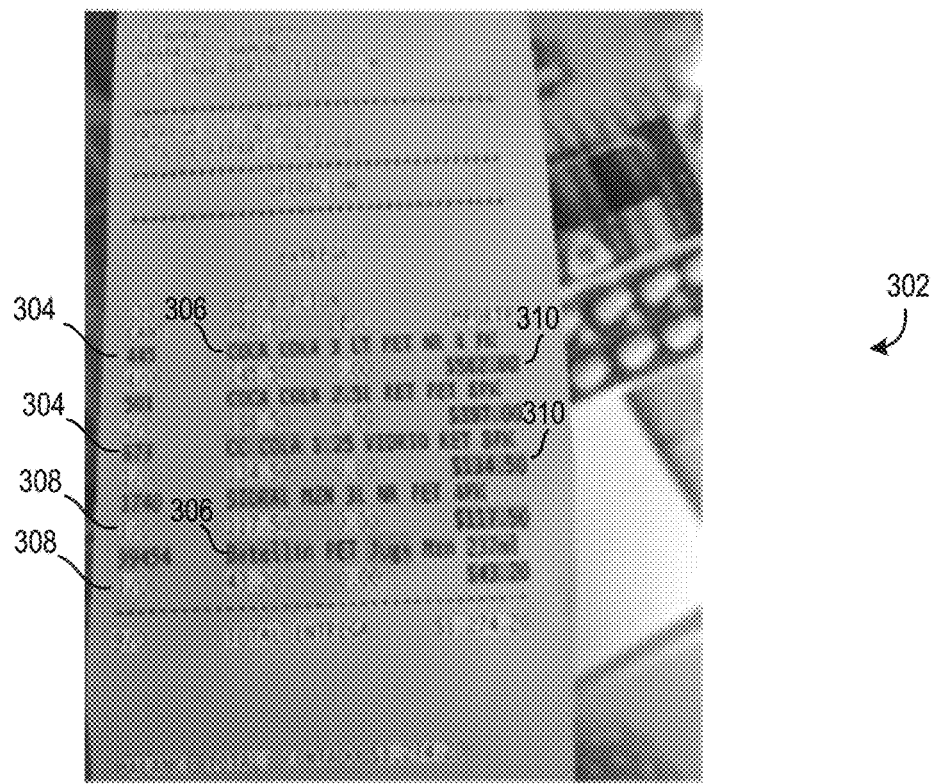
FIG. 3 is an illustration of purchase facts in an example receipt image that may be extracted in accordance with the teachings of this disclosure.

FIG. 3 is an illustration of an example receipt image 302 that can be input into the example fact extraction circuitry 122 of FIG. 1 for purchase fact extraction. The receipt image 302 does not organize purchase facts in a table-like structure. Accordingly, the receipt pipeline 126 of FIG. 1 applies an entity tagging process to decode the receipt image 302. The entities tagging process is used to tag text of interest that correspond to purchase facts of interest. For example, the receipt image 302 includes example product codes 304, example product descriptions 306, example quantities 308, and example prices 310. The product descriptions 306 can include different information, such as, but not limited to, a brand, a product format (e.g., packaging type, size, etc.), etc. The product description 306 can be used to map product against a database of products.

As illustrated in FIG. 3, the receipt image 302 can include purchase facts corresponding to a product in one or more rows (e.g., lines) of text. Accordingly, the receipt pipeline 126 typically applies a row detection technique to identify rows of text. In some examples, the receipt pipeline 126 groups lines that correspond to a purchased product as listed in the receipt image 302.

Referring again to FIG. 1, the fact extraction circuitry 122 determines a type of purchase document to which the input image corresponds. In some examples, the fact extraction circuitry 122 applies an OCR algorithm to the input image to extract text. The invoice pipeline 124 and/or the receipt pipeline 126 use the extracted textual data from the image and apply at least one machine learning model to identify purchase facts of interest. The invoice pipeline 124 and/or the receipt pipeline 126 output extracted purchase facts from the image.

The document decoder circuitry 116 includes example product mapper circuitry 128, which is structured to use the purchase facts extracted by the fact extraction circuitry 122 to identify a product(s) recorded in a purchase document 114A, 114B. In some examples, the product mapper circuitry 128 is instantiated by processor circuitry executing product mapper instructions and/or configured to perform operations such as those represented by the flowchart of FIG. 22. To map the purchase facts to products, the product mapper circuitry 128 receives the extracted purchase facts as an input and maps the purchase facts against an example products datastore 130. The example products datastore 130 is storage circuitry that stores product-related data, including a plurality of products and corresponding attributes for a given country and/or market. Product attributes may include, for example, a product description, product image, product code (e.g., UPC, EAN, etc.), etc. While in the illustrated example of FIG. 1 the products datastore 130 is illustrated as a single datastore, the products datastore 130 may be implemented by any number and/or type(s) of datastores. Furthermore, the data stored in the products datastore 130 may be in any data format such as, for example, binary data, comma delimited data, tab delimited data, structured query language (SQL) structures, an executable (e.g., an executable binary, a configuration image, etc.), etc.

In some examples, the products datastore 130 is implemented with example ElasticSearch technology, such as an open-source full-text search and analytics engine. For example, the products datastore 130 can provide a distributed, multitenant-capable full-text search engine with an Hypertext Transfer Protocol (HTTP) web interface and schema-free JSON documents. In some examples, the ElasticSearch technology as applied to the products datastore 130 enables the product mapper circuitry 128 to search and analyze large volumes of data quickly.

In some examples, the product mapper circuitry 128 identifies products in the purchase documents and stores the image and associated data in an example purchase data datastore 132. For example, the purchase data datastore 132 can store the image(s), the extracted purchase facts, the identified product(s), and/or any other information obtained by the document decoder circuitry 116. In some examples, the purchase data datastore 132 is implemented as a platform that enables users to engage in agile cloud computing. For example, the purchase data datastore 132 can be used for storing datasets associated with the collected invoices and receipts and for serving models jointly with microservices. While in the illustrated example of FIG. 1 the purchase data datastore 132 is illustrated as a single memory, the purchase data datastore 132 may be implemented by any number and/or type(s) of database. Furthermore, the data stored in the purchase data datastore 132 may be in any data format.

The document decoder circuitry 116 includes example performance monitor circuitry 134, which is structured to monitor a performance of the fact extraction circuitry 122 and/or the product mapper circuitry 128. In some examples, the performance monitor circuitry 134 is instantiated by processor circuitry executing performance monitor instructions and/or configured to perform operations such as those represented by the flowchart of FIG. 21. For example, the performance monitor circuitry 134 can utilize key performance indicators (KPIs) to measure a performance of ML models used in the document decoder circuitry 116. A KPI is a measurable value that can indicate performance of a model against an intended end result. The KPIs may be utilized to monitor quantitative results such as document type (e.g., a number of documents per type, such as invoices, receipt, and not purchase documents), image quality (e.g., a number of documents per readability, such as readable, partially readable, and not readable), and/or precision and recall (e.g., a metric for each purchase fact, such as code, description, quantity, price, etc.). In some examples, the performance monitor circuitry 134 determines a metric for a combination of all purchase facts per product line (e.g., per product).

The document decoder circuitry 116 includes example machine learning circuitry 136, which is structured to train an ML model. In some examples, the machine learning circuitry 136 is instantiated by processor circuitry executing machine learning instructions and/or configured to perform operations such as those represented by the flowchart of FIG. 21. In some examples, the machine learning circuitry 136 is implemented as an open-source machine learning framework that accelerates a path from research prototyping to production deployment. In some examples, the machine learning circuitry 136 is implemented as a flexible, high-performance serving system for some of the ML models, specially designed for production environments. In some examples, the machine learning circuitry 136 may be used to re-train a previously trained ML model based on the KPIs determined by the performance monitor circuitry 134 and/or based on feedback from a labeling team. In some examples, the machine learning circuitry 136 may be used to train a new ML model.

The market research entity 102 includes example label annotation circuitry 138, which is structured to provide an interface through which a labelling team can review outputs of the document decoder circuitry 116. In some examples, the label annotation circuitry 138 is instantiated by processor circuitry executing label annotation instructions and/or configured to perform operations such as those represented by the flowchart of FIG. 23. The document decoder circuitry 116 applies AI techniques and other technology to input purchase document images and outputs predicted purchase facts and their respective text, jointly with a mapping of recognized product listed in the purchase documents. After predicting the facts and related text over a processed image, the document decoder circuitry 116 stores the obtained information in the purchase data datastore. Once the predictions are obtained, the label annotation circuitry 138 can be used by the labeling team to review the predictions with a goal of validating the predictions. For example, the label annotation circuitry 138 enables the labeling team to search for desired date (e.g., images, information, predictions, etc.) and to present the data to the labeling team. For example, the labeling team can utilize the label annotation circuitry 138 to review predictions for rows, columns, entities, etc. to refine the predictions with a goal of obtaining the more accurate data in the collecting process and providing a curated ground-truth information able to provide feedback to the document decoder circuitry 116 for a continuous learning. In some examples, labeling team can refine the predictions given by the AI models and validate the invoices and receipts information. The labeling team includes at least one person to review the output of the document decoder circuitry 116. The person may be an employee of the marketing research entity and/or another person tasked with reviewing the output of the document decoder circuitry 116. In some examples, the labelling team reviews outputs of the document decoder circuitry 116 while the performance monitor circuitry 134 can measures a performance of an ML model(s) used in the document decoder circuitry 116 that is below a defined or threshold level.

In some examples, the document decode system 100 includes means for extracting purchase facts from an image. For example, the means for extracting purchase facts may be implemented by fact extraction circuitry 122. In some examples, the fact extraction circuitry 122 may be instantiated by processor circuitry such as the example processor circuitry 2612 of FIG. 26. For instance, the fact extraction circuitry 122 may be instantiated by the example microprocessor 2700 of FIG. 27 executing machine executable instructions such as those implemented by at least blocks 2202-2218 of FIGS. 22-24. In some examples, the fact extraction circuitry 122 may be instantiated by hardware logic circuitry, which may be implemented by an ASIC, XPU, or the FPGA circuitry 2800 of FIG. 28 structured to perform operations corresponding to the machine readable instructions. Additionally or alternatively, the fact extraction circuitry 122 may be instantiated by any other combination of hardware, software, and/or firmware. For example, the fact extraction circuitry 122 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the document decode system 100 includes means for mapping purchase facts extracted from an image to products in a database. For example, the means for mapping the purchase facts to the products may be implemented by product mapper circuitry 128. In some examples, the product mapper circuitry 128 may be instantiated by processor circuitry such as the example processor circuitry 2612 of FIG. 26. For instance, the product mapper circuitry 128 may be instantiated by the example microprocessor 2700 of FIG. 27 executing machine executable instructions such as those implemented by at least blocks 2220 of FIG. 22. In some examples, the product mapper circuitry 128 may be instantiated by hardware logic circuitry, which may be implemented by an ASIC, XPU, or the FPGA circuitry 2800 of FIG. 2800 structured to perform operations corresponding to the machine readable instructions. Additionally or alternatively, the product mapper circuitry 128 may be instantiated by any other combination of hardware, software, and/or firmware. For example, the product mapper circuitry 128 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the market research entity 102 is illustrated in FIG. 1, one or more of the elements, processes, and/or devices illustrated in FIG. 1 may be combined, divided, re-arranged, omitted, eliminated, and/or implemented in any other way. Further, the example document decoder circuitry 116, example image manager circuitry 120, example fact extraction circuitry 122, example product mapper circuitry 128, example performance monitor circuitry 134, example machine learning circuitry 136, example label annotation circuitry 138, and/or, more generally, the example market research entity 102 of FIG. 1, may be implemented by hardware alone or by hardware in combination with software and/or firmware. Thus, for example, any of the example document decoder circuitry 116, example image manager circuitry 120, example fact extraction circuitry 122, example product mapper circuitry 128, example performance monitor circuitry 134, example machine learning circuitry 136, example label annotation circuitry 138, and/or, more generally, the example market research entity 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example market research entity 102 of FIG. 1 may include one or more elements, processes, and/or devices in addition to, or instead of, those illustrated in FIG. 1, and/or may include more than one of any or all of the illustrated elements, processes and devices.

Figure 4:
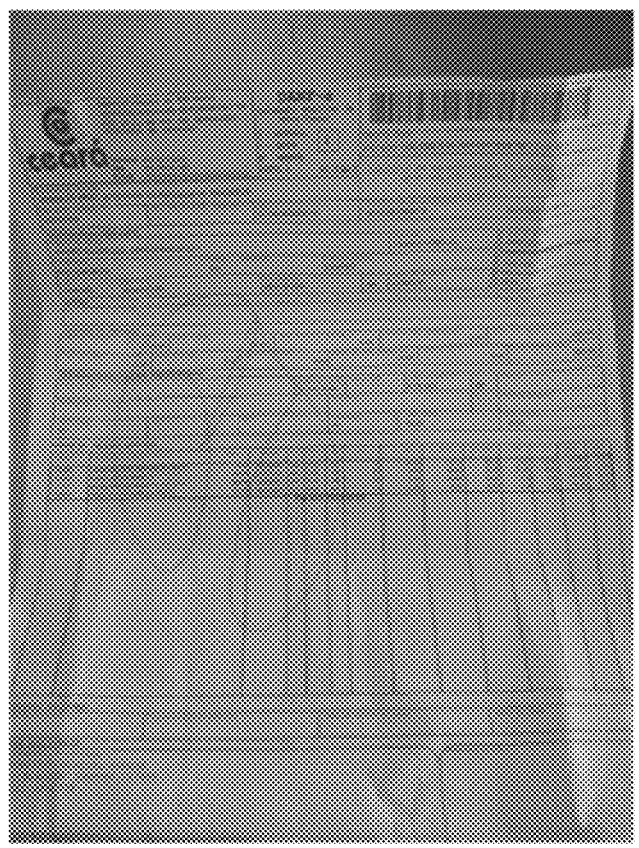
FIG. 4 is an illustration of an example invoice image for which examples disclosed herein may be applied.

FIG. 4 is an illustration of an example purchase document that can be processed by the example document decoder circuitry 116 of FIG. 1. Specifically, FIG. 4 illustrates an example invoice image 402 that may have been captured by an electronic device (e.g., electronic device 106, 108 of FIG. 1), such as a mobile device with a camera. As illustrated in FIG. 4, the invoice image 402 is of low quality. For example, an invoice as captured in the invoice image 302 of FIG. 3A is bent, resulting in shadow effects and other challenging lighting conditions. Further, the invoice image 302 was captured at a distance that makes it difficult to see the textual data printed in the corresponding invoice.

Figure 5:
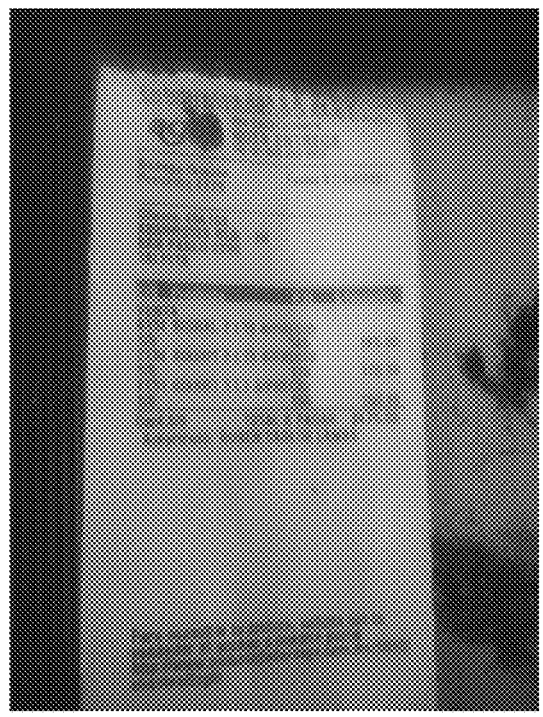
FIG. 5 is an illustration of an example receipt image for which examples disclosed herein may be applied.

FIG. 5 is an illustration of an example receipt image 502, which is another example purchase document that can be processed by the example document decoder circuitry 116 of FIG. 1. The receipt image 502 is a low quality image that may have been capture by a mobile device. The receipt image 502 is dark and captured in a manner that a receipt in the image 502 is blurry.

The issues with the images 402, 502 of FIGS. 4 and 5 can make it difficult to extract purchase facts. For example, decoding facts from the images 402, 502 would be demanding and time-consuming if done manually. Further, previous technology has had a challenging time extracting purchase facts from such images. Example disclosed herein improve the decoding process and enable automation in the extraction of purchase facts from even difficult purchase document images.

Figure 6:
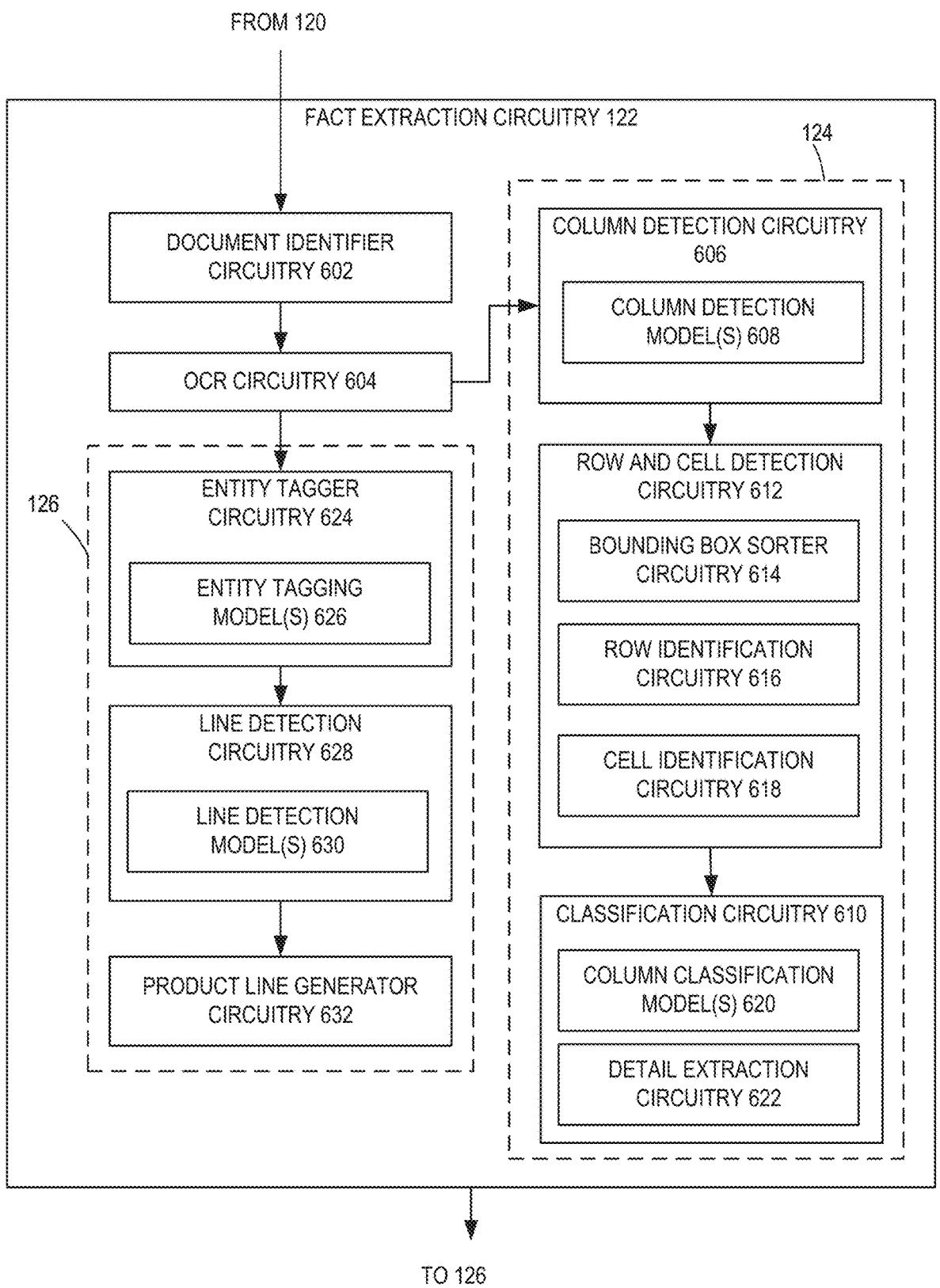
FIG. 6 is a block diagram of the example fact extraction circuitry of FIG. 1.

FIG. 6 is a block diagram of the fact extraction circuitry 122 of FIG. 1 to extract purchase facts from images of purchase documents (e.g., invoices, receipts, etc.). The fact extraction circuitry 122 of FIG. 6 may be instantiated (e.g., creating an instance of, bring into being for any length of time, materialize, implement, etc.) by processor circuitry such as a central processing unit executing instructions. Additionally or alternatively, the fact extraction circuitry 122 of FIG. 6 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 6 may, thus, be instantiated at the same or different times. Some or all of the circuitry may be instantiated, for example, in one or more threads executing concurrently on hardware and/or in series on hardware. Moreover, in some examples, some or all of the circuitry of FIG. 6 may be implemented by one or more virtual machines and/or containers executing on the microprocessor.

The fact extraction circuitry 122 includes example document identifier circuitry 602, which is structured to receive an image (e.g., from the image manager circuitry 120 of FIG. 1) and to determine a type of purchase document to which the image corresponds. For example, the document identifier circuitry 602 can determine whether a received image corresponds to an invoice or a receipt. In some examples, the document identifier circuitry 602 can determine that the image does not correspond to a purchase document. In some such examples, the document identifier circuitry 602 can transmit the image and indication to the purchase data datastore 132 to have the determination verified (e.g., by a labelling team). In some examples, the document identifier circuitry 602 is instantiated by processor circuitry executing document identifier instructions and/or configured to perform operations such as those represented by the flowchart of FIG. 22. The document identifier circuitry 602 can use any suitable method to determine a type of purchase document to which the image corresponds. For example, the document identifier circuitry 602 can analyze an image's metadata, apply an ML model, etc.

The fact extraction circuitry 122 includes example OCR circuitry 604, which is structured to extract machine-readable text from a received image. In some examples, the OCR circuitry 604 is instantiated by processor circuitry executing optical character recognition instructions and/or configured to perform operations such as those represented by the flowchart of FIG. 22. OCR is an AI method that applies CV techniques and NLP techniques to detect text. The human visual system reads text by recognizing patterns of light and dark, translating those patterns into characters and words, and then attaching meaning to it. OCR attempts to mimic the human visual system by using neural networks. Techniques based on OCR apply an algorithm over an image that examines the image pixel by pixel, looking for shapes that match the character traits.

Extracting machine readable text data via the OCR circuitry 604 is a vital step in the decoding process applied by the document decoder circuitry 116 because at least a portion of subsequent steps rely on the OCR output. In some examples, the OCR circuitry 604 generates bounding boxes corresponding to the identified text. As used herein, a bounding box represents characteristics (e.g., a group of coordinates, etc.) of a shape (e.g., a rectangle) enclosing one or characters of printed text on the receipt. In some examples, the OCR circuitry 604 generates a bounding box corresponding to each distinct string of characters (e.g., a word, a price, a number, etc., hereinafter referred to as a word). In some examples, the OCR circuitry 604 is implemented by a third party OCR engine (e.g., a third party web based OCR tool, etc.). For example, the OCR circuitry 604 can be an application program interface (API) that interfaces with the third party tool. In some such examples, the OCR circuitry 604 enables integration of vision detection features, including OCR and/or other features, such as image detection.

Figure 7:
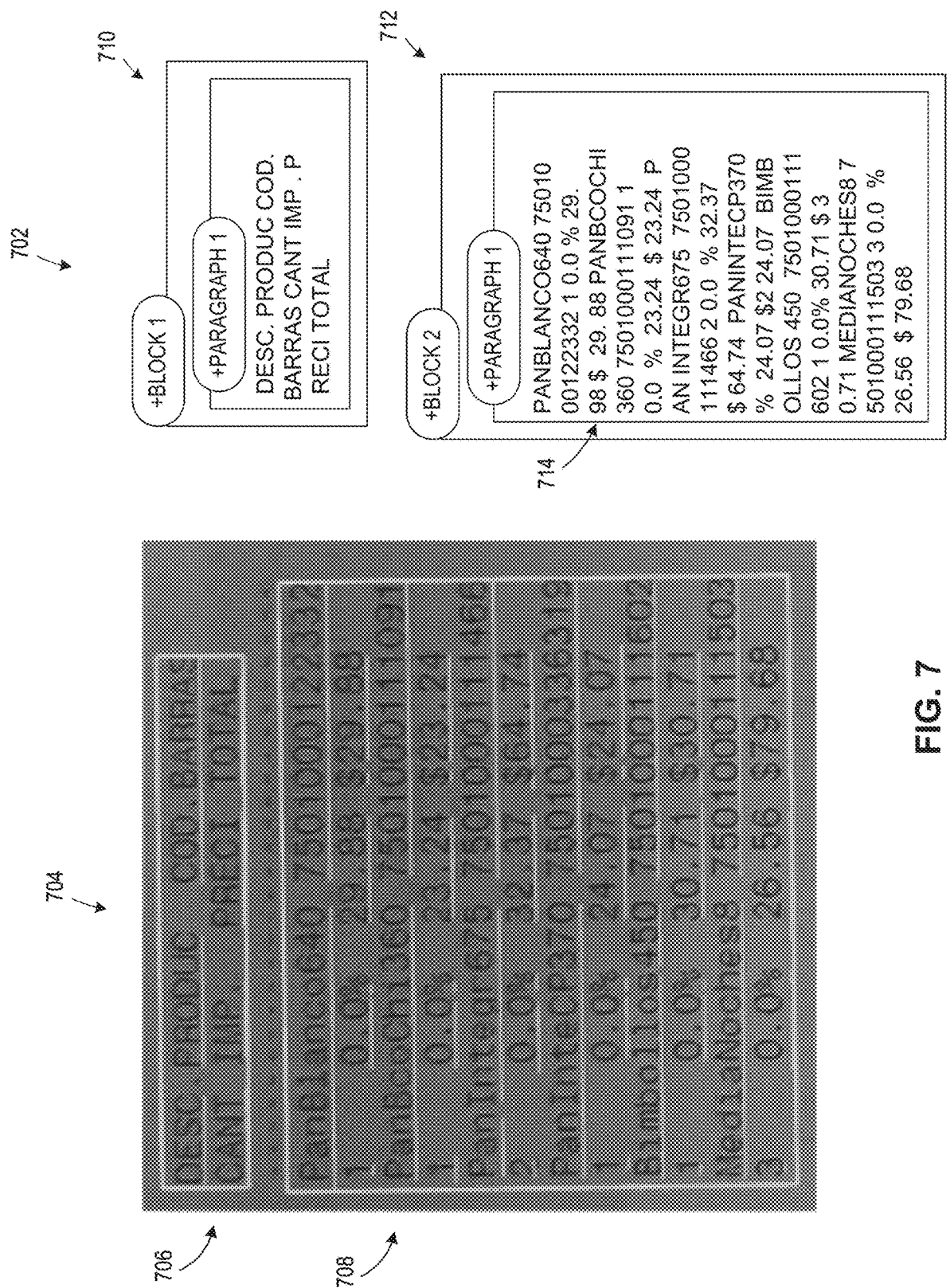
FIG. 7 is an illustration of an example output from an optical character recognition (OCR) service.

FIG. 7 is an illustration of example OCR output 702 corresponding to an example receipt image 704 that may be output of the OCR circuitry 604 of FIG. 6. The OCR circuitry 604 returns a characters, words, and paragraphs obtained from purchase images and their locations. As illustrated in FIG. 7, the example receipt image 704 includes a first example paragraph 706 and a second example paragraph 708. The OCR circuitry 604 has applied an OCR technique to the receipt image 704 to recognize machine-readable text associated with product descriptions in the receipt image 704.

The OCR output 702 includes machine-readable text 710 corresponding to the first paragraph 706 and machine readable text 712 corresponding to the second paragraph 708. As illustrated in FIG. 7, the OCR output can include typos, such as example typo 714. The detected text has some typos, which must be considered in the next steps. FIG. 7 illustrates how challenging optical character recognition can be. Further, FIG. 7 illustrates the importance of post-processing of the OCR output is to the extraction of purchase fact. The output OCR output 702 of FIG. 7 is not usefully organized for purchase data analysis. For example, the text associated with a product is not ordered next to text associated with the corresponding price and/or other purchase facts.

Referring again to FIG. 6, the fact extraction circuitry 122 of FIG. 6 includes the example invoice pipeline 124 and the example receipt pipeline 126 of FIG. 1. Depending on a type of document an image corresponds to (e.g., determined by the document identifier circuitry 602), the OCR circuitry 604 inputs an OCR processed image and corresponding OCR output into the invoice pipeline 124 or the receipt pipeline 126.

The fact extraction circuitry 122 includes example column detection circuitry 606, which is structured to detect regions of interest (e.g., facts columns) within an invoice image corresponding to an invoice. In some examples, the regions of interest are facts columns of an invoice table. In some examples, the column detection circuitry 606 is instantiated by processor circuitry executing column detection instructions and/or configured to perform operations such as those represented by the flowchart of FIG. 23. In some examples, the column detection circuitry 606 applies a ML model to the input image to detect the facts columns (e.g., columns). For example, the columns may be detected by applying a trained ML column detection model to the invoice image. Accordingly, the column detection circuitry 606 includes an example column detection model(s) 608.

In some examples, the column detection model 608 is based on a faster region-based convolutional neural network (R-CNN). However, other neural networks, such as other R-CNN architectures, etc. may be used additionally or alternatively. Whereas a standard convolutional neural network (CNN) is mainly based on image classification, an R-CNN combines localization and classification. In an R-CNN, the model architecture is forced to focus on a single region at a time because it is expected that only a single object of interest will dominate in a given region. The regions in an R-CNN are detected by a selective search algorithm followed by a resizing operation. The regions are of equal size before they are fed to a CNN for classification and bounding box regression.

In some examples, the column detection model 608 is trained using available invoice images. For example, the available invoice images can include invoice images with labeled column regions to provide knowledge to the column detection model(s) 608 during training. Because the column detection model 608 is used to detect only one class (e.g., columns), the R-CNN mainly works as a detector of columns.

Figure 8:
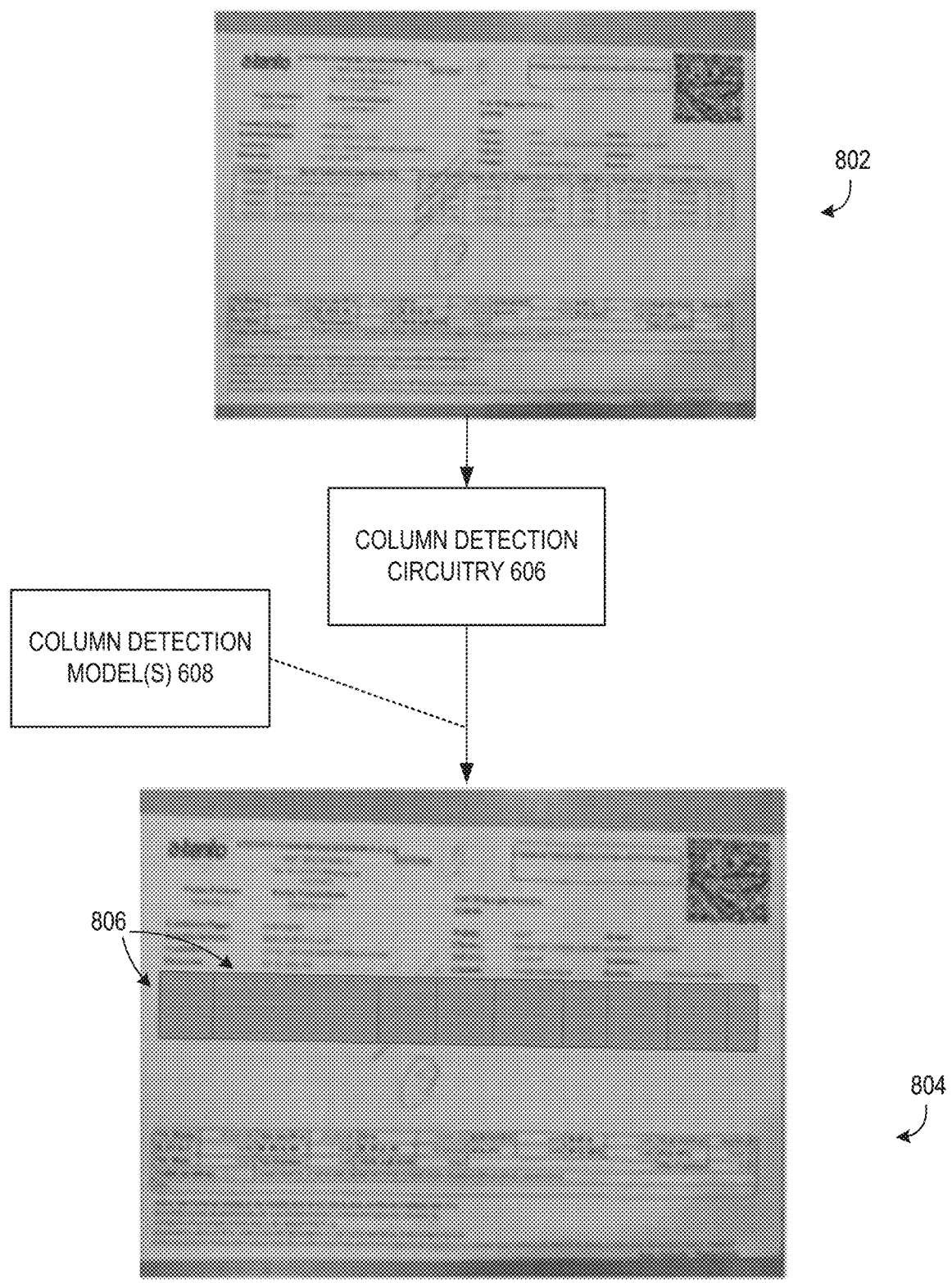
FIG. 8 is a schematic illustration of a flow of an example column detection model that can be applied to an invoice in accordance with the teachings of this disclosure.

FIG. 8 is a schematic illustration of an example implementation of the example column detection circuitry 606 of FIG. 6 in accordance with the teachings of this disclosure. In the illustrated example of FIG. 8, an example invoice image 802 is input into the column detection circuitry 606. The invoice image 802 can be, for example, an RGB image corresponding to an invoice. The column detection circuitry 606 applies an example column detection model 608 to the input invoice image 802. The column detection model 608 applies different algorithms to the invoice image 802 to detect facts columns. The column detection circuitry 606 generates an example output 804 that includes example regions 806 corresponding to predicted facts columns. In some examples, the column detection circuitry 606 outputs a list of polygonal regions (e.g., bounding boxes) that are fitted to the regions 806 (e.g., columns) with coordinates of the bounding boxes.

Referring again to FIG. 6, the fact extraction circuitry 122 includes example classification circuitry 610, which is structured to classify the columns detected by the column detection circuitry 606. In some examples, the classification circuitry 610 is instantiated by processor circuitry executing column classification instructions and/or configured to perform operations such as those represented by the flowchart of FIG. 23. To classify the columns, the classification circuitry 610 identifies text in a header of each column. Typically, the headers are associated with a first row in a table of the invoice. In some examples, the headers can thus be identified by detecting rows within the table of the invoice and identifying the first in the table of the invoice.

Accordingly, the fact extraction circuitry 122 includes example row and cell detection circuitry 612, which is structured to detect rows and/or cells of a table in an invoice. In some examples, the row and cell detection circuitry 612 is instantiated by processor circuitry executing row and cell detection instructions and/or configured to perform operations such as those represented by the flowchart of FIG. 23. To detect the rows, the row and cell detection circuitry 612 applies a heuristics-based row detection process, described in detail below. Detecting rows enables the classification circuitry 610 to identify and classify column headers corresponding to products facts. Detecting rows also enables identification of a number of rows in the invoice table and association of purchase facts that belong to a same product.

The row and cell detection circuitry 612 includes example bounding box sorter circuitry 614, which is structured to sort bounding boxes, such as word bounding boxes output by the OCR circuitry 604 and/or column bounding boxes output by the column detection circuitry 606. In some examples, sorting bounding boxes is a first step in the row detection process. In some examples, the bounding box sorter circuitry 614 is instantiated by processor circuitry executing bounding box sorter instructions and/or configured to perform operations such as those represented by the flowchart of FIG. 23.

In some examples, the bounding box sorter circuitry 614 horizontally sorts (e.g., arrange, organize, etc.) the column bounding boxes output by the column detection circuitry 606. The bounding box sorter circuitry 614 can utilize one or more coordinates associated with each bounding box and to horizontally sort the bounding boxes based on the one or more coordinates, such as a centroid, at least one X coordinate, etc. Typically, the bounding box sorter circuitry 614 utilizes the same coordinate(s) for each bounding box during sorting. However, the bounding box sorter circuitry 614 can utilize different coordinates in additional or alternative examples.

In some examples, the bounding box sorter circuitry 614 determines, for each word bounding box output by the OCR circuitry 604, a column (e.g., based on the horizontally sorted column bounding boxes) into which the word bounding box belongs. In this manner, the bounding box sorter circuitry 614 can place words into respective columns. In some examples, the bounding box sorter circuitry 614 utilizes intersection over union (IoU) calculations to determine whether a word belongs to a column. IoU is a metric for measuring overlap between two bounding boxes by comparing a ratio of an overlap area of the two bounding boxes to a total area of the two bounding boxes. Thus, the bounding box sorter circuitry 614 can compute an IoU ratio for a first word bounding box and a first column bounding box to determine whether the first word bounding box belongs in the first column bounding box. In some examples, the words are assigned to a column if the IoU ratio reaches a threshold value. For example, the threshold value in some examples is approximately 0.75 (e.g., 75%). However, the threshold value can be higher or lower in additional or alternative examples. In some examples, each word bounding box is placed in a single column bounding box. In some examples, a single column bounding box can include multiple word bounding boxes. However, in some examples, a single column bounding box can include one word bounding box.

In some examples, the bounding box sorter circuitry 614 sorts word bounding boxes within each column vertically. For example, the bounding box sorter circuitry 614 can identify a Y coordinate of a centroid of each word bounding box within a column to sort the bounding boxes from lowest Y coordinate to highest Y coordinate. Typically, the bounding box sorter circuitry 614 utilizes the same coordinate(s) for each bounding box during sorting. However, the bounding box sorter circuitry 614 can utilize different coordinates in additional or alternative examples. In some examples, the Y coordinate of a centroid for each word is stored in a temporary variable for detection of different lines in the invoice image.

The row and cell detection circuitry 612 includes example row identification circuitry 616, which is structured to identify rows within each column identified by the column detection circuitry 606. In some examples, the row identification circuitry 616 is instantiated by processor circuitry executing row identification instructions and/or configured to perform operations such as those represented by the flowchart of FIG. 23. In some examples, the row identification circuitry 616 iterates through the sorted words within each column to identify words that are numbers (e.g., an integer, a float, etc.). In doing so, the row identification circuitry 616 is able to count a total occurrence of numbers in each column. For example, the row identification circuitry 616 can calculate a number of words that are numbers within each detected column. In some examples, the row identification circuitry 616 uses the calculations to identify a mode number of words that are numbers (e.g., a most repeated number of words that are numbers between the detected columns). In some examples, the mode corresponds to a number of rows in the invoice. Thus, by identifying the mode, the row identification circuitry 616 identifies a (e.g., target) number of rows within the invoice table. In some examples, columns that include the mode (e.g., the target number of rows) are determined to be representative columns. In some examples, the row identification circuitry 616 computes a slope of each row using a median of the columns that contain the mode amount of rows.

Figure 9:
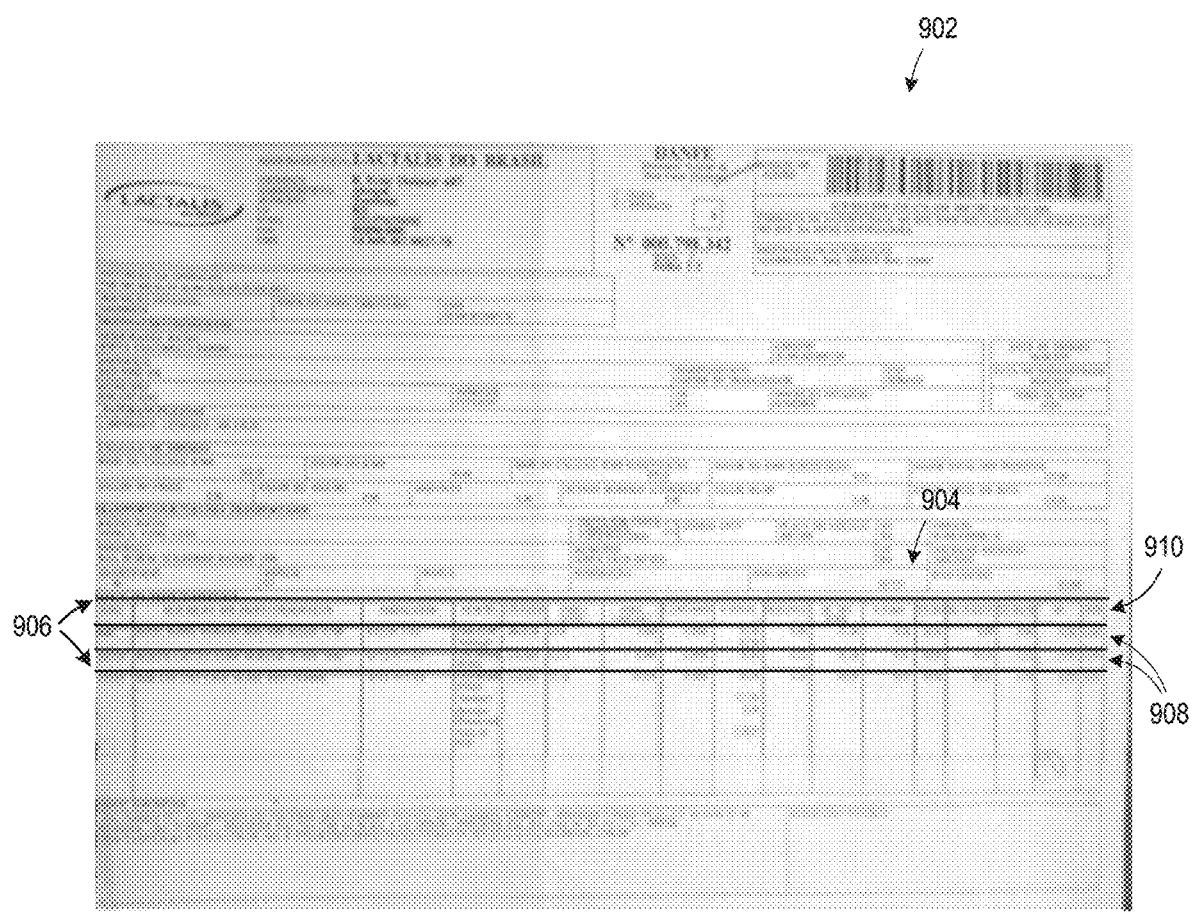
FIG. 9 illustrates an example output from the example row and cell identification circuitry of FIG. 6.

FIG. 9 illustrates an example invoice image 902 output by the example row identification circuitry 616 of FIG. 6. The invoice image 902 includes an example invoice table 904 in which purchase facts are typically contained. In the illustrated example of FIG. 9, example lines 906 identified by the row identification circuitry 616 represent limits of each example row 908 in the invoice table 904. As noted above, column headers are typically contained in a first row a table. As such, the row identification circuitry 616 identifies an example first row 910 of the invoice table 904. For example, the first row 910 can be identified by detecting a first (e.g., from a top) line 906 and a subsequent line 906. In other words, the column headers are identified by combining column detection information from the column detection circuitry 606 jointly with the rows 908 detected using heuristics. However, prior to classifying the columns using the headers, cells within the table 904 can be detected to identify words within cells of at intersections of the rows and columns.

Referring again to FIG. 6, the row and cell detection circuitry 612 includes example cell identification circuitry 618, which is structured to identify cells within the table, defined by intersections of detected columns and rows. In some examples, the cell identification circuitry 618 is instantiated by processor circuitry executing cell identification instructions and/or configured to perform operations such as those represented by the flowchart of FIG. 23. In some examples, the cell identification circuitry 618 identifies cells by determining boundaries for the columns detected by the column detection circuitry 606 and the rows detected by the row identification circuitry 616. As noted above, a table includes a target number of rows corresponding to a mode number of words that correspond to numbers across the detected columns. In some examples, columns that include the target number of rows are representative columns. The boundaries of the representative columns can be determined using coordinates of such columns. In some examples, boundaries of columns that are not representative columns can be determined by identifying a closest representative column and using the representative column as a reference of the non-representative column boundary coordinates. That is, the cell identification circuitry 618 can assign the boundaries of the closest representative column to the non-representative column. In some examples, the row boundaries are determined using the slopes computed by the row identification circuitry 616.

In some examples, the cell identification circuitry 618 determines boundaries of each cell by interesting a region of a column and a row. The cell identification circuitry 618 determines text within each cell by concatenating each word positioned within the cell's boundaries. For example, the cell identification circuitry 618 can apply an algorithm to the words within each cell that sorts the words in an X-Y plane using a median of a word's height as line height for grouping words horizontally. In some examples, the cell identification circuitry 618 determines that a word is inside a cell if the Y-coordinate of the word's centroid is inside the vertical limits.

In some examples, the row and cell detection circuitry 612 identifies headers within a table of an invoice as a first row of the table that does not include a number. In some examples, the row and cell detection circuitry 612 identifies the additional rows by identifying lines that contain at least one number in at least one column.

The classification circuitry 610 receives the detected rows, including the first row of detected headers, from the row and cell detection circuitry 612. In some examples, the classification circuitry 610 applies an example NLP-based model to classify the columns into the different types of facts using the detected column headers. For example, the columns can be classified into different product facts, such as code, description, quantity and price. In some examples, other headers that do not fall into the purchase facts of interest are not considered. In some examples, such columns are tagged as "out of scope."

To classify the columns based on the headers, the classification circuitry 610 includes an example column classification model(s) 620, which is a trained AI model that classifies text data output by the OCR circuitry 604. In some examples, the column classification model 620 is based on a simple neural network that contains one layer, such as fastText, fastText is an open-source library for learning of word embeddings and text classification that can be used to train large datasets quickly and efficiently. In some examples, the column classification model 620 is trained to generate a bag-of-words representation of text within a header and to fetch embeddings for each word. In some examples, the column classification model 620 is trained to average the embeddings to obtain a single embedding for the whole text in the hidden layer. Once the averaged embeddings are computed, a single vector can be fed to a linear classifier that applies softmax. In some examples, the column classification model 620 applies character n-grams, which are beneficial for classification that usually contains one or several descriptive words and may also include typos from the OCR.

In some examples, the classification circuitry 610 includes example detail extraction circuitry 622, which is structured to identify additional facts of interest outside the main invoice table, such as an invoice number and invoice date associated with an invoice image. The invoice number and invoice date are facts with simple, predefined formats that can be easy to recognizes using, for example, a regular expression (e.g., regex). In some examples, the detail extraction circuitry 622 is implemented as a regex engine. As disclosed herein, a regex is a sequence of characters that specifies a search pattern that can be used to match and locate text. For example, if a string of characters in the OCR output matches the invoice number regex, the text can be extracted and classified as an invoice number. The detail extraction circuitry 622 can include regex for an invoice number, a date, and/or other facts of interest to the market research entity 102.

Figure 10:
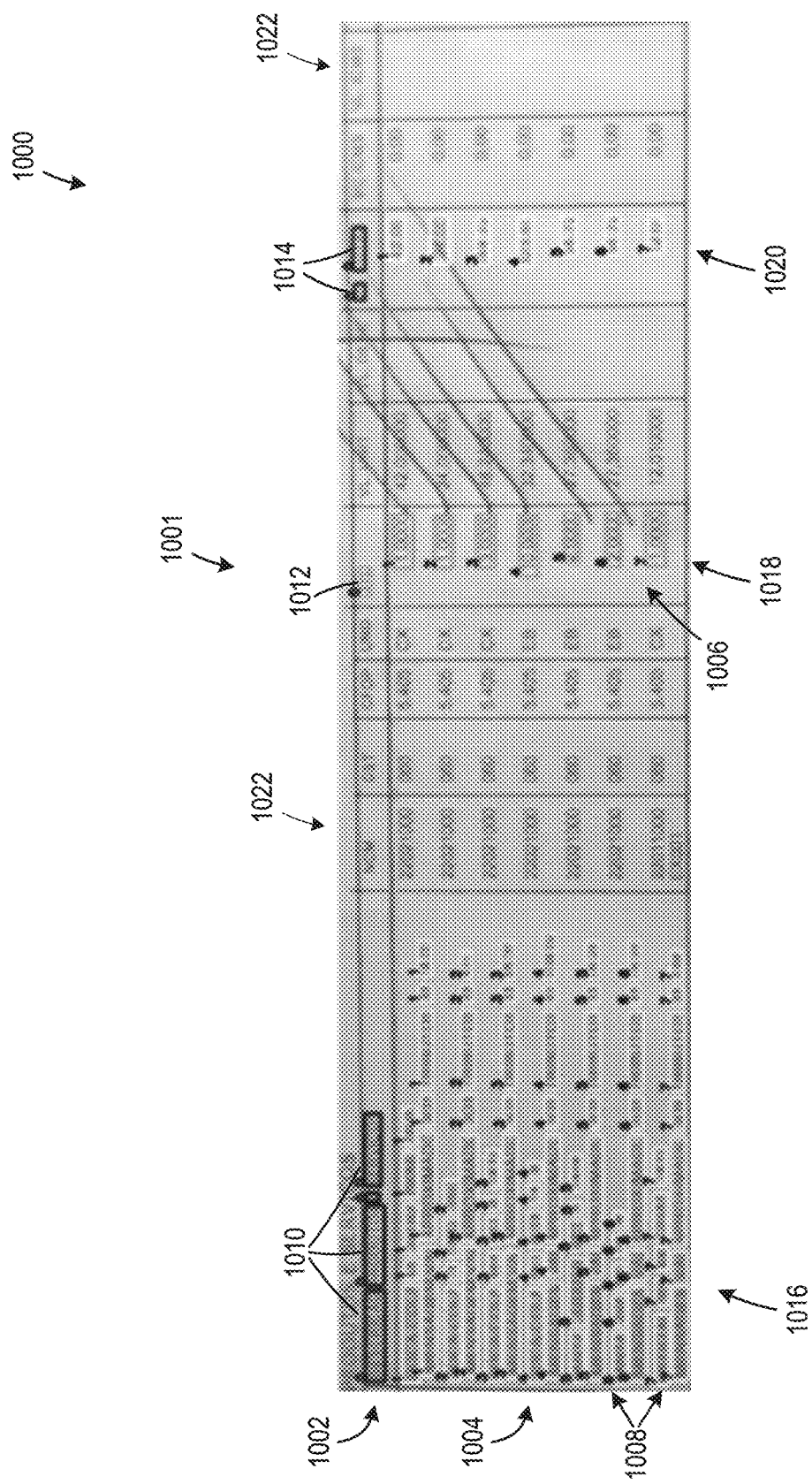
FIG. 10 illustrates an example output from the example column detection circuitry of FIG. 6.

FIG. 10 depicts an example output 1000 of the classification circuitry 610 of FIG. 6. The output 1000 corresponds to an example invoice table 1001 of an invoice image. The output 1000 includes an example first row 1002 that includes columns headers and other examples rows 1004 that include purchase facts. As illustrated in FIG. 10, the invoice table 1001 includes an example mode 1006 number of rows, which is seven rows. Accordingly, in some examples, more than one example line 1008 can correspond to a product row 1004.

In the illustrated example of FIG. 10, the output 1000 includes an example product description header 1010, an example quantity header 1012, and an example price header 1014. The product description header 1010 corresponds to an example product description column 1016 that includes products descriptions of purchased products memorialized in the invoice table 1001. The quantity header 1012 corresponds to an example quantity column 1018 that includes a quantity for each purchased product memorialized in the invoice table 1001. The price header 1014 corresponds to an example price column 1020 that includes prices paid for the purchased products memorialized in the invoice table 1001. Product codes are not available in the example invoice table 1001 of FIG. 10. However, additional or alternative examples can include a product code header corresponding to a product code column that includes product codes of purchased products. In the invoice table 1001 of FIG. 10, other example columns 1022 are not of interest and are thus designated as out of scope.

Figure 11:
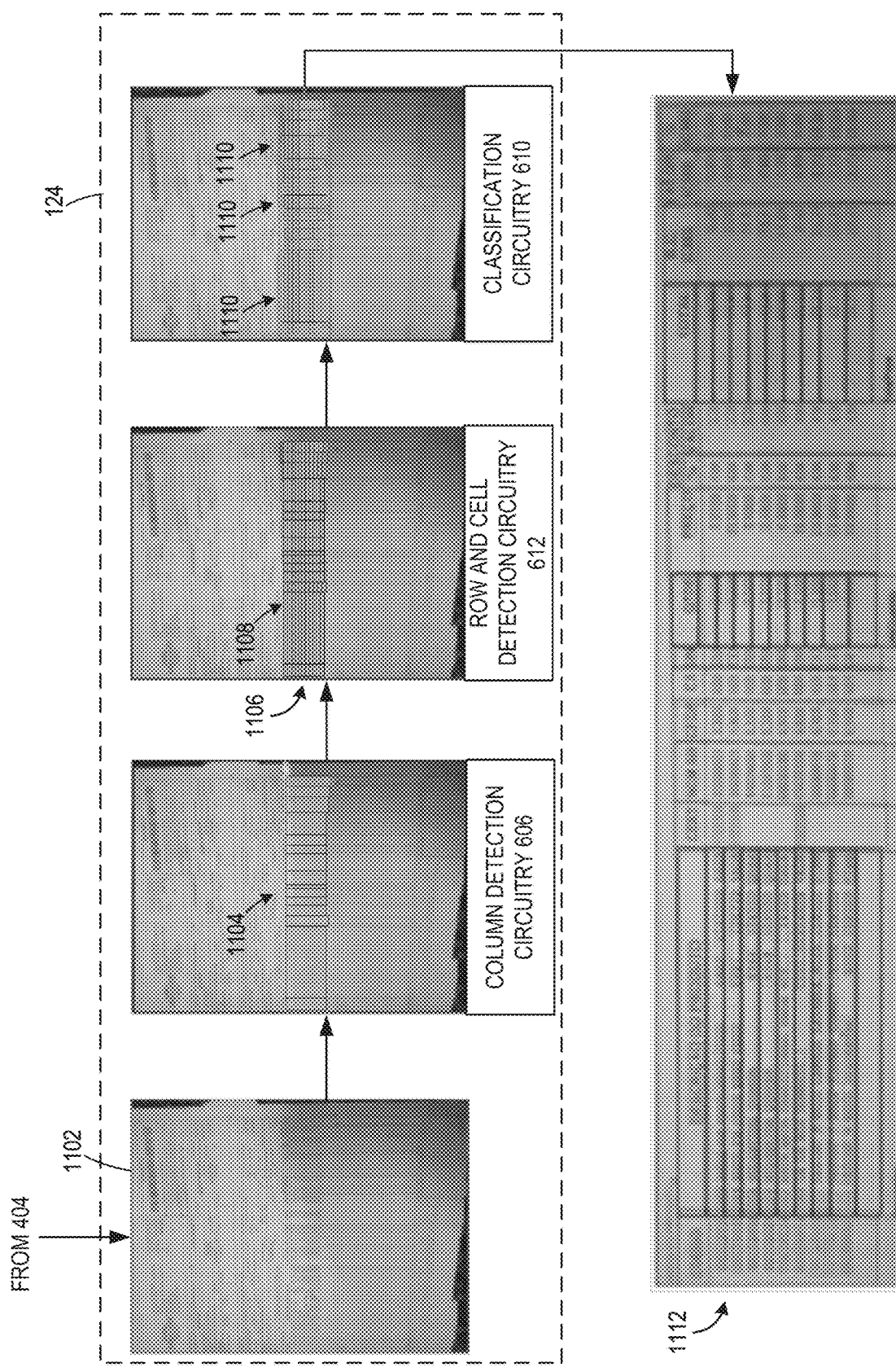
FIG. 11 is a block diagram of the example invoice pipeline of FIGS. 1 and 6.

FIG. 11 is an illustration of an example flow of the invoice pipeline 124 of FIGS. 1 and/or 4, from input to output in accordance with the teachings of this disclosure. The example OCR circuitry 604 of FIG. 6 provides an example input to the invoice pipeline 124 that includes an example invoice image 1102 and corresponding extracted text. In some examples, the main steps of the invoice pipeline 124 are column detection and classification. However, column classification necessitates an intermediate row detection process.

In some examples, the example column detection circuitry 606 applies an example column detection model 608 to the invoice image 1102 to detect example columns 1104. In some examples, the column detection circuitry 606 outputs the columns 1104, which can be represented as polygonal regions (e.g., bounding boxes) with corresponding coordinates. The bounding boxes and coordinates can be input for the row and cell detection circuitry 612, which applies a row detection process to the input. The row and cell detection circuitry 612 applies different techniques to the input and outputs example rows and cells 1106 representing rows and cells in an invoice table of the invoice image 902.

Detecting the rows and cells 1106 enables the classification circuitry 610 to identify and classify column headers corresponding to products facts. Thus, the classification circuitry 610 receives the detected rows and cells 1106 and applies an example column classification model 620 to text in the columns 1104 and rows and cells 1106. In this manner, the column classification circuitry 610 can classify the detected columns by classifying text in cells within an example first detected row 1108, which correspond to headers of the columns. In some examples, the classification circuitry 610 outputs example classified columns 1110 that correspond to facts columns that include purchase facts of interest. In some examples, the invoice pipeline 124 outputs an example invoice table 1112 that includes machine-readable text of interest in cells within the facts columns 1110. That is, the invoice pipeline 124 outputs extracted purchase facts from an invoice image 902.

Referring again to FIG. 6, techniques applied by components of the invoice pipeline 124 may not be effective when applied to receipts. As noted above, receipts do not typically contain purchase facts in a table structure as invoices do. As such, the fact extraction circuitry 122 includes the receipt pipeline 126, which applies different techniques to the extraction of purchase facts from receipt. In some examples, at least one objective of the receipt pipeline 126 is to identify purchase facts included in a receipt, which are focused on product codes, descriptions, quantities and prices.

The fact extraction circuitry 122 includes example entity tagger circuitry 624, which is structured to detect and tag specific text (e.g., words) corresponding to facts of interest within an image of a receipt. In some examples, the entity tagger circuitry 624 is instantiated by processor circuitry executing entity tagger instructions and/or configured to perform operations such as those represented by the flowchart of FIG. 24. The entity tagger circuitry 624 receives a receipt image and respective text data extracted by the OCR circuitry 604. In some examples, the entity tagger circuitry 624 detects and tags text of interest (e.g., text corresponding to a purchase fact) by applying a trained AI model to the input (e.g., text data and image). Accordingly, the entity tagger circuitry 624 includes an example entity tagger model(s) 626. In some examples, the entity tagger model(s) 626 is trained using receipts obtained and/or labelled by the market research entity 102.

In some examples, the entity tagger model 626 is a key information extraction (KIE) model based on CV and NLP techniques. KIE as disclosed herein refers to a process of parsing through unstructured data to identify, classify, and extract entities (e.g., purchase facts, information of interest, etc.). At least one goal of KIE is to extract a number of key fields from a given document, and to save text of interest to a structured document. Fully and efficiently exploiting both textual and visual features of a receipt image to obtain a rich semantic representation that is crucial for KIE is a challenge.

In some examples, the entity tagger model 626 applies an architecture based on processing KIE from documents using improved graph learning-convolutional networks (e.g., PICK). It is understood, however, that other ML architectures can be used in additional or alternative examples, such a Named Entity Recognition (NER), DeepReader, Chagrid, etc. PICK is a framework that is effective and robust in handling complex documents layout for KIE, yielding a richer semantic representation containing textual and visual features and global layout without ambiguity. PICK is an architecture that includes three main components, including encoder circuitry, graph circuitry, and decoder circuitry. The encoder circuitry encodes text segments using a transformer to generate text embeddings. The transformer processes an input text sequence to generate rich embeddings for each token. For example, the transformer can convert text data into tokens, which are part of a fixed vocabulary. The tokens can be converted into embedding vectors using a fixed representation. The transformer also adds a positional encoding vector to each token embedding, obtaining a special embedding with positional information. The encoder circuitry encodes image segments using a CNN to obtain image embeddings. The text segments and image segments stand for textual and morphology information individually. The two types of embeddings are combined into a new local representation X. The graph circuitry catches a latent relation between nodes and to obtain a richer graph embeddings representation of nodes through improved graph learning convolutional operation. Bounding boxes containing layout context of the purchase document are also modeled into the graph embeddings so that the graph circuitry can get non-local and non-sequential features. The decoder circuitry performs sequence tagging on the union non-local sentence at character-level. A PICK architecture can thus enable the entity tagger model 626 to transform KIE tasks into a sequence tagging problem by considering the layout information and the global information of the purchase document.

The entity tagger model 626 is applied to the text data output by the OCR circuitry 604 and to the receipt image. The entity tagger model 626 process the text data and the receipt image and outputs tagged entities corresponding to the purchase facts.

Figure 12:
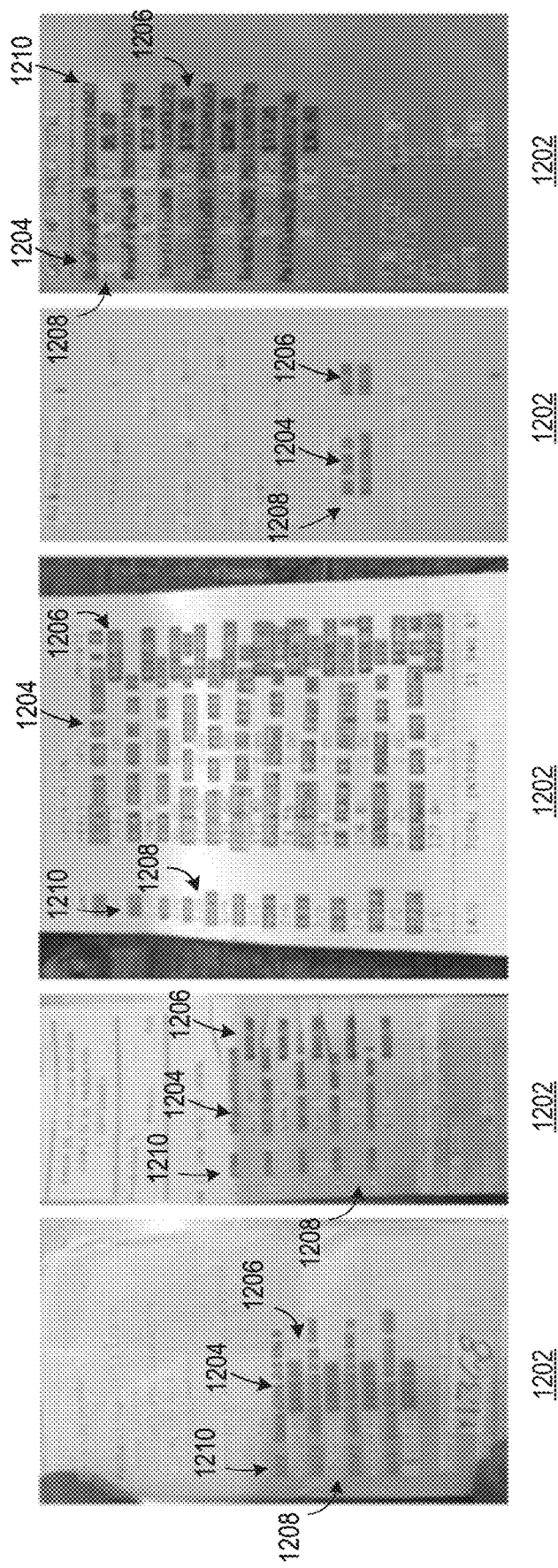
FIG. 12 illustrates example outputs of an example entity tagger model trained in accordance with the teachings of this disclosure.

FIG. 12 depicts example receipt images 1202 that can be output by the entity tagger circuitry 624 in accordance with the teachings of this disclosure. As illustrated in FIG. 10, receipts can include different information that is organized in different formats. All this variation leads to a difficult extraction process in which specific words are tagged as facts of interest. The receipt images 1202 output by the entity tagger circuitry 624 include example product descriptions 1204, example prices 1206, example quantities 1208, and/or example product codes 1210.

Referring again to FIG. 6, the purchase facts tagged by the entity tagger circuitry 624 may not be useful until the purchase facts are associated with purchased products listed in the receipt image. In some examples, the purchase facts and the purchased products are linked by means of line detection. Accordingly, the fact extraction circuitry 122 of FIG. 6 includes example line detection circuitry 628, which is structured to detect lines within the receipt image to facilitate matching of the extracted facts identified by the entity tagger circuitry 624 and a product of reference. In some examples, the line detection circuitry 628 is instantiated by processor circuitry executing line detection instructions and/or configured to perform operations such as those represented by the flowchart of FIG. 24.

The line detection circuitry 628 receives the receipt image and respective text data extracted by the OCR circuitry 604. In some examples, the line detection circuitry 628 identifies lines by applying an AI model based on a graph network to the input (e.g., text data and image). Accordingly, the line detection circuitry 628 includes an example line detection model(s) 630. In some examples, the line detection model(s) 630 is trained using receipts obtained and/or labelled by the market research entity 102. In some examples, the line detection model 630 is based on a graph neural network (GNN) architecture. GNN is an architecture based on graph networks. In some examples, the GNN is a better alternative to standard neural networks for table recognition. A GNN architecture combines the benefits of CNNs for visual feature extraction and graph networks for detecting structure.

In some examples, the line detection model 630 extracts a feature map from a purchase document image using a CNN. Text (e.g., words) extracted by the OCR circuitry 604 is used to identify words' positions. Example image features corresponding to the words' positions can be gathered and concatenated with positional features from the feature map to form input features for an interaction network. The interaction network can then be applied to the input features to generate representative features that include vertices (e.g., words) connected by edges. For each vertex (e.g., word), sampling is applied individually for cell classification, row classification, and column classification. The representative features for each sample pair are concatenated again and used as input for dense nets. The dense nets are different for rows, columns, and cells sharing. Sampling is only done during the training. During the inference, each vertex pair is classified.

Figure 13:
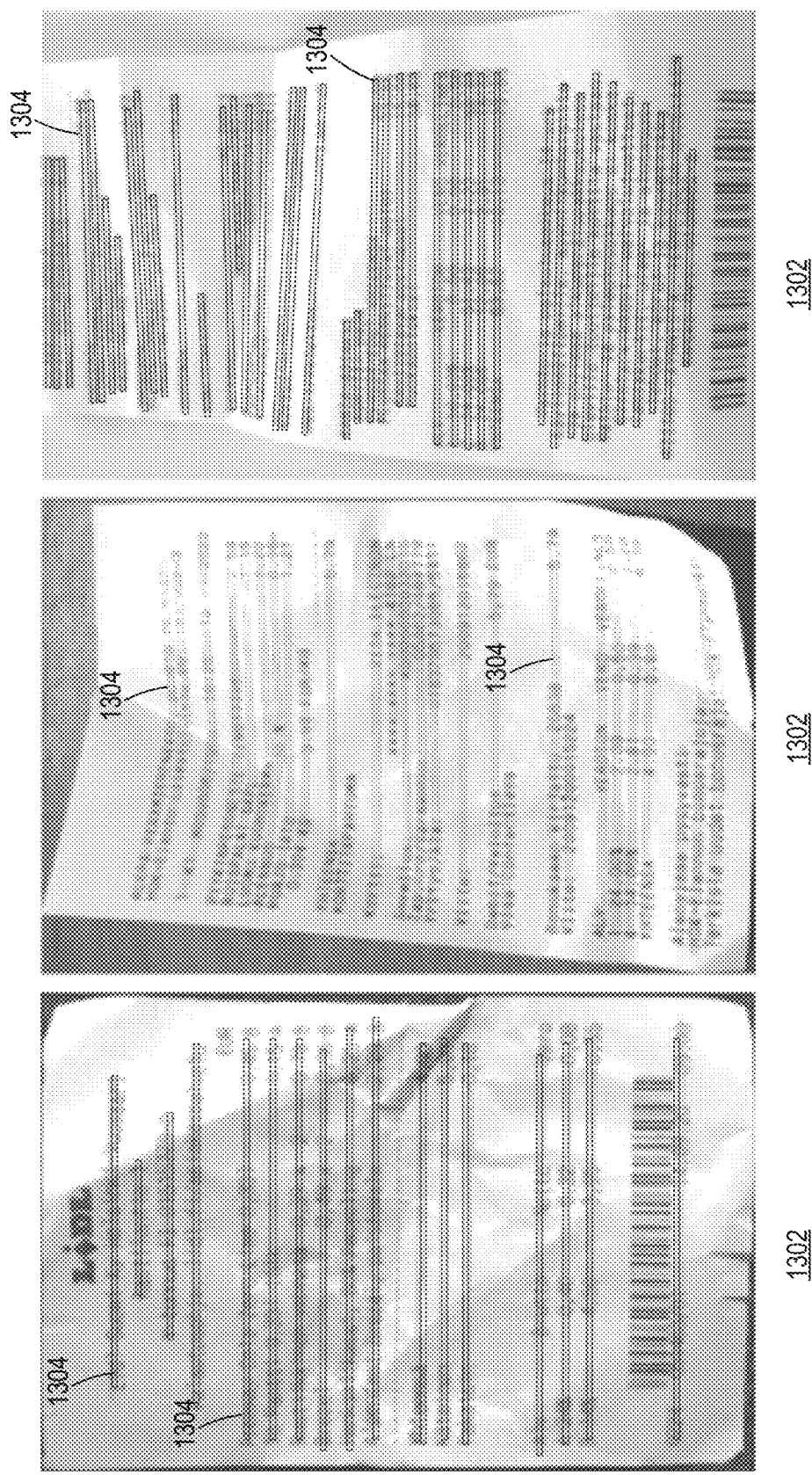
FIG. 13 illustrates example outputs of an example line detection model trained in accordance with the teachings of this disclosure.

FIG. 13 illustrates example receipt image 1302 that can be output by the line detection circuitry 628 in accordance with the teachings of this disclosure. That is, the line detection circuitry 628 applied an example line detection model 630 to the receipt images 1302. The output receipt images 1302 include example bounding boxes 1304 (e.g., line bounding boxes) corresponding to lines within the receipt images 1302. The line detection model 630 properly fit the bounding boxes 1304 corresponding to the lines included in the receipt images 1302.

Referring again to FIG. 6, the fact extraction circuitry 122 includes example product line generator circuitry 632, which is structured to detect a region of interest from an input invoice image. In some examples, the product line generator circuitry 632 is instantiated by processor circuitry executing product line generator instructions and/or configured to perform operations such as those represented by the flowchart of FIG. 24. After the inference step of the line detection model 630, a post-processing technique based on heuristics is applied to group product lines. In some examples, the product line generator circuitry 632 sorts each line bounding vertically on bounding box coordinates of the lines (e.g., from top to down in Y axis).

In some examples, the product line generator circuitry 632 identifies each line bounding box that includes a product description tag. For example, the product line generator circuitry 632 can identify a first example line detected by the line detection circuitry 628. The product line generator circuitry 632 can determine whether the first line includes an entity for a product description. If the first line does not include a product description entity, the product line generator circuitry 632 identifies a second example line that is vertically adjacent the first line to determine whether the second line includes a product description entity. The product line generator circuitry 632 may search each line until identifying a line with a product description.

When the product line generator circuitry 632 identifies a first product description line (e.g., a line having a product description tag), the product line generator circuitry 632 can determine whether the product description line includes another tagged entity (e.g., product quantity, a product price, product codes, etc.). In some examples, if the product line generator circuitry 632 identifies the other tagged entity(ies), the product line generator circuitry 632 determines that the first product description line includes the purchase facts for a product and saves the first product description line as an individual product line. If the first product description line does not include the other tagged entity(ies), the product line generator circuitry 632 can determine whether a next, (e.g., vertically adjacent) line contains another product description and/or another entity tag. If the product line generator circuitry 632 determines that the next line includes another entity tag that is not a product description and/or other (e.g., untagged) information, the product line generator circuitry 632 determines that the next line corresponds to the first product description line. In some such examples, the product line generator circuitry 632 closes a group of lines that includes the first product description line and the vertically adjacent line and saves the group of lines as corresponding to a same product. In some examples, the product line generator circuitry 632 can continue searching vertically adjacent lines until identifying a second product description. In some examples, when the product line generator circuitry 632 identifies a line that includes another product description entity, the product line generator circuitry 632 closes the group of lines group of lines that includes the first product description line and the vertically adjacent line and saves the group of lines a corresponding to the same product. In some examples, the product line generator circuitry 632 closes and saves each line as corresponding to a same product until identifying a second product description line. In some examples, this process repeats until each line is grouped and/or searched. For example, when the product line generator circuitry 632 identifies the second product description line, the product line generator circuitry 632 may group the second product description line with a vertically adjacent line that includes another entity tag that is not a product description. In some examples, if the vertically adjacent line includes another entity tag that is a product description, the product line generator circuitry 632 identifies the product description line at a product line. In some examples, product line generator circuitry 632 may group each vertically adjacent line until identifying a third product description line.

In some examples, the product line generator circuitry 632 combines bounding boxes of grouped lines to generate product line bounding boxes. In some examples, each product line bounding box corresponds to a single product and includes purchase facts for the product. In some examples, the product line generator circuitry 632 outputs the detected purchase facts for a receipt image.

Figure 14:
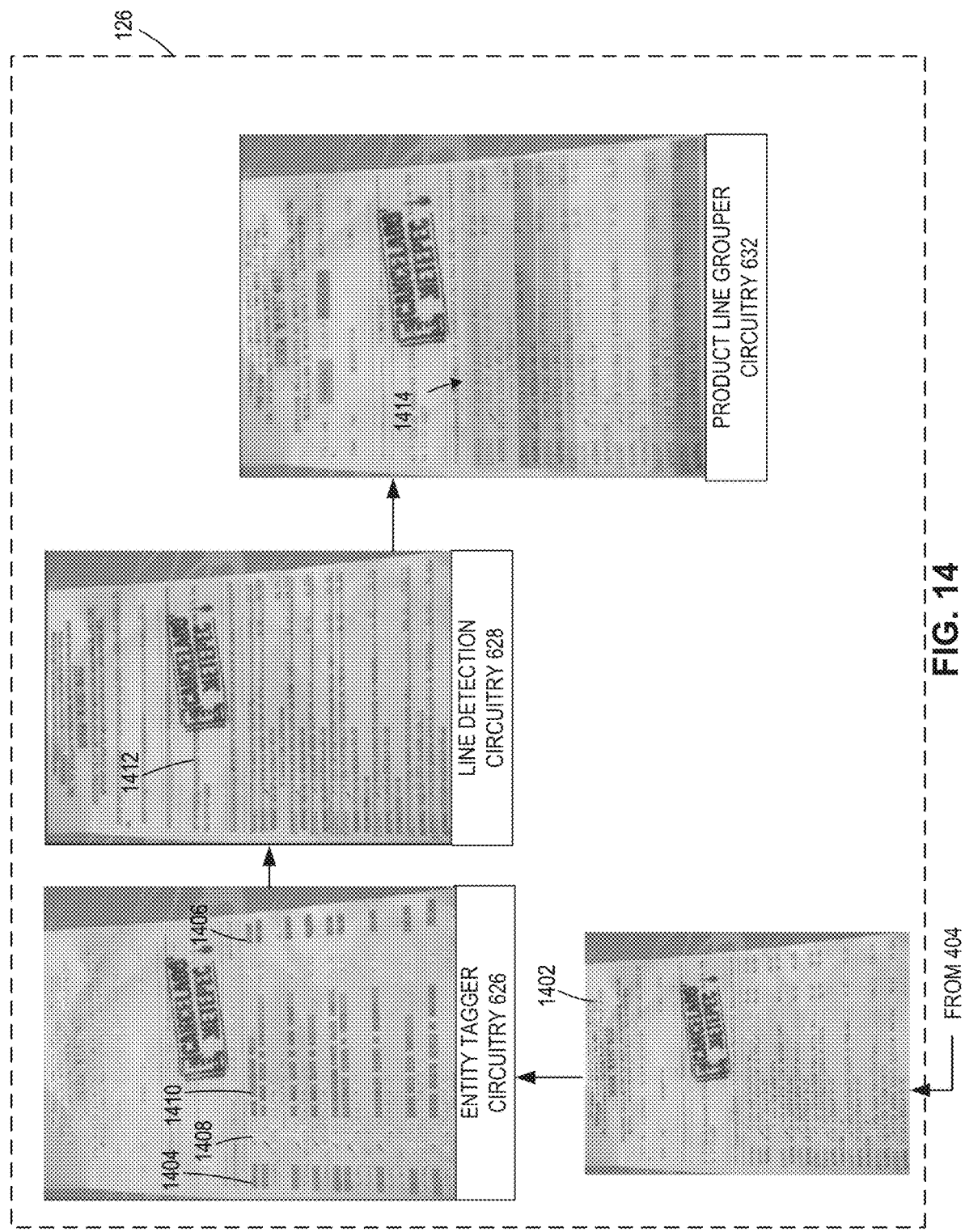
FIG. 14 is a block diagram of the example receipt pipeline of FIGS. 1 and 6.

FIG. 14 is an illustration of an example flow of the receipt pipeline 126 of FIGS. 1 and/or 4, from input to output in accordance with the teachings of this disclosure. The example OCR circuitry 604 of FIG. 6 provides an example input to the receipt pipeline 126 that includes an example receipt image 1402 and corresponding extracted text.

In some examples, the example entity tagger circuitry 624 applies an example entity tagger model 626 to the receipt image 1402 to tag specific words (e.g., word bounding boxes) detected by the OCR circuitry 604 that correspond to purchase facts. In some examples, the entity tagger circuitry 624 outputs the receipt image with tagged purchase facts, such as example product codes 1404, example prices 1406, example quantities 1408, and/or example product descriptions 1410. The tagged purchase facts 1404, 1406, 1408, 1410 and receipt image 1402 are input to the example line detection circuitry 628, which outputs examples lines 1412. After post-processing steps are applied by the example product line generator circuitry 632, the receipt pipeline 126 outputs an example product lines 1414 that include machine-readable text of interest. That is, the receipt pipeline 126 outputs extracted purchase facts from an receipt image 1402.

In some examples, the fact extraction circuitry 122 includes means for extracting text from an image. For example, the means for extracting may be implemented by OCR circuitry 604. In some examples, the OCR circuitry 604 may be instantiated by processor circuitry such as the example processor circuitry 2612 of FIG. 26. For instance, the OCR circuitry 604 may be instantiated by the example microprocessor 2700 of FIG. 27 executing machine executable instructions such as those implemented by at least blocks 2204 of FIG. 22. In some examples, the OCR circuitry 604 may be instantiated by hardware logic circuitry, which may be implemented by an ASIC, XPU, or the FPGA circuitry 2800 of FIG. 28 structured to perform operations corresponding to the machine readable instructions. Additionally or alternatively, the OCR circuitry 604 may be instantiated by any other combination of hardware, software, and/or firmware. For example, the OCR circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the fact extraction circuitry 122 of FIG. 1 is illustrated in FIG. 6, one or more of the elements, processes, and/or devices illustrated in FIG. 6 may be combined, divided, re-arranged, omitted, eliminated, and/or implemented in any other way. Further, the example document identifier circuitry 602, example OCR circuitry 604, example column detection circuitry 606, example row and cell detection circuitry 612, example classification circuitry 610, example entity tagger circuitry 624, example line detection circuitry 628, example product line generator circuitry 632, and/or, more generally, the example fact extraction circuitry 122 of FIG. 1, may be implemented by hardware alone or by hardware in combination with software and/or firmware. Thus, for example, any of the example document identifier circuitry 602, example OCR circuitry 604, example column detection circuitry 606, example row and cell detection circuitry 612, example classification circuitry 610, example entity tagger circuitry 624, example line detection circuitry 628, example product line generator circuitry 632, and/or, more generally, the example fact extraction circuitry 122, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example fact extraction circuitry 122 of FIG. 1 may include one or more elements, processes, and/or devices in addition to, or instead of, those illustrated in FIG. 6, and/or may include more than one of any or all of the illustrated elements, processes and devices.

Figure 15:
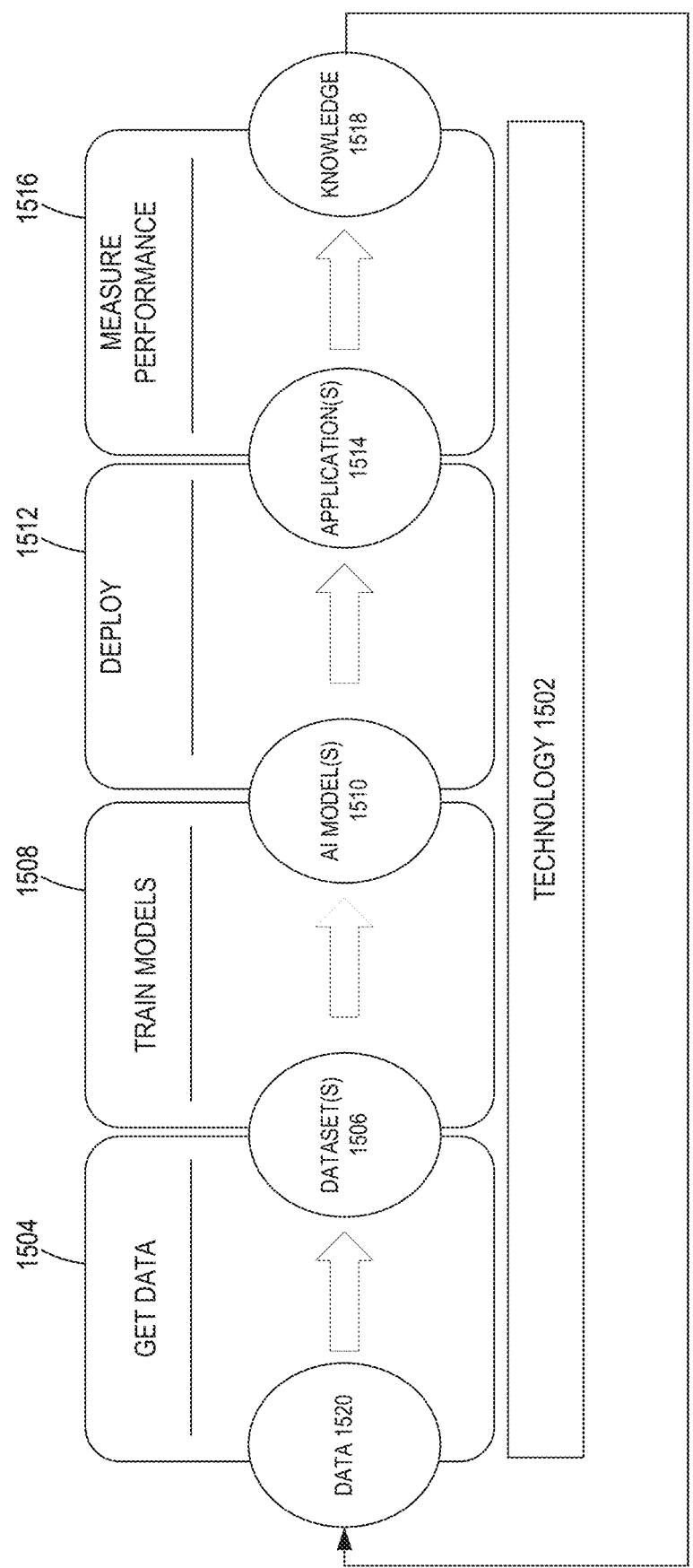
FIG. 15 depicts an example cyclical process of the document decode system of FIG. 1.

FIG. 15 depicts an example cyclical process 1500 of the document decode system 100 of FIG. 1. The cyclical process 1500 revolves around various technologies 1502, which are uniquely combined to process purchase document images in accordance with the teachings of this disclosure. The cyclical process 1500 begins when the document decode system 100 receives data 1504. The document decode system 100 utilizes different AI and ML models based on CV and NLP, which are trained using the labeled data 1504. After the data 1504 is received, the document decode system 100 analyzes the data, processes the data, and/or generates datasets 1506, which can be used to train AI models 1508. The machine learning circuitry 136 uses the datasets 1506 to train AI and/or ML models 1510. In some examples, the machine learning circuitry 136 evaluates architectures, trains AI models 1510, and/or evaluates performance of those AI models 1510.

The document decode system 100 deploys 1512 the AI models 1510 for use in decoding purchase documents. For example, the AI models 1510 may be used by developed, scalable components, by microservice applications 1514, by mobile applications (e.g., installed on a cellphone, etc.), used as complementary software, and/or integrated with other systems. As the AI models 1510 are deployed, the performance monitor circuitry 134 measures performance 1516 of the AI models 1510. For example, the performance monitoring circuitry 134 may receive feedback regarding the AI models 1510 from a labelling team (e.g., via the label annotation circuitry 138), from software components of the document decode system 100, etc. In some examples, the performance monitor circuitry 134 measure real impact costs and/or benefits of the AI models 1510. In some examples, the performance monitor circuitry 134 is able to identify a fail fast. After acquiring knowledge 1518 in the form of feedback, monitoring, measuring performance, etc. the document decode system 100 generates additional data 1520 that can be analyzed, processed, and/or used to generates dataset 1506. Simply put, the document decoder circuitry 116 utilizes an ML solution that can be represented as a cyclical process where data is received (e.g., invoice images, receipts images, etc.), ML models are trained and deployed, KPIs are measured and the cycle repeats using data labeled during the previous cycle.

Figure 16:
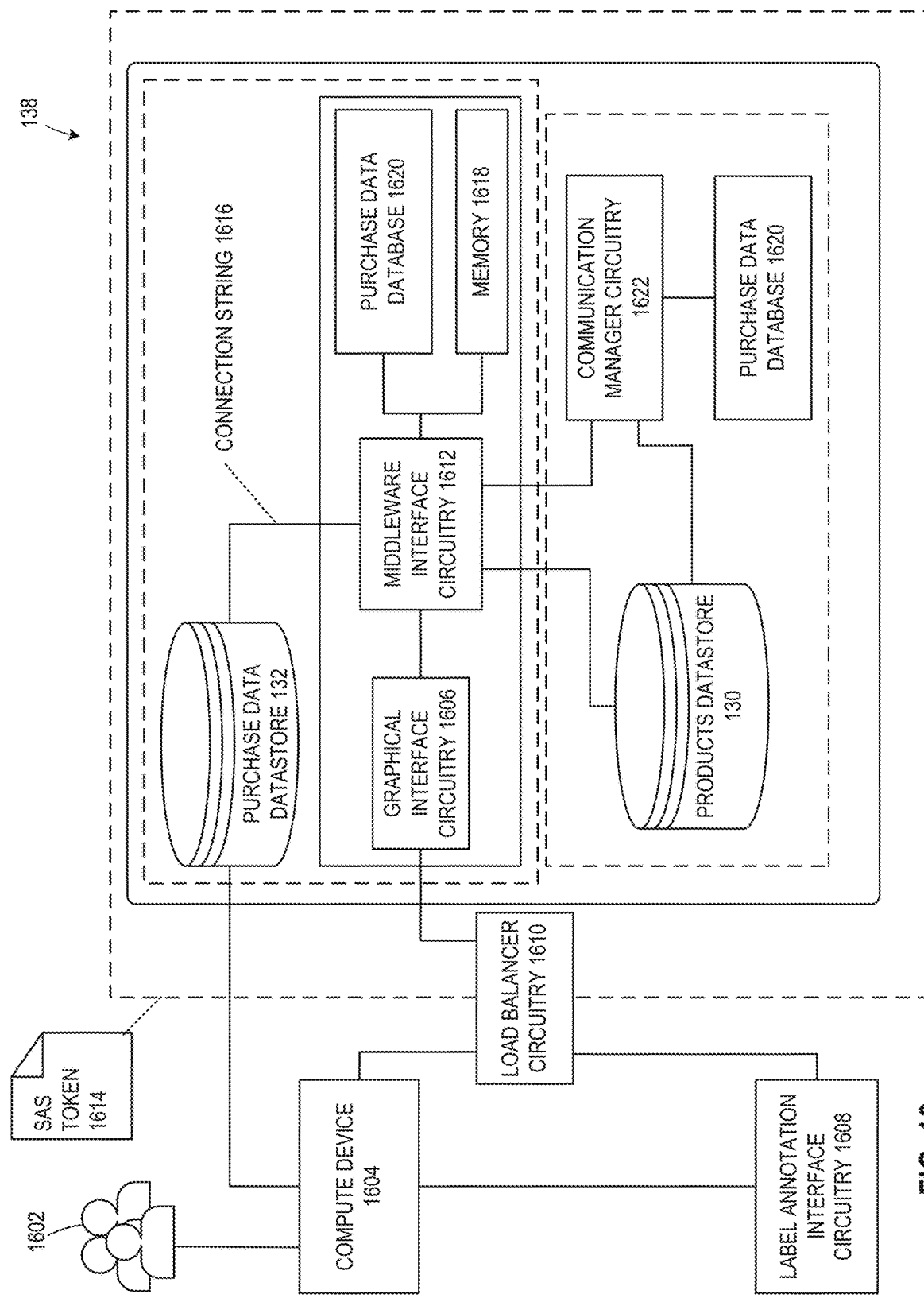
FIG. 16 is a block diagram of an example label annotation system in accordance with the teachings of this disclosure.

FIG. 16 is a block diagram of the example label annotation circuitry 138 of FIG. 1 constructed in accordance with the teachings of this disclosure. As discussed above, the document decoder circuitry 116 of FIG. 1 extracts purchase facts and generates purchase data by associated purchase facts with products. The document decoder circuitry 116 stores the image and associated data (e.g., metadata, extracted purchase facts, decoded purchase data, etc.) in the example purchase data datastore 132 of FIG. 1. An example labelling team 1602 that includes at least one labeler can access the image and associated data in the purchase data datastore 132 via the label annotation circuitry 138 to review the predicted regions, facts, and text to provide final annotations.

As illustrated in FIG. 16, the labelling team 1602 can utilize an example compute device(s) 1604 to access the label annotation circuitry 138. The compute device 1604 can be, for example, a personal computing (PC) device such as a laptop, a smartphone, an electronic tablet, a hybrid or convertible PC, etc. The labelling team 1602 can utilize the compute device(s) 1604 to access example label annotation interface circuitry 1608.

The label annotation circuitry 138 includes the example graphical interface circuitry 1606, which is structured to cause a presentation of data to the labelling team 1602. In some examples, the graphical interface circuitry 1606 is instantiated by processor circuitry executing graphical interface instructions and/or configured to perform operations such as those represented by the flowchart of FIG. 25.

The label annotation circuitry 138 includes the example label annotation interface circuitry 1608, which provides an interface through which the labelling team 1602 can access (e.g., via the compute device 1604) processed images and associated data. In some examples, the label annotation interface circuitry 1608 is instantiated by processor circuitry executing label annotation interface instructions and/or configured to perform operations such as those represented by the flowchart of FIG. 25. In some examples, the label annotation interface circuitry 1608 is an API. In some examples, the label annotation interface circuitry 1608 provides an example log-in page (e.g., via the graphical interface circuitry 1606) to the labeling team 1602. In some examples, the label annotation interface circuitry 1608 enables the labeling team 1602 to log into a respective account associated with label annotation circuitry 138 (e.g., by means of an example Virtual Private Network (VPN)). In some examples, an account for the tool is previously requested before using the label annotation circuitry 138 for a first time. After a first use, the labelling team 1602 can access the label annotation circuitry 138 by providing login information, such as email and password, to the label annotation interface circuitry 1608.

The label annotation circuitry 138 includes the example load balancer circuitry 1610, which is structured to distribute data across multiple servers. In some examples, the load balancer circuitry 1610 is instantiated by processor circuitry executing load balancer instructions and/or configured to perform operations such as those represented by the flowchart of FIG. 25. In some examples, the load balancer circuitry 1610 is positioned between the compute device 1604 associated with the labeling team 1602 and the label annotation circuitry 138.

The label annotation circuitry 138 includes the example middleware interface circuitry 1612, which is structured to connect internal and external components of the label annotation circuitry 138. In some examples, the middleware interface circuitry 1612 is instantiated by processor circuitry executing middleware interface instructions and/or configured to perform operations such as those represented by the flowchart of FIG. 25. Generally, middleware enables communication and data management for distributed applications. In the illustrated example of FIG. 16, the middleware interface circuitry 1612 provides a path across the purchase data datastore 132, the graphical interface circuitry 1606, the products datastore 130, and/or other components of the label annotation circuitry 138 through which data can easily be passed. For example, the middleware interface circuitry 1612 can be used to connect the label annotation circuitry 138 with the purchase data datastore 132, enabling presentation of images and associated data to the labeling team 1602 (e.g., via the graphical interface circuitry 1606 and compute device 1604).

In some examples, the middleware interface circuitry 1612 provides an example Shared Access Signature (SAS) token 1614 to the purchase data datastore 132 to retrieve an image and associated data that is ready for the labeling team 1602 to review. The SAS token 1614 provides secure, delegated access to resources in the purchase data datastore 132. For example, the SAS token 1614 can identify resources the labelling team 1602 can access in the purchase data database 1620, what permissions they have to those sources (e.g., read, write, etc.), and/or how long the SAS token 1614 is valid. The SAS token 1614 of FIG. 16 provides read-only privileges to purchase document images and associated data that have been output by the document decoder circuitry 116. In some examples, the SAS has an expiration time to prevent unauthorizes access to the purchase data datastore 132. For example, if the labeling team 1602 typically spends one hour on a labeling task, the SAS token 1614 can be configured to expire after one hour. However, the period of time can be longer or shorter in additional or alternative examples. In some examples, the middleware interface circuitry 1612 generates an example connection string 1616 based on the SAS token 1614 that connects the middleware interface circuitry 1612 and the purchase data datastore 132.

In some examples, the label annotation circuitry 138 includes example memory 1618, which is structured to provide in-memory cache data storage. For example, the memory 1618 can provide the purchase document data and associated data from the purchase data database 132 to the labeling team 1602 via an example purchase data database 1620. In some examples, the memory 1618 can query on specific dates or countries by means of SQL sentences, which obtain the data to be presented to the labeling team 1602 via the graphical interface circuitry 1606.

The label annotation circuitry 138 includes the example communication manager circuitry 1622, which facilitates communication between the middleware interface circuitry 1612 and the products datastore 130. In some examples, the communication manager circuitry 1622 is instantiated by processor circuitry executing communication manager instructions and/or configured to perform operations such as those represented by the flowchart of FIG. 25. As noted above, the products datastore 130 includes ElasticSearch technology, which facilitates searching of data in the products datastore 130. For example, the products datastore 130 can be searched to identify specific products to label. In some examples, the communication manager circuitry 1622 enables the labeling team 1602 to search the products datastore 130 to identify products detected by the document decode circuitry 116 with a goal of validating associations.

FIG. 17, is a schematic illustration of an example graphical window 1700 that can be provided by the graphical interface circuitry 1606 to facilitate work of labeling team 1602 in accordance with the teachings of this disclosure. The example graphical window 1700 can be used by the labeling team 1602 to perform different tasks, such as reviewing KPIs, a task list of pending (e.g., P) and completed (e.g., C) items, and to review the images and associated data. In the illustrated example of FIG. 17, the graphical window 1700 allows users to search for specific jobs according to dates, job identifiers, store identifiers, etc. Once the labeling team 1602 selects a job, the graphical window 1700 can present the corresponding image jointly with the predictions. In some examples, the graphical window 1700 allows the labeling team 1602 to review the image and predictions and perform different actions. For example, the labeling team 1602 can utilize the graphical window 1700 provided by the graphical interface circuitry 1606 to adjust bounding boxes that are improperly fitted, change a type of fact associated with a word (e.g., a product code, a product description, a quantity and/or a price), modify and/or add missing texts, remove wrongly detected items, etc.

Figure 18:
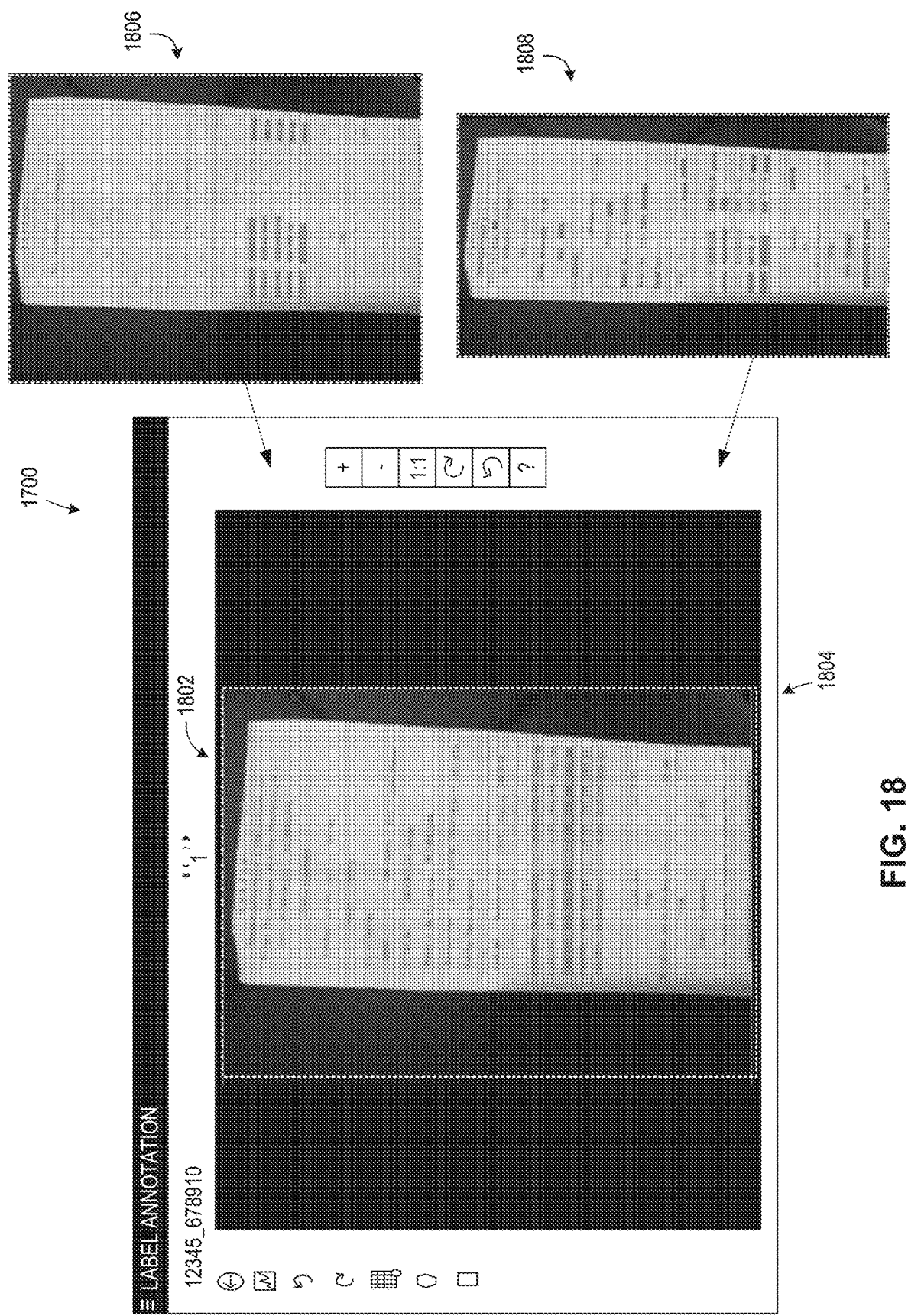
FIG. 18 is an illustration of another example graphical window of the example label annotation circuitry of FIGS. 1 and/or 16.

FIG. 18 is a schematic illustration of another example graphical window 1800 enabled by a graphical interface circuitry 1606. The graphical window 1800 illustrates an example receipt image 1802 that has been processed by the fact extraction circuitry 122 of FIGS. 1 and/4. To make easily enable the labelling team 1602 to review the processed image, the graphical window 1800 can provide different views of images. For example, the graphical window 1800 can provide an example row image 1804 corresponding to row regions, an example facts image 1806 corresponding to entities facts, and an example columns image 1808 corresponding to columns. The rows image 1804 enables the labelling team 1602 to review row detected by the example fact extraction circuitry 122. The facts image 1806 enables the labelling team 1602 to review facts tagged by the example fact extraction circuitry 122. The columns image 1808 enables the labelling team 1602 to review columns detected by the example fact extraction circuitry 122.

In the illustrated example of FIG. 18, the rows image 1804 is shown in the graphical window 1800. However, the fact image 1806 and/or the columns image 1808 can be positioned in the graphical window 1800 in additional or alternative examples. Further, example invoice images can be provided to the labeling team 1602 via the graphical window 1800 in additional or alternative examples.

Figure 19:
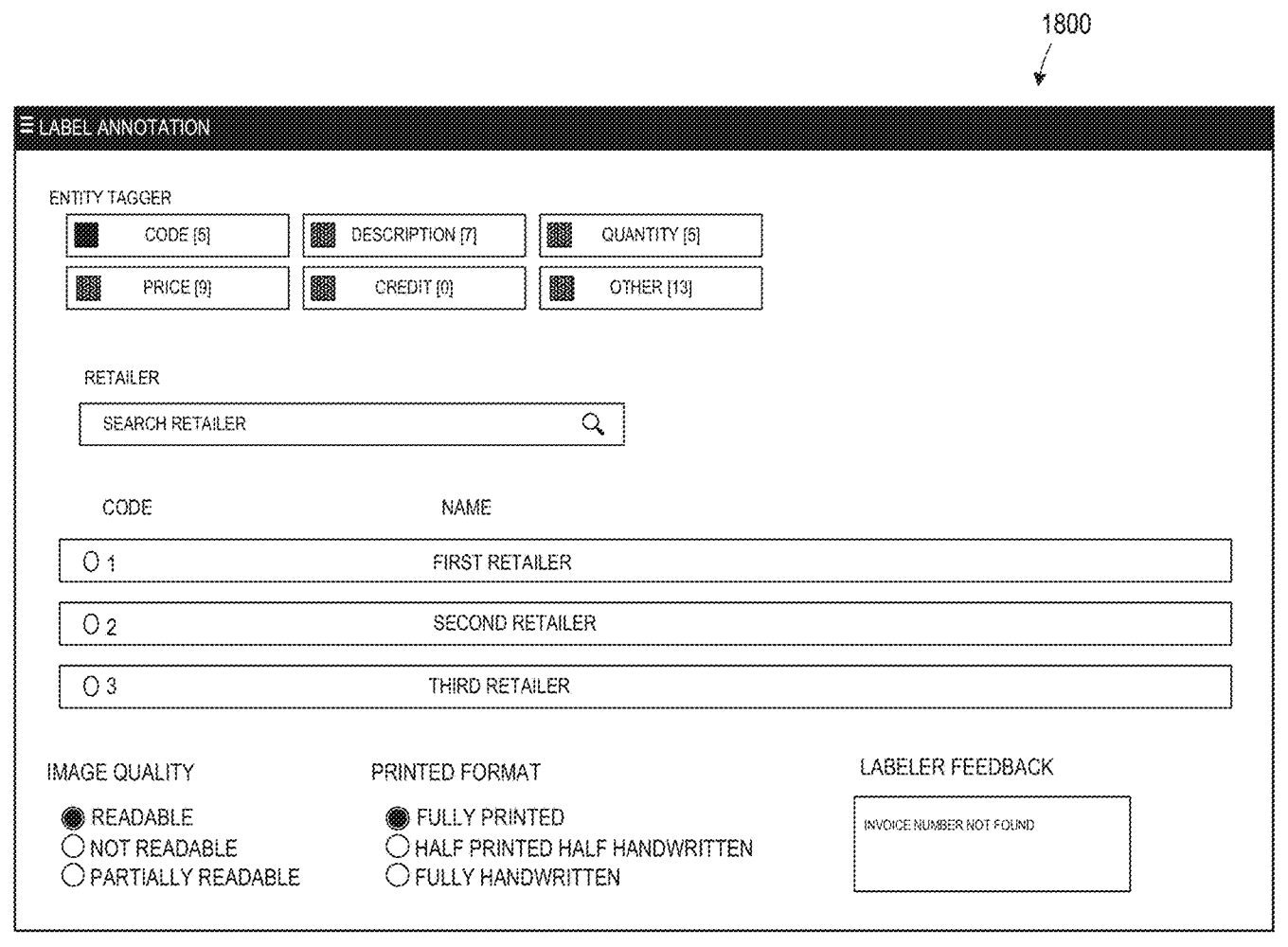

FIG. 19 is a schematic illustration of another example graphical window 1900 enabled by a graphical interface circuitry 1606. The graphical window 1900 provides additional functionalities enabled by the label annotation circuitry 138. In the graphical window 1900, the labeling team 1602 can review the purchase frame an image and/or suppliers related to products listed in a purchase document. In the illustrated example of FIG. 19, the graphical window 1900 enables the labeling team 1602 to define a quality of an image associated with a job. That is, the labeling team 1602 can label a purchase document image as readable (e.g., proper visibility), partially readable (e.g., some occlusions, difficult visibility, etc.), or not readable (e.g., complex visibility). Further, a printed format can be added, including fully printed (e.g., all text has a digital format), fully handwritten (e.g., all text has a handwritten format), or partially printed/partially handwritten (e.g., a mix of both types of text). In some examples, the labeling team 1602 can provide specific feedback to identify potential problems derived from predictions, the labeling process, and/or from the image quality and formats. In some examples, the feedback can be used to refine labeling in the next iterations.

Figure 20:
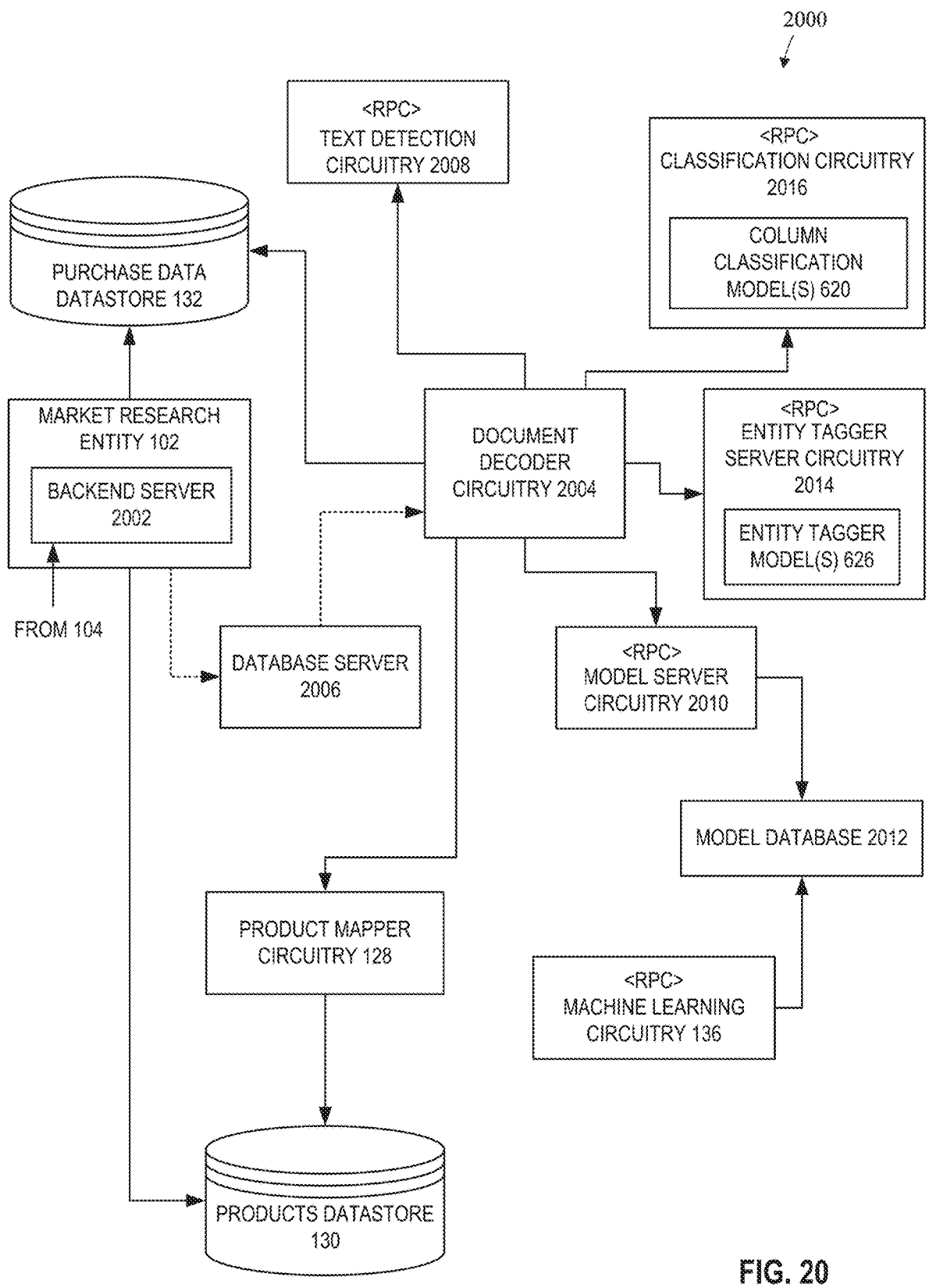
FIG. 20 is a block diagram of another example implementation of the example document decode system of FIG. 1 structured in accordance with the teachings of this disclosure.

FIG. 20 is a block diagram of another example implementation of the document decode system 100 of FIG. 1. The document decode system 100 includes different components that are connected via a network, such as the network 110 of FIG. 1. The document decode system 100 includes the example market research entity 102 of FIG. 1.

In the illustrated example of FIG. 20, the market research entity 102 includes an example backend server 2002. In some examples, the backend server 2002 is structured to receive a request and process a request. For example, the backend server 2002 can receive a request from the example collection platform 104 of FIG. 1 to process a purchase document image. However, it is understood that the backend server 2002 can receive requests from other components such as those disclosed herein and/or other components not disclosed herein. For new images, backend server 2002 can use a recognition queue to process new purchase document images and a notification queue to manage received outputs.

The document decode system 100 includes example document decoder circuitry 2004, which is structured to receive the purchase document images for processing from the backend server 2002. In some examples, the document decoder circuitry 2004 receives the purchase document images, processes the images using ML-based RPC services, and returns predicted purchase facts, their respective text, and a mapping of recognized products.

The document decode system 100 includes an example database server 2006, which is structured to implement a distributed cache. For example, the database server 2006 can be a real-time, in-memory data platform used as a distributed cache, message broker, and database (e.g., a key-value data store). The database server 2006 provides a data source for multi-model performance anywhere (e.g., on premises, across clouds, hybrid environments, etc.). The database server 2006 of FIG. 20 employs a primary-replica architecture and supports asynchronous replication where data can be replicated to multiple replica servers. In some examples, the document decoder circuitry 2004 receives purchase document images from the backend server 2002 via the database server 2006. For example, the database server 2006 can provide a copy (e.g., replica) of the purchase document images (e.g., from the backend server 2002, collection platform 104, etc.).

The document decode system 100 includes example text detection circuitry 2008, which is structured to process an image to detect features, classify the image, and perform OCR on the image. The document decoder circuitry 116 of FIG. 20 can receive a purchase document image and issue a call to the text detection circuitry 2008 to process the image. In some examples, the text detection circuitry 2008 determines a type of purchase document to which the image corresponds using feature detection technology. In some examples, the text detection circuitry 2008 applies OCR techniques to extract text. The text detection circuitry 2008 can return an indication of the type of purchase document the image corresponds to, text (e.g., characters, words and paragraphs obtained from purchase document image), and the texts locations. The output text can then be processed by different services (e.g., depending on the type of purchase document) to obtain desired purchase facts (e.g., product code(s), product description(s), quantity(ies), price(s), etc.).

The document decode system 100 includes example model server circuitry 2010, which is structured to train and execute ML models that are applied to the purchase document images. In some examples, the model server circuitry 2010 is a flexible, high-performance serving system for ML models that is specially designed for production environments. In some examples, the model server circuitry 2010 is communicatively coupled to an example model database 2012, which is structured to store ML models, such as ML models the example column detection model(s) 608, example line detection model(s) 630, other models disclosed herein, and/or other models not disclosed herein. In some examples, the model server circuitry 2010 can launch a model from the model database 2012 and apply the model to an input.

The document decode system 100 includes example entity tagger server circuitry 2014, which is structured to train and execute ML models to tag facts of interest in receipt purchase document images. In some examples, the entity tagger server circuitry 2014 is an open source ML framework that includes graphical processing unit (GPU) acceleration. In some examples, the entity tagger server circuitry 2014 can accelerate a path from research prototyping to production deployment. In some examples, the entity tagger server circuitry 2014 includes an example entity tagger model(s) 626.

The document decode system 100 includes example classification circuitry 2016, which is structured to train and execute ML models to classify columns within invoice purchase document images. For example, the classification circuitry 2016 can be used to train and deploy an example column classification model(s) 620.

In some examples, the text detection circuitry 2008 determines that a purchase document image corresponds to an invoice. In some such examples, the document decoder circuitry 116 issues a call to model server circuitry 2010 to detect columns within the invoice image. In response, the model server circuitry 2010 can retrieve and launch an example column detection model 608. Further, the model server circuitry 2010 can apply the column detection model 608 to the invoice image to detect facts columns within an invoice table of the invoice image. In some examples, the document decoder circuitry 116 applies a post-processing step to detect rows and cells within the invoice table to identify a first row corresponding to headers of the detected columns. In some examples, the document decoder circuitry 116 then issues a call to the classification circuitry 2016 to classify the facts columns based on the first row (e.g., the headers). In response, the classification circuitry 2016 can launch and apply a column classification model 620 to the invoice image and text to classify the columns. In some examples, the document decoder circuitry 116 can the detect columns that include facts of interest. The document decoder circuitry 116 can then extract purchase facts from the invoice image.

In some examples, the text detection circuitry 2008 determines that a purchase document image corresponds to a receipt. In some such examples, the document decoder circuitry 116 issues a call to the entity tagger server circuitry 2014. In response, the entity tagger server circuitry 2014 can retrieve and launch an example entity tagger model 626. Further, the entity tagger server circuitry 2014 can apply the entity tagger model 626 to the receipt image to specific words (e.g., detected by the text detection circuitry 2008) corresponds to facts of interest (e.g., purchase facts). In some examples, the document decoder circuitry 116 then issues a call to the model server circuitry 2010 to detect lines within the receipt image. In response, the model server circuitry 2010 can retrieve, launch, and apply an example line detection model 630 to the receipt image to detect lines within the receipt image (e.g., based on the tagged facts of interest). In some examples, the document decoder circuitry 116 applies a post-processing step to group lines that correspond to a single purchased product. The document decoder circuitry 116 can then extract purchase facts from the receipt image.

The document decode system 100 includes the example product mapper circuitry 128, which is structured to search the purchase facts against the products datastore 130 to recognize and map purchase products listed in the processed purchase documents. The product mapper circuitry 128 saves the mapped purchase products from the processed purchase document(s), along with the purchase document image and associated data in the purchase data datastore.

Flowcharts representative of example hardware logic circuitry, machine readable instructions, hardware implemented state machines, and/or any combination thereof for implementing the document decode system 100 of FIGS. 1, 4, 16, and/or 20 are shown in FIGS. 21-25. The machine readable instructions may be one or more executable programs or portion(s) of an executable program for execution by processor circuitry, such as the processor circuitry 2612 shown in the example processor platform 2600 discussed below in connection with FIG. 26 and/or the example processor circuitry discussed below in connection with FIGS. 27 and/or 28. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM). FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 21-25, many other methods of implementing the example document decode system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML). Structured Query Language (SQL), Swift, etc.

As mentioned above, the example operations of FIGS. 21-25 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 21:
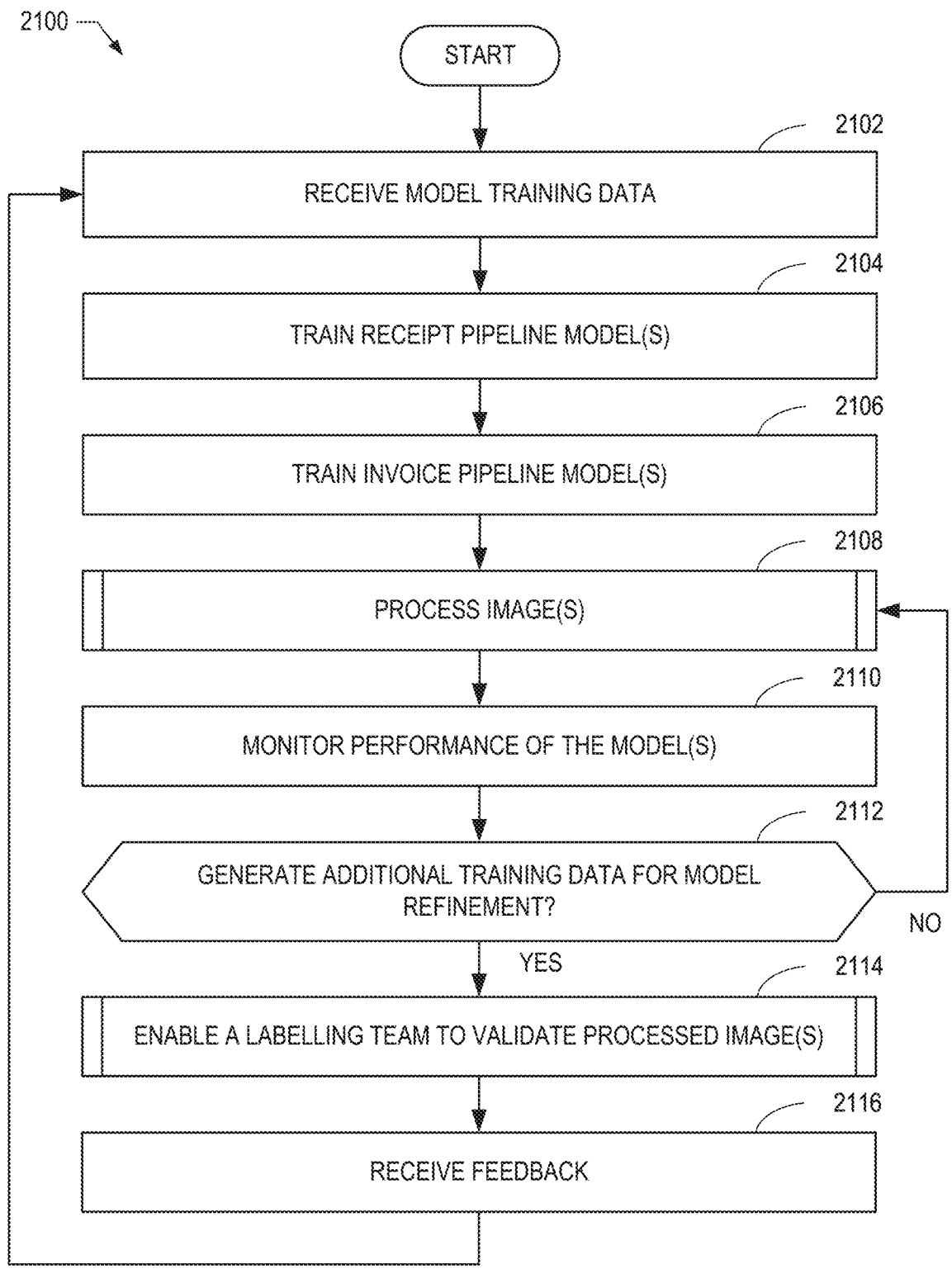
FIGS. 21-24 are flowcharts representative of example machine readable instructions and/or example operations that may be executed by example processor circuitry to implement the fact decoder circuitry of FIG. 1.

FIG. 21 is a flowchart representative of example machine readable instructions and/or example operations 2100 that may be executed and/or instantiated by processor circuitry to decode purchase document images to collect purchase data. The machine readable instructions and/or the operations 2100 of FIG. 21 begin at block 2102, at which example machine learning circuitry (e.g., machine learning circuitry 136 of FIG. 1) receives model training data. For example, the machine learning circuitry 136 can receive labelled invoice images, labelled receipt images, processed purchase document images that have been reviewed by a labelling team, etc.

At block 2104, the machine learning circuitry 136 trains example receipt pipeline model(s). For example, the machine learning circuitry 136 can use the model training data to train an example entity tagger model(s) 626 and/or an example line detection model(s) 630. However, the machine learning circuitry 136 can train additional or alternative receipt pipeline models in additional or alternative examples.

At block 2106, the machine learning circuitry 136 trains an invoice pipeline model(s). For example, the machine learning circuitry 136 can use the model training data to train an example column detection model(s) 608 and/or an example column classification model(s) 620. However, the machine learning circuitry 136 can train additional or alternative invoice pipeline models in additional or alternative examples.

At block 2108, example document decoder circuitry (e.g., document decoder circuitry 116) processes an image(s). For example, the document decoder circuitry 116 can process an image of a purchase document (e.g., an invoice and/or a receipt) to extract purchase facts. In some such examples, the document decoder circuitry 116 extracts purchase facts from the purchase document image(s). For example, the document decoder circuitry 116 can apply AI techniques to detect and extract product descriptions, prices, quantities, and/or product identifiers (e.g., product codes). In some examples, the document decoder circuitry 116 uses the extracted purchase facts to decode the purchase document(s). For example, the document decoder circuitry 116 can search the product descriptions and/or other purchase facts against a database of products to map the product descriptions to product codes in the data.

At block 2110, example performance monitor circuitry (e.g., performance monitor circuitry 134) monitors a performance of the model(s) trained by the machine learning circuitry 136 and/or other machine learning circuitry. For example, the performance monitor circuitry 134 utilize key performance indicators (KPIs) that can indicate performance of a model against an intended end result to measure a performance of ML models. In some examples, the KPIs can be used utilized to monitor quantitative results such as document type, image quality, and/or precision and recall.

At block 2112, the performance monitor circuitry 134 determines whether to generate additional training data for model refinement. For example, based on the KPIs, the performance monitor circuitry 134 can determine that one or more AI models (e.g., column detection model(s) 608, column classification model(s) 620, entity tagger model(s) 626, line detection model(s) 630, etc.) can benefit from additional training. If the answer to block 2112 is NO, control advances back to block 2108, at which the document decoder circuitry 116 continues to process purchase document images. If the answer to block 2112 is YES, control advances to block 2114.

At block 2114, example label annotation circuitry (e.g., label annotation circuitry 140) enables a labelling team to validate a processed image(s). For example, the label annotation circuitry 140 can enable a labelling team to review an output of the document decode circuitry 116, which can be used to re-train and/or refine an ML model. In some examples, the label annotation circuitry 140 implements an interface through which the labelling team can access a processed purchase document image and associated data, review the processed purchase document image and associated data, and provide feedback based on the review.

At block 2116, the document decoder circuitry 116 receives feedback from the labelling team via the label annotation circuitry 140. For example, the document decoder circuitry 116 can receive labelled purchase document images and/or other data. In some examples, the data can be used to train and/or re-train an ML model. Control advances back to block 2102 at which the machine learning circuitry 136 receives model training data.

Figure 22:
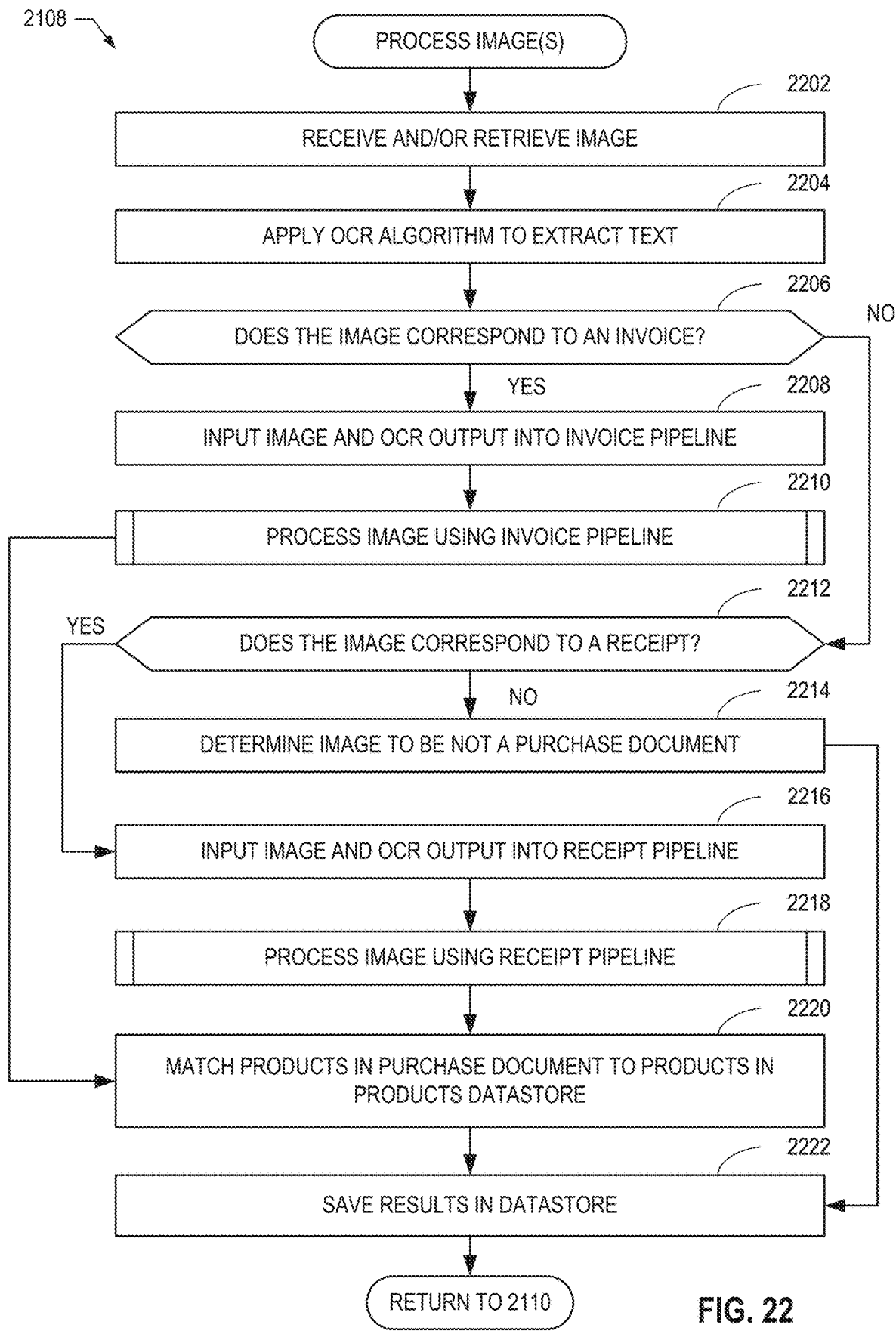

FIG. 22 is a flowchart representative of example machine readable instructions and/or example operations 2108 that may be executed and/or instantiated by processor circuitry to process a purchase document image to extract purchase data. The machine readable instructions and/or the operations 2108 of FIG. 22 begin at block 2202, at which example document identifier circuitry (e.g., document identifier circuitry 602 of FIG. 6) receives and/or retrieves an image of a purchase document. For example, the document identifier circuitry 602 can receive an image of a purchase document from example image manager circuitry (e.g., image manager circuitry 120) and/or from an example image database (e.g., image database 114).

At block 2204, example OCR circuitry (e.g., OCR circuitry 604) applies an OCR algorithm to the purchase document image to extract text. For example, the OCR circuitry 604 can identify and extract text by applying the OCR algorithm over the image to identify shapes that match the character traits. In some examples, the OCR circuitry 604 outputs text (e.g., words, strings of characters), bounding boxes corresponding to the text, and coordinates of the bounding boxes.

At block 2206, the document identifier circuitry 602 determines whether the image corresponds to an invoice. For example, the document identifier circuitry 602 may utilize output of the OCR circuitry 604 (e.g., to identify an invoice word) and/or apply an AI technique that can detect features of an invoice (e.g., a table-like structure associated with invoices). If the answer to block 2206 is NO, control advances to block 2212 (discussed below). If the answer to block 2206 is YES, control advances to block 2208 at which the document identifier circuitry 602 inputs the image and OCR output into an example invoice pipeline (e.g., invoice pipeline 124). For example, the document identifier circuitry 602 and/or the OCR circuitry 604 can inputs the image, text, bounding boxes, and/or associated coordinates of the bounding boxes into the invoice pipeline 124 by inputting the data into example column detection circuitry (e.g., column detection circuitry 606).

At block 2210, the fact extraction circuitry 122 processes the image using the invoice pipeline 124. For example, the fact extraction circuitry 122 can detect and classify columns to detect and extract purchase facts from the image. Control then advances to block 2220 (discussed below).

At block 2212, the document identifier circuitry 602 determines whether the image corresponds to a receipt. For example, the document identifier circuitry 602 may utilize output of the OCR circuitry 604 (e.g., to identify a receipt word), review metadata associated with the image, and/or apply an AI technique that can detect features of a receipt. If the answer to block 2212 is NO, control advances to block 2216 at which the fact extraction circuitry 122 saves such a result in a datastore (e.g., purchase data datastore 132) (block 2222). If the answer to block 2212 is YES, control advances to block 2216 at which the document identifier circuitry 602 inputs the image and OCR output into an example receipt pipeline (e.g., receipt pipeline 126). For example, the document identifier circuitry 602 and/or the OCR circuitry 604 can inputs the image, text, bounding boxes, and/or associated coordinates of the bounding boxes into the receipt pipeline 126 by inputting the data into example entity tagger circuitry (e.g., entity tagger circuitry 624).

At block 2218, the fact extraction circuitry 122 processes the image using the receipt pipeline 126. For example, the fact extraction circuitry 122 can detect and tag text corresponding to purchase facts of interest, detect lines within the receipt image, and/or apply a product grouping heuristic to group lines associated with a purchased product. The fact extraction circuitry 122 can utilize the tagged text and grouped product lines to extract purchase facts from the image. Control then advances to block 2220.

At block 2220, example product mapper circuitry (e.g., product mapper circuitry 128) matches products in a purchase document image to products in a products datastore (e.g., products datastore 130). For example, the product mapper circuitry 128 can receive extracted purchase facts (e.g., from an invoice pipeline 124 and/or a receipt pipeline 126). The product mapper circuitry 128 can search one or more extracted purchases facts (e.g., product description, quantity, price, product code, etc.) for a product in the purchase document against the products datastore 130 to identify a UPC associated with the product. In some examples, the product mapper circuitry 128 matches the product to a UPC in the products datastore 130 associates the product in the purchase document with the UPC in the products datastore 130. In some examples, the product mapper circuitry 128 searches each product in the purchase document image against the products datastore 130. At block 2222, the product mapper circuitry 128 saves the search results in the purchase data datastore 132.

Figure 23:
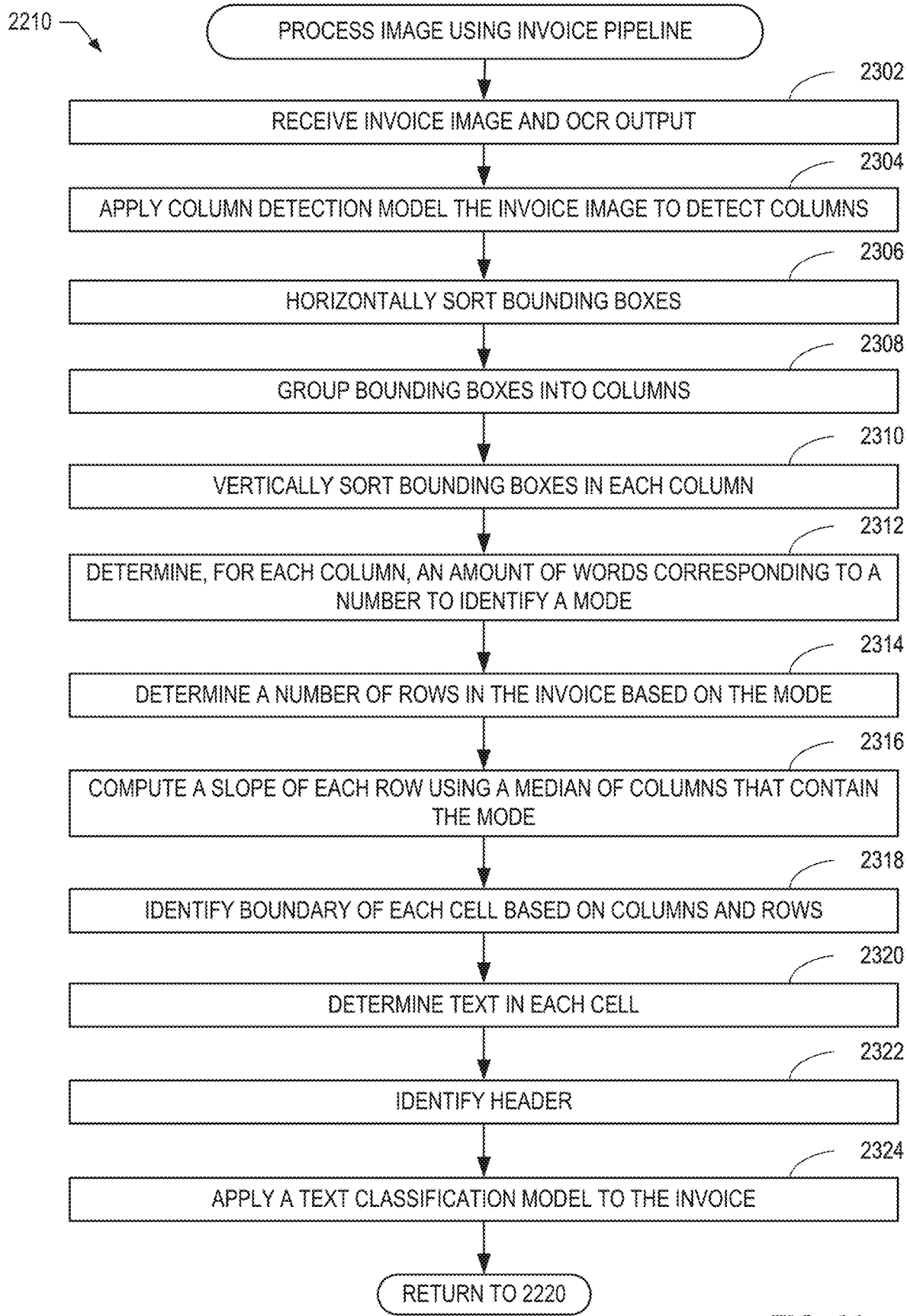

FIG. 23 is a flowchart representative of example machine readable instructions and/or example operations 2210 that may be executed and/or instantiated by processor circuitry to process a purchase document image using an invoice pipeline (e.g., invoice pipeline 124 of FIGS. 1 and/or 4). The machine readable instructions and/or the operations 2210 of FIG. 23 begin at block 2302, at which example column detection circuitry (e.g., column detection circuitry 606) receives an image of an invoice (e.g., an invoice image) and text data output by the OCR circuitry 604 as input.

At block 2304, the column detection circuitry 606 applies an example column detection model (e.g., column detection model(s) 608) to the invoice image to detect columns. For example, the column detection model 608 can be an R-CNN based AI model that detects and classifies regions of interest (e.g., purchase fact columns) within an image. Thus, the column detection circuitry 606 can apply the column detection model 608 to detect columns with the invoice image that can contain purchase facts of interest.

At block 2306, example bounding box sorter circuitry (e.g., bounding box sorter circuitry 614) horizontally sorts bounding boxes. For example, the bounding box sorter circuitry 614 can horizontally sort bounding boxes detected by the column detection model 608 corresponding to columns. In some examples, the bounding box sorter circuitry 614 utilizes one or more coordinates associated with the columns bounding box to horizontally sort the bounding boxes based on one or more coordinates, such as a centroid, at least one X coordinate, etc.

At block 2308, the bounding box sorter circuitry 614 groups bounding boxes into columns. For example, the bounding box sorter circuitry 614 can group word bounding boxes generated by the OCR circuitry 604 that belong to a column (e.g., based on the horizontally sorted column bounding boxes) into respective columns. In some examples, the bounding box sorter circuitry 614 utilizes intersection over union (IoU) calculations to determine whether a word belongs to a column. For example, the bounding box sorter circuitry 614 can determine whether a word bounding box belongs to a column bounding box if the IoU if beyond a threshold value (e.g., 0.75, etc.).

At block 2310, the bounding box sorter circuitry 614 vertically sorts bounding boxes in each column. For example, the bounding box sorter circuitry 614 can identify a Y coordinate of a centroid of each word bounding box within a column to sort the bounding boxes from lowest Y coordinate to highest Y coordinate.

At block 2312, example row identification circuitry (e.g., row identification circuitry 616) determines, for each column, an amount of words corresponding to a number to identify a mode. For example, the row identification circuitry 616 can iterate through the sorted words within each column to identify words that are numbers to identify a total occurrence of numbers in each column. The row identification circuitry 616 calculate a number of words that are numbers within each detected column to identify a mode number of words that are numbers (e.g., a most repeated number of words that are numbers between the detected columns).

At block 2314, the row identification circuitry 616 determines a number of rows in the invoice based on the mode. For example, the row identification circuitry 616 can determine a number of rows in the invoice as the determined mode number of words that are numbers.

At block 2316, the row identification circuitry 616 computes a slope of each row using a median of the columns that contain the mode amount of rows. For example, columns that include the mode (e.g., the target number of rows) are determined to be representative columns.

At block 2318, example cell identification circuitry (e.g., cell identification circuitry 618) identifies a boundary of each cell based on columns and rows detected by the column detection circuitry 606 and/or the row identification circuitry 616. For example, the cell identification circuitry 618 can identify cells by identifying an intersecting region of a column and a row. That cell identification circuitry 618 can iterate through each intersection of a column and a row to identify the cells in the invoice image.

At block 2320, the cell identification circuitry 618 determines text in each cell. For example, the cell identification circuitry 618 can determine text within each cell by concatenating each word positioned within the cell's boundaries. For example, the cell identification circuitry 618 can apply an algorithm to the words within each cell that sorts the words in an X-Y plane using a median of a word's height as line height for grouping words horizontally. In some examples, the cell identification circuitry 618 determines that a word is inside a cell if the Y-coordinate of the word's centroid is inside the vertical limits.

At block 2322, the cell identification circuitry 618 identifiers a header in the invoice image. In some examples, the cell identification circuitry 618 identifies the headers within a table of an invoice by identifying a first row of the table that does not include a number. That is, the headers can correspond to the first column that does not include a cell with a number.

At block 2324, example classification circuitry (e.g., classification circuitry 610) applies a text classification model to the invoice image. For example, the classification circuitry 610 can apply an example column classification model(s) 620 to text within the headers. For example, the column classification mode 620 can be a trained AI model that classifies text data output by the OCR circuitry 604. In some examples, the column classification model 620 is based on a simple neural network that contains one layer, such as fastText. Control then advances to block 2220 of FIG. 22.

Figure 24:
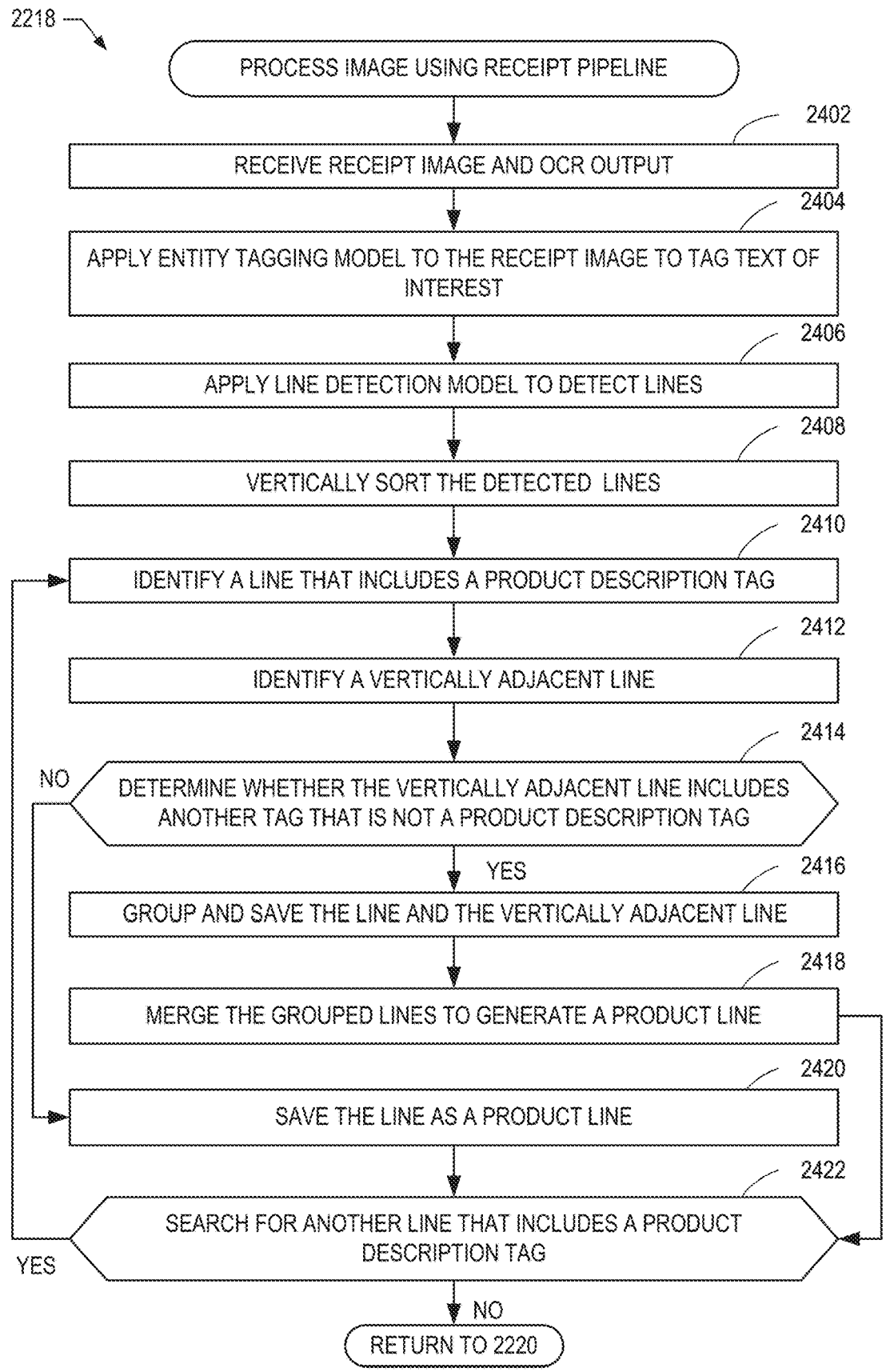

FIG. 24 is a flowchart representative of example machine readable instructions and/or example operations 2218 that may be executed and/or instantiated by processor circuitry to process a purchase document image using receipt pipeline (e.g., receipt pipeline 126 of FIGS. 1 and/or 4). The machine readable instructions and/or the operations 2218 of FIG. 24 begin at block 2402, at which example entity tagger circuitry (e.g., entity tagger circuitry 624) receives an image of an receipt (e.g., an receipt image) and text data output by the OCR circuitry 604 as input.

At block 2404, the entity tagger circuitry 624 applies an example entity tagger model (e.g., entity tagger model(s) 626) to the receipt image to detect and tag specific text (e.g., words) corresponding to facts of interest within an image of a receipt. For example, the entity tagger model 626 can apply an architecture based on processing KIE from documents using improved graph learning-convolutional networks (e.g., PICK) that can extract key fields from a given document and save text of interest to a structured document. Thus, the column detection circuitry 606 can apply the column detection model 608 process the text data and the receipt image and outputs tagged entities corresponding to the purchase facts.

At block 2406, example line detection circuitry (e.g., line detection circuitry 628) applies an example line detection model(s) (e.g., line detection model(s) 630) to the receipt image. For example, the line detection model 630 can be applied to the receipt image to detect lines within the receipt image to facilitate matching of the extracted facts identified by the entity tagger circuitry 624 and a product of reference. In some examples, the line detection model 630 is a trained AI model based on a graph network.

At block 2408, example product line generator circuitry (e.g., product line generator circuitry 632) vertically sorts the detected lines (e.g., the line bounding boxes). For example, the product line generator circuitry 632 can vertically sort the line bounding boxes generated by the line detection circuitry 628 based on one or more y-coordinates of the line bounding boxes.

At block 2410, the product line generator circuitry 632 identifies a line that includes a product description tag. For example, the line generator circuitry 632 may start at a first vertical line bounding box to determine whether the first vertical line bounding box includes the product description tag. If the first line does not include the product description tag, the product line generator circuitry 632 can consecutively search vertically adjacent lines until identifying a line with the product description tag.

At block 2412, the product line generator circuitry 632 identifies a vertically adjacent line. For example, when the product line generator circuitry 632 identifies the line that include the product description tag, the product line generator circuitry 632 can identify a vertically adjacent line based on the y-coordinate(s) of the line bounding boxes. At block 2414, the product line generator circuitry 632 determines whether the vertically adjacent line includes another tag that is not a product description line. For example, the product line generator circuitry 632 may determine whether the vertically adjacent line includes a quantity tag, a price tag, and/or a product code tag. If the answer to block 2414 is YES, control advances to block 2416 at which the product line generator circuitry 632 groups and saves the line and the vertically adjacent line. For example, the product line generator circuitry 632 may group and save the lines as corresponding to a same product. At block 2418, the product line generator circuitry 632 merges the grouped lined to generate a product line. Thus, the line as grouped with the vertically adjacent line corresponds to a product and is determined to be a product line. Control then advances to block 2422. If the answer to block 2414 is NO, control advances to block 2420 at which the product line generator circuitry 632 saves the line as a product line. In some examples, each product line bounding box corresponds to a single product and includes purchase facts for the product. Control then advances to block 2422.

At block 2422, the product line generator circuitry 632 determines whether to search for another line that includes a product description tag. In some examples, the product line generator circuitry 632 may group, save, and merge lines as corresponding to a respective product line until each line is grouped and/or searched. If each line has been grouped and/or searched, the product line generator circuitry 632 may determine not to search for another line that includes a product description tag. If one or more lines have not been grouped and/or searched, the product line generator circuitry 632 may determine to search for another line. If the answer to block 2422 is YES, control returns to block 2410. If the answer to block 2422 is NO, control returns to block 2220 of FIG. 22.

Figure 25:
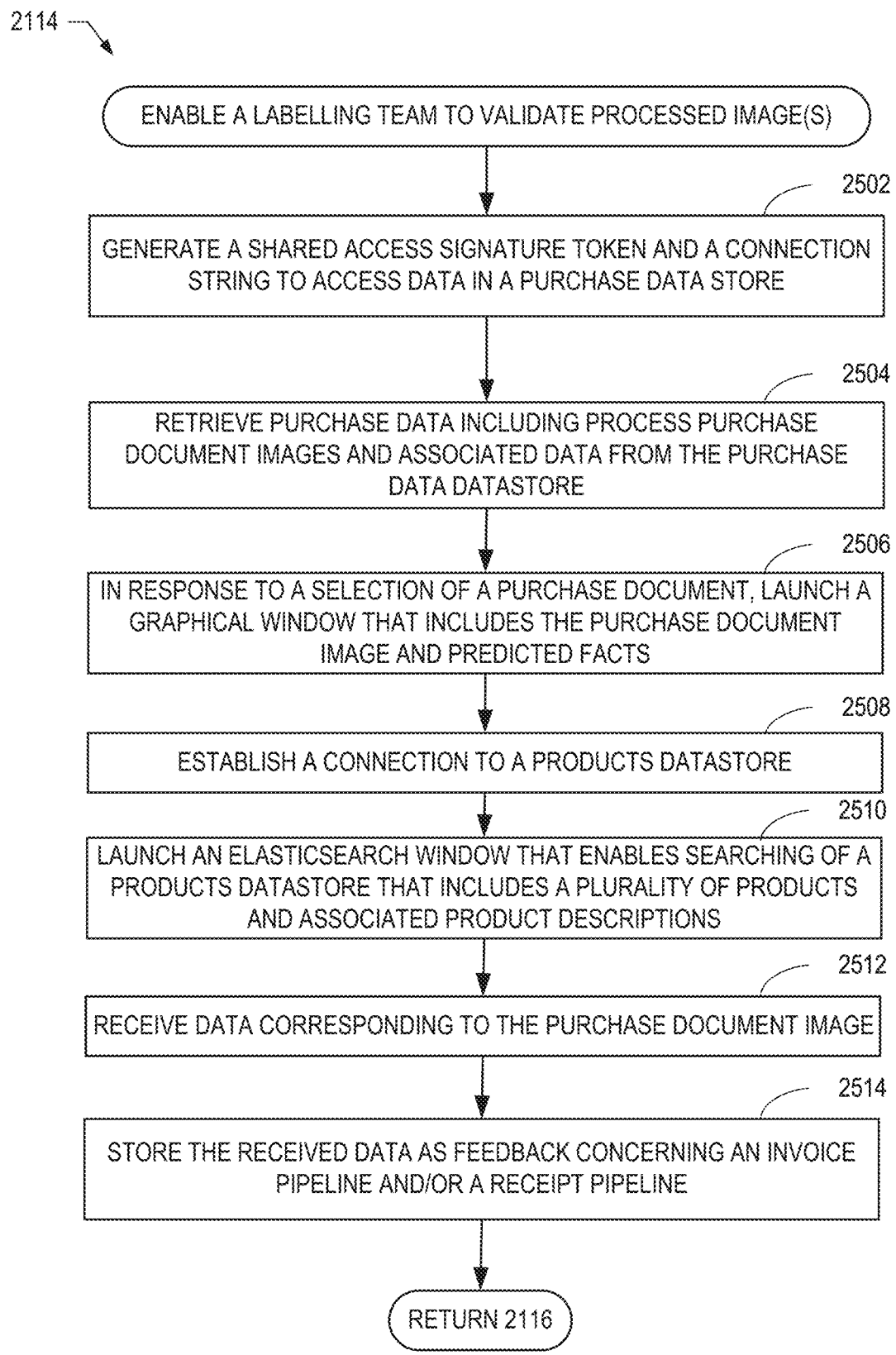
FIG. 25 is a flowchart representative of example machine readable instructions and/or example operations that may be executed by example processor circuitry to implement the label annotation circuitry of FIG. 1.

FIG. 25 is a flowchart representative of example machine readable instructions and/or example operations 2114 that may be executed and/or instantiated by processor circuitry to enable a labelling team to validate a processed image(s). The machine readable instructions and/or the operations 2114 of FIG. 25 begin at block 2502, at which example middleware interface circuitry (e.g., middleware interface circuitry 1612) generates an example Shared Access Signature (SAS) token 1614 and an example connection string 1616 (e.g., based on the SAS token 1614) to the purchase data datastore 132 to retrieve an image and associated data that is ready for the labeling team 1602 to review. For example, the SAS token 1614 can provide secure access to resources in the purchase data datastore 132 while the connection string 1616 can connect the middleware interface circuitry 1612 and the purchase data datastore 132.

At block 2504, example memory (e.g., memory 1618) structured retrieves purchase data including a purchase document images and associated data from the purchase data database 132. For example, the memory 1618 can query on specific dates or countries by means of SQL sentences, which obtain the data to be presented to the labeling team 1602 via the graphical interface circuitry 1606.

At block 2506, example graphical interface circuitry (e.g., graphical interface circuitry 1606), in response to a selection of a purchase document, launches a graphical window 1700, 1800, 1900 that includes the purchase document image and predict facts. For example, the graphical interface circuitry 1606 can cause a presentation of data to the labelling team 1602.

At block 2508, example communication manager circuitry (e.g., communication manager circuitry 1622), established a connection with an example products datastore (e.g., products datastore 130). For example, the communication manager circuitry 1622, which facilitates communication between the middleware interface circuitry 1612 and the products datastore 130, can establish a connection between the middleware interface circuitry 1612 and the products datastore 130.

At block 2510, the graphical interface circuitry 1606 launches an ElasticSearch graphical window that enables searching of a product datastore 130 that includes a plurality of products and associated product descriptions. As noted above, the products datastore 130 includes ElasticSearch technology, which facilitates searching of data in the products datastore 130. Thus, the launched ElasticSearch graphical window can enable a labelling team to search the products datastore 130 to identify products detected by the document decode circuitry 116 with a goal of validating associations.

At block 2512, the example middleware circuitry 1612 receives data corresponding to the purchase document image. For example, the data can include validations of ML models, extracted facts, etc., refinements of the predictions, notes, etc. from the labelling team. At block 2514, the middleware circuitry 1612 stores the received data as feedback concerning an invoice pipeline and/or a receipt pipeline. For example, the middleware circuitry 1612 can store the feedback in the purchase data datastore 132, which can be accessed by the machine learning circuitry 136.

Figure 26:
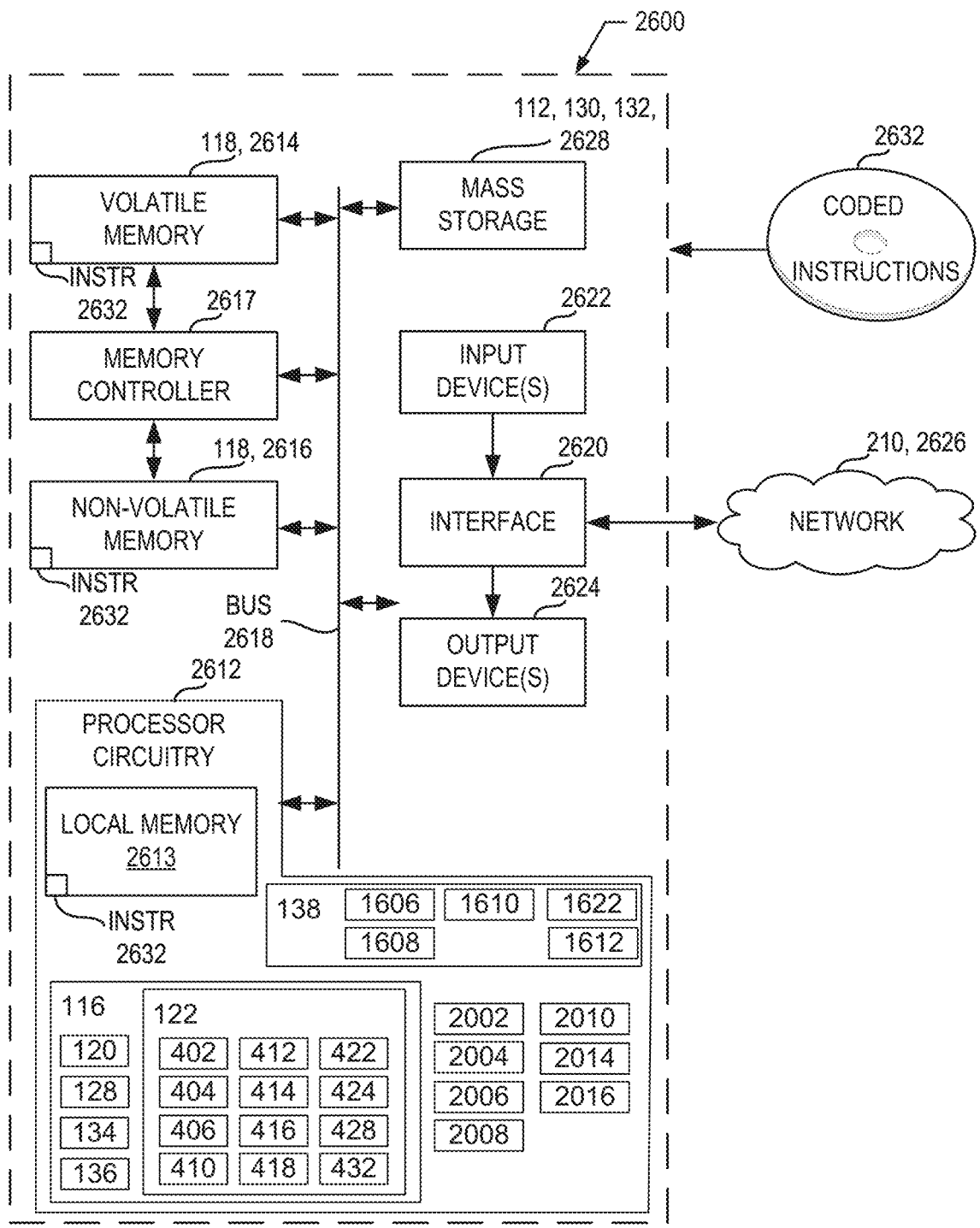
FIG. 26 is a block diagram of an example processing platform including processor circuitry structured to execute the example machine readable instructions and/or the example operations of FIGS. 21-25 to implement the fact decoding circuitry of FIG. 1 and/or the label annotation circuitry of FIG. 1.

FIG. 26 is a block diagram of an example processor platform 2600 structured to execute and/or instantiate the machine readable instructions and/or the operations of FIGS. 21-25 to implement the document decode system 100 of FIGS. 1, 4, 16, and/or 20. The processor platform 2600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset (e.g., an augmented reality (AR) headset, a virtual reality (VR) headset, etc.) or other wearable device, or any other type of computing device.

The processor platform 2600 of the illustrated example includes processor circuitry 2612. The processor circuitry 2612 of the illustrated example is hardware. For example, the processor circuitry 2612 can be implemented by one or more integrated circuits, logic circuits, FPGAs, microprocessors, CPUs, GPUs, DSPs, and/or microcontrollers from any desired family or manufacturer. The processor circuitry 2612 may be implemented by one or more semiconductor based (e.g., silicon based) devices. In this example, the processor circuitry 2612 implements example market research entity 102, example document decoder circuitry 116, example image manager circuitry 120, example fact extraction circuitry 122, example product mapper circuitry 128, example performance monitor circuitry 134, example machine learning circuitry 136, example label annotation circuitry 138, example document identifier circuitry 602, example OCR circuitry 604, example column detection circuitry 606, example row and cell detection circuitry 612, example classification circuitry 610, example entity tagger circuitry 624, example line detection circuitry 628, example product line generator circuitry 632, example label annotation interface circuitry 1608, example graphical interface circuitry 1606, example load balancer circuitry 1610, example middleware interface circuitry 1612, example communication manager circuitry 1622, example backend server 2002, example document decoder circuitry 2004, example database server 2006, example text detection circuitry 2008, example model server circuitry 2010, example entity tagger server circuitry 2014, and/or example classification circuitry 2016.

The processor circuitry 2612 of the illustrated example includes a local memory 2613 (e.g., a cache, registers, etc.). The processor circuitry 2612 of the illustrated example is in communication with a main memory including a volatile memory 2614 and a non-volatile memory 2616 by a bus 2618. The volatile memory 2614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2616 may be implemented by flash memory and/or any other desired type of memory device. Access to the main memory 2614, 2616 of the illustrated example is controlled by a memory controller 2617.

The processor platform 2600 of the illustrated example also includes interface circuitry 2620. The interface circuitry 2620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2622 are connected to the interface circuitry 2620. The input device(s) 2622 permit(s) a user to enter data and/or commands into the processor circuitry 2612. The input device(s) 2622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2624 are also connected to the interface circuitry 2620 of the illustrated example. The output device(s) 2624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2620 of the illustrated example, thus, typically includes a graphics driver card, a graphics driver chip, and/or graphics processor circuitry such as a GPU.

The interface circuitry 2620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2600 of the illustrated example also includes one or more mass storage devices 2628 to store software and/or data. Examples of such mass storage devices 2628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 2632, which may be implemented by the machine readable instructions of FIGS. 21-25, may be stored in the mass storage device 2628, in the volatile memory 2614, in the non-volatile memory 2616, and/or on a removable non-transitory computer readable storage medium such as a CD or DVD.

Figure 27:
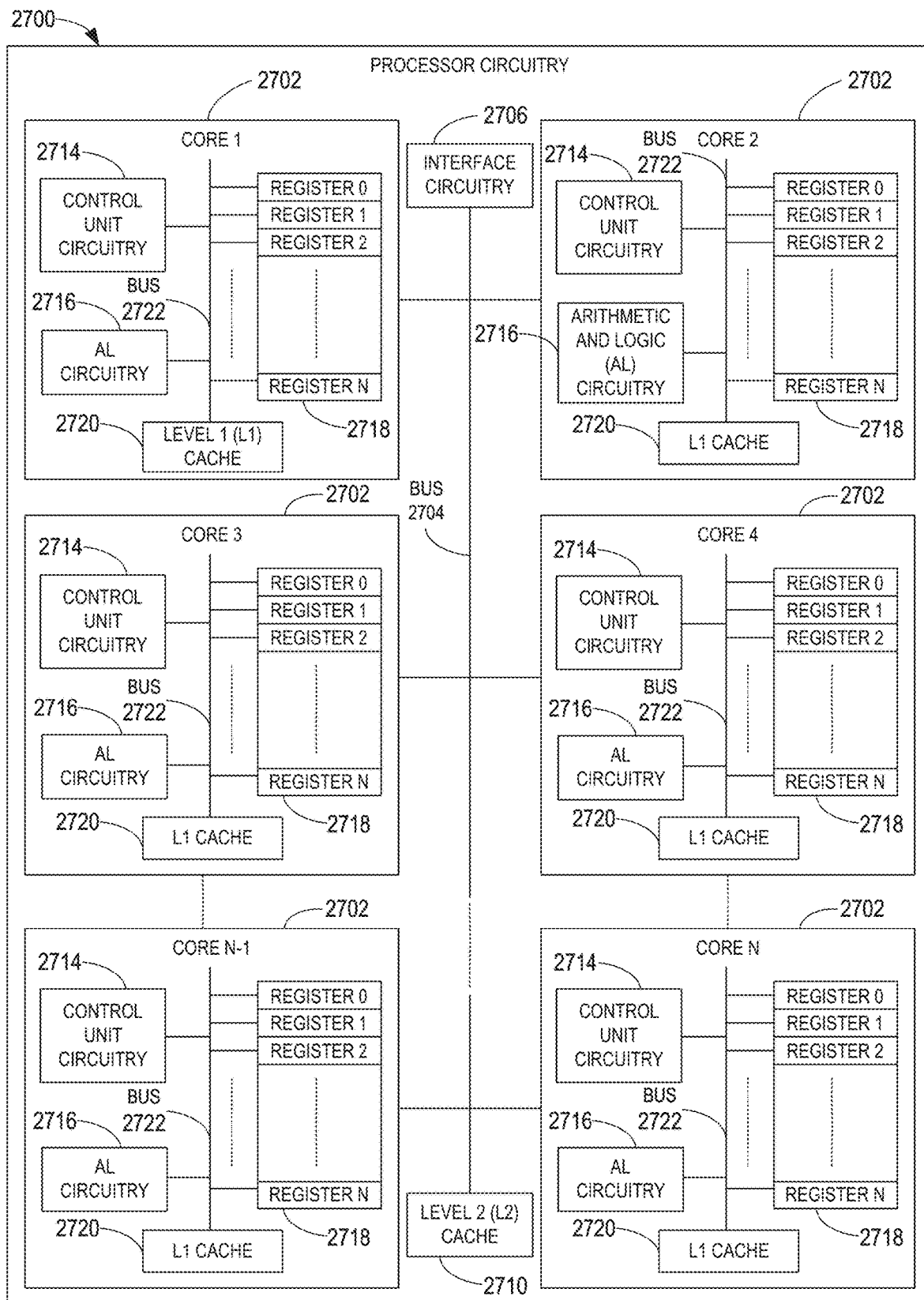
FIG. 27 is a block diagram of an example implementation of the processor circuitry of FIG. 26.

FIG. 27 is a block diagram of an example implementation of the processor circuitry 2612 of FIG. 26. In this example, the processor circuitry 2612 of FIG. 26 is implemented by a microprocessor 2700. For example, the microprocessor 2700 may be a general purpose microprocessor (e.g., general purpose microprocessor circuitry). The microprocessor 2700 executes some or all of the machine readable instructions of the flowcharts of FIGS. 21-25 to effectively instantiate the circuitry of FIGS. 1 and/or 20 as logic circuits to perform the operations corresponding to those machine readable instructions. In some such examples, the circuitry of FIGS. 1 and/or 20 is instantiated by the hardware circuits of the microprocessor 2700 in combination with the instructions. For example, the microprocessor 2700 may be implemented by multi-core hardware circuitry such as a CPU, a DSP, a GPU, an XPU, etc. Although it may include any number of example cores 2702 (e.g., 1 core), the microprocessor 2700 of this example is a multi-core semiconductor device including N cores. The cores 2702 of the microprocessor 2700 may operate independently or may cooperate to execute machine readable instructions. For example, machine code corresponding to a firmware program, an embedded software program, or a software program may be executed by one of the cores 2702 or may be executed by multiple ones of the cores 2702 at the same or different times. In some examples, the machine code corresponding to the firmware program, the embedded software program, or the software program is split into threads and executed in parallel by two or more of the cores 2702. The software program may correspond to a portion or all of the machine readable instructions and/or operations represented by the flowcharts of FIGS. 21-25.

The cores 2702 may communicate by a first example bus 2704. In some examples, the first bus 2704 may be implemented by a communication bus to effectuate communication associated with one(s) of the cores 2702. For example, the first bus 2704 may be implemented by at least one of an Inter-Integrated Circuit (I2C) bus, a Serial Peripheral Interface (SPI) bus, a PCI bus, or a PCIe bus. Additionally or alternatively, the first bus 2704 may be implemented by any other type of computing or electrical bus. The cores 2702 may obtain data, instructions, and/or signals from one or more external devices by example interface circuitry 2706. The cores 2702 may output data, instructions, and/or signals to the one or more external devices by the interface circuitry 2706. Although the cores 2702 of this example include example local memory 2720 (e.g., Level 1 (L1) cache that may be split into an L1 data cache and an L1 instruction cache), the microprocessor 2700 also includes example shared memory 2710 that may be shared by the cores (e.g., Level 2 (L2 cache)) for high-speed access to data and/or instructions. Data and/or instructions may be transferred (e.g., shared) by writing to and/or reading from the shared memory 2710. The local memory 2720 of each of the cores 2702 and the shared memory 2710 may be part of a hierarchy of storage devices including multiple levels of cache memory and the main memory (e.g., the main memory 2614, 2616 of FIG. 26). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2702 may be referred to as a CPU, DSP, GPU, etc., or any other type of hardware circuitry. Each core 2702 includes control unit circuitry 2714, arithmetic and logic (AL) circuitry (sometimes referred to as an ALU) 2716, a plurality of registers 2718, the local memory 2720, and a second example bus 2722. Other structures may be present. For example, each core 2702 may include vector unit circuitry, single instruction multiple data (SIMD) unit circuitry, load/store unit (LSU) circuitry, branch/jump unit circuitry, floating-point unit (FPU) circuitry, etc. The control unit circuitry 2714 includes semiconductor-based circuits structured to control (e.g., coordinate) data movement within the corresponding core 2702. The AL circuitry 2716 includes semiconductor-based circuits structured to perform one or more mathematic and/or logic operations on the data within the corresponding core 2702. The AL circuitry 2716 of some examples performs integer based operations. In other examples, the AL circuitry 2716 also performs floating point operations. In yet other examples, the AL circuitry 2716 may include first AL circuitry that performs integer based operations and second AL circuitry that performs floating point operations. In some examples, the AL circuitry 2716 may be referred to as an Arithmetic Logic Unit (ALU). The registers 2718 are semiconductor-based structures to store data and/or instructions such as results of one or more of the operations performed by the AL circuitry 2716 of the corresponding core 2702. For example, the registers 2718 may include vector register(s), SIMD register(s), general purpose register(s), flag register(s), segment register(s), machine specific register(s), instruction pointer register(s), control register(s), debug register(s), memory management register(s), machine check register(s), etc. The registers 2718 may be arranged in a bank as shown in FIG. 27. Alternatively, the registers 2718 may be organized in any other arrangement, format, or structure including distributed throughout the core 2702 to shorten access time. The second bus 2722 may be implemented by at least one of an I2C bus, a SPI bus, a PCI bus, or a PCIe bus.

Each core 2702 and/or, more generally, the microprocessor 2700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 28:
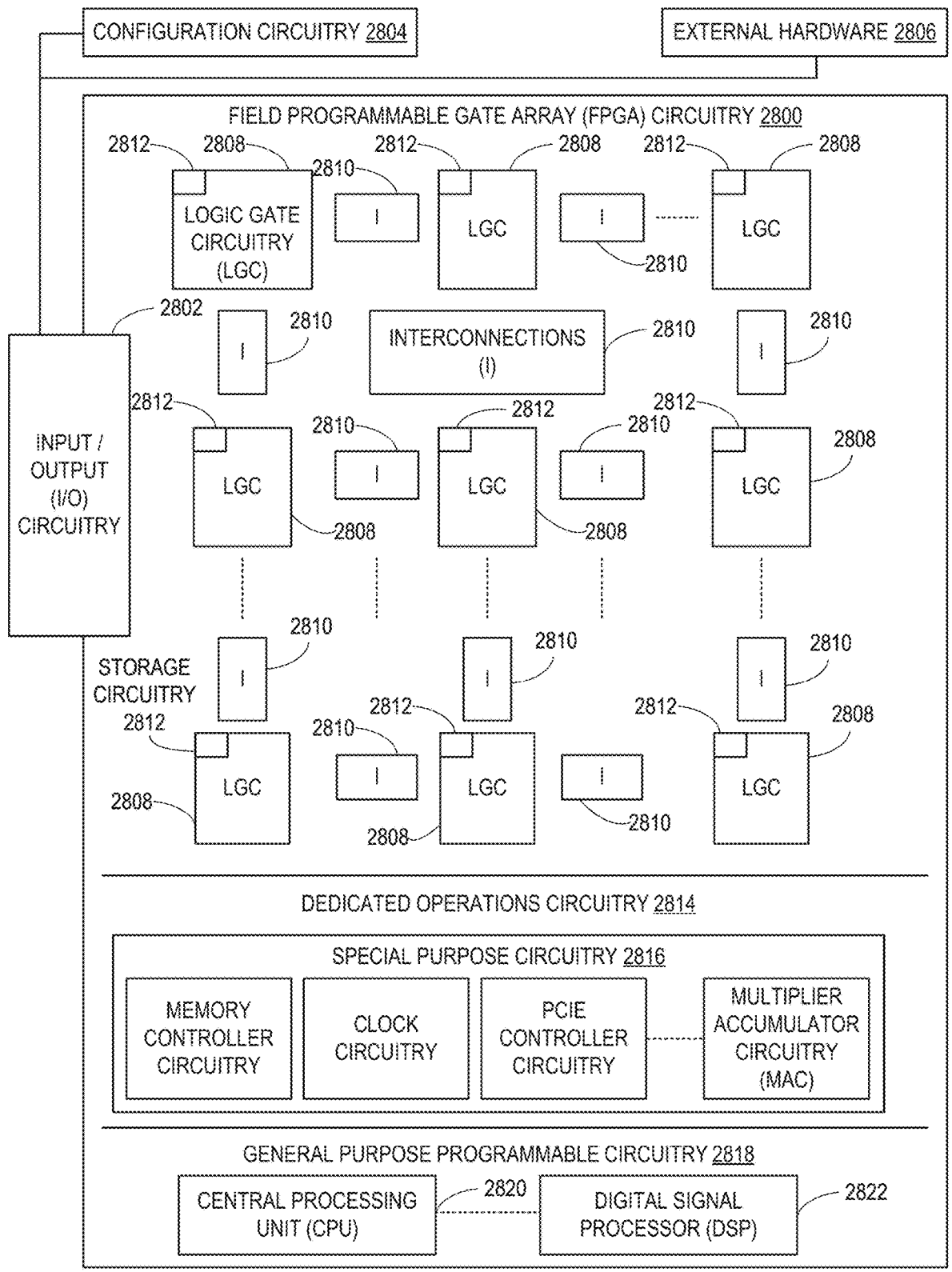
FIG. 28 is a block diagram of another example implementation of the processor circuitry of FIG. 26.
Figure 29:
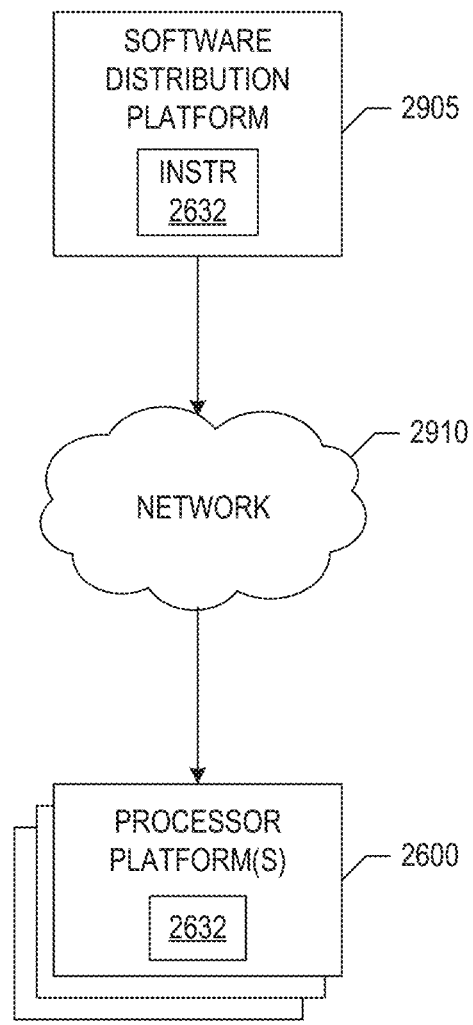
FIG. 29 is a block diagram of an example software distribution platform (e.g., one or more servers) to distribute software (e.g., software corresponding to the example machine readable instructions of FIGS. 21-24) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 28 is a block diagram of another example implementation of the processor circuitry 2612 of FIG. 26. In this example, the processor circuitry 2612 is implemented by FPGA circuitry 2800. For example, the FPGA circuitry 2800 may be implemented by an FPGA. The FPGA circuitry 2800 can be used, for example, to perform operations that could otherwise be performed by the example microprocessor 2700 of FIG. 27 executing corresponding machine readable instructions. However, once configured, the FPGA circuitry 2800 instantiates the machine readable instructions in hardware and, thus, can often execute the operations faster than they could be performed by a general purpose microprocessor executing the corresponding software.

More specifically, in contrast to the microprocessor 2700 of FIG. 27 described above (which is a general purpose device that may be programmed to execute some or all of the machine readable instructions represented by the flowcharts of FIGS. 21-25 but whose interconnections and logic circuitry are fixed once fabricated), the FPGA circuitry 2800 of the example of FIG. 28 includes interconnections and logic circuitry that may be configured and/or interconnected in different ways after fabrication to instantiate, for example, some or all of the machine readable instructions represented by the flowcharts of FIGS. 21-25. In particular, the FPGA circuitry 2800 may be thought of as an array of logic gates, interconnections, and switches. The switches can be programmed to change how the logic gates are interconnected by the interconnections, effectively forming one or more dedicated logic circuits (unless and until the FPGA circuitry 2800 is reprogrammed). The configured logic circuits enable the logic gates to cooperate in different ways to perform different operations on data received by input circuitry. Those operations may correspond to some or all of the software represented by the flowcharts of FIGS. 21-25. As such, the FPGA circuitry 2800 may be structured to effectively instantiate some or all of the machine readable instructions of the flowcharts of FIGS. 21-25 as dedicated logic circuits to perform the operations corresponding to those software instructions in a dedicated manner analogous to an ASIC. Therefore, the FPGA circuitry 2800 may perform the operations corresponding to the some or all of the machine readable instructions of FIGS. 21-25 faster than the general purpose microprocessor can execute the same.

In the example of FIG. 28, the FPGA circuitry 2800 is structured to be programmed (and/or reprogrammed one or more times) by an end user by a hardware description language (HDL) such as Verilog. The FPGA circuitry 2800 of FIG. 28, includes example input/output (I/O) circuitry 2802 to obtain and/or output data to/from example configuration circuitry 2804 and/or external hardware 2806. For example, the configuration circuitry 2804 may be implemented by interface circuitry that may obtain machine readable instructions to configure the FPGA circuitry 2800, or portion(s) thereof. In some such examples, the configuration circuitry 2804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2806 may be implemented by external hardware circuitry. For example, the external hardware 2806 may be implemented by the microprocessor 2700 of FIG. 27. The FPGA circuitry 2800 also includes an array of example logic gate circuitry 2808, a plurality of example configurable interconnections 2810, and example storage circuitry 2812. The logic gate circuitry 2808 and the configurable interconnections 2810 are configurable to instantiate one or more operations that may correspond to at least some of the machine readable instructions of FIGS. 21-25 and/or other desired operations. The logic gate circuitry 2808 shown in FIG. 28 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2808 to enable configuration of the electrical structures and/or the logic gates to form circuits to perform desired operations. The logic gate circuitry 2808 may include other electrical structures such as look-up tables (LUTs), registers (e.g., flip-flops or latches), multiplexers, etc.

The configurable interconnections 2810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2808 to program desired logic circuits.

The storage circuitry 2812 of the illustrated example is structured to store result(s) of the one or more of the operations performed by corresponding logic gates. The storage circuitry 2812 may be implemented by registers or the like. In the illustrated example, the storage circuitry 2812 is distributed amongst the logic gate circuitry 2808 to facilitate access and increase execution speed.

The example FPGA circuitry 2800 of FIG. 28 also includes example Dedicated Operations Circuitry 2814. In this example, the Dedicated Operations Circuitry 2814 includes special purpose circuitry 2816 that may be invoked to implement commonly used functions to avoid the need to program those functions in the field. Examples of such special purpose circuitry 2816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2800 may also include example general purpose programmable circuitry 2818 such as an example CPU 2820 and/or an example DSP 2822. Other general purpose programmable circuitry 2818 may additionally or alternatively be present such as a GPU, an XPU, etc., that can be programmed to perform other operations.

Although FIGS. 27 and 28 illustrate two example implementations of the processor circuitry 2612 of FIG. 26, many other approaches are contemplated. For example, as mentioned above, modern FPGA circuitry may include an on-board CPU, such as one or more of the example CPU 2820 of FIG. 28. Therefore, the processor circuitry 2612 of FIG. 26 may additionally be implemented by combining the example microprocessor 2700 of FIG. 27 and the example FPGA circuitry 2800 of FIG. 28. In some such hybrid examples, a first portion of the machine readable instructions represented by the flowcharts of FIGS. 21-25 may be executed by one or more of the cores 2702 of FIG. 27, a second portion of the machine readable instructions represented by the flowcharts of FIGS. 21-25 may be executed by the FPGA circuitry 2800 of FIG. 28, and/or a third portion of the machine readable instructions represented by the flowcharts of FIGS. 21-25 may be executed by an ASIC. It should be understood that some or all of the circuitry of FIGS. 1, 4, 16, and/or 20 may, thus, be instantiated at the same or different times. Some or all of the circuitry may be instantiated, for example, in one or more threads executing concurrently and/or in series. Moreover, in some examples, some or all of the circuitry of FIG. 1 may be implemented within one or more virtual machines and/or containers executing on the microprocessor.

In some examples, the processor circuitry 2612 of FIG. 26 may be in one or more packages. For example, the microprocessor 2700 of FIG. 27 and/or the FPGA circuitry 2800 of FIG. 28 may be in one or more packages. In some examples, an XPU may be implemented by the processor circuitry 2612 of FIG. 26, which may be in one or more packages. For example, the XPU may include a CPU in one package, a DSP in another package, a GPU in yet another package, and an FPGA in still yet another package.

A block diagram illustrating an example software distribution platform 2900 to distribute software such as the example machine readable instructions 2632 of FIG. 26 to hardware devices owned and/or operated by third parties is illustrated in FIG. 26. The example software distribution platform 2900 may be implemented by any computer server, data facility, cloud service, etc., capable of storing and transmitting software to other computing devices. The third parties may be customers of the entity owning and/or operating the software distribution platform 2900. For example, the entity that owns and/or operates the software distribution platform 2900 may be a developer, a seller, and/or a licensor of software such as the example machine readable instructions 2632 of FIG. 26. The third parties may be consumers, users, retailers, OEMs, etc., who purchase and/or license the software for use and/or re-sale and/or sub-licensing. In the illustrated example, the software distribution platform 2900 includes one or more servers and one or more storage devices. The storage devices store the machine readable instructions 2632, which may correspond to the example machine readable instructions 2100 of FIGS. 21-25, as described above. The one or more servers of the example software distribution platform 2900 are in communication with an example network 2910, which may correspond to any one or more of the Internet and/or any of the example networks 110 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2632 from the software distribution platform 2900. For example, the software, which may correspond to the example machine readable instructions 2100 of FIGS. 21-25, may be downloaded to the example processor platform 2600, which is to execute the machine readable instructions 2632 to implement the document decode system 100. In some examples, one or more servers of the software distribution platform 2900 periodically offer, transmit, and/or force updates to the software (e.g., the example machine readable instructions 2632 of FIG. 26) to ensure improvements, patches, updates, etc., are distributed and applied to the software at the end user devices.

From the foregoing, it will be appreciated that example systems, methods, apparatus, and articles of manufacture have been disclosed that facilitate technological (e.g., automatic) decoding of an image of a purchase document that transforms a manual data collection by auditors, which has been shown to be time consuming and to cause erroneous and/or biased results, to a new technological solution for extraction and decoding of purchase facts from an image of a purchase document that can generalize well to new formats (e.g., based on large collections of purchase document images). Technological examples disclosed herein eliminate or otherwise reduce human discretionary input, which can have a large impact on the productivity, accuracy, and digitalization of marketing intelligence entities. Human involvement has been shown to cause significant problems with processing time due to the vast quantity of purchase documents to decode and the vast quantity of candidate products to consider when decoding. Disclosed systems, methods, apparatus, and articles of manufacture improve the efficiency of using a computing device by boosting an entity's throughput by enabling the entity to process more purchase documents with improved accuracy, collect more purchase data, and increase the entity's profits. Disclosed systems, methods, apparatus, and articles of manufacture are accordingly directed to one or more improvement(s) in the operation of a machine such as a computer or other electronic and/or mechanical device. Information extraction can reduce human effort, reduce expenses, and make the process less error-prone and more efficient.

Example methods, apparatus, systems, and articles of manufacture to decode an image are disclosed herein. Further examples and combinations thereof include the following:

Example 1 includes an apparatus to decode an image comprising: interface circuitry to receive an image corresponding to a purchase document, the purchase document to include an indication of one or more products; and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations; the processor circuitry to perform at least one of the first operations, the second operations, or the third operations to instantiate fact extraction circuitry to obtain purchase facts from the image, the purchase facts corresponding to the one or more products indicated in the image, the fact extraction circuitry to: extract text from the image; determine a type of the purchase document to which the image corresponds; apply a first pipeline or a second pipeline to the image based on the type of the purchase document; and extract the purchase facts for ones of the one or more products in the image; and product mapper circuitry to map the extracted purchase facts against a library of products to identify the one or more products in the purchase document.

Example 2 includes the apparatus of example 1, wherein the processor circuitry is to perform at least one of the first operations, the second operations, or the third operations to instantiate the fact extraction circuitry to extract the text by applying an optical character recognition (OCR) algorithm over the image.

Example 3 includes the apparatus of any one of examples 1 or 2, wherein the image corresponds to a receipt, and wherein the processor circuitry is to perform at least one of the first operations, the second operations, or the third operations to apply the first pipeline by instantiating the fact extraction circuitry to:

tag words from the text that correspond to first ones of the purchase facts;
identify lines of text within the image using the text and a convolutional neural network (CNN); and group ones of the lines of text within the image that correspond to a same product.

Example 4 includes the apparatus of any one of examples 1-3, wherein the first ones of the purchase facts corresponds to at least one of a product description of a first product, a quantity of the first product, a price of the first product, or a product code of the first product.

Example 5 includes the apparatus of any one of examples 1-4, wherein the processor circuitry is to perform at least one of the first operations, the second operations, or the third operations to instantiate the fact extraction circuitry to group the ones of the lines of text that correspond to the same product by identifying a first line of text that includes a first tag, the first tag corresponding to a first product description; identifying a second line of text that is vertically adjacent the first line of text; and in response to determining that the second line of text includes a second tag that corresponds to one of a first quantity, a first price, or a first product code, grouping the first line of text and the second line of text as corresponding to the same product.

Example 6 includes the apparatus of any one of examples 1-5, wherein the processor circuitry is to perform at least one of the first operations, the second operations, or the third operations to instantiate the fact extraction circuitry to tag the words that correspond to the first ones of the purchase facts by applying a trained model to the image and to the text.

Example 7 includes the apparatus of any one of examples 1-2, wherein the image corresponds to an invoice, and wherein the processor circuitry is to perform at least one of the first operations, the second operations, or the third operations to apply the second pipeline by instantiating the fact extraction circuitry to apply a column detection model to the image to detect columns within a table of the image.

Example 8 includes the apparatus of example 7, wherein the processor circuitry is to perform at least one of the first operations, the second operations, or the third operations to instantiate the fact extraction circuitry to detect rows within the detected columns; detect cells at intersections of the detected rows and the detected columns; and identify a first row of cells, the first row of cells corresponding to headers of the detected columns.

Example 9 includes the apparatus of any one of examples 7-8, wherein the processor circuitry is to perform at least one of the first operations, the second operations, or the third operations to instantiate the fact extraction circuitry to classify the columns by classifying text within the first row cells.

Example 10 includes the apparatus of any one of examples 7-9, wherein the classified columns include at least one of a product description column, a product code column, a quantity column, price column, or an out-of-scope column.

Example 11 includes an apparatus to decode an image comprising interface circuitry to receive an image of a purchase document; at least one memory; machine readable instructions; and processor circuitry to at least one of instantiate or execute the machine readable instructions to extract text from the image of the purchase document, the image of the purchase document to memorialize a transaction that includes at least one product; determine a type of the purchase document to which the image corresponds; apply one of a first pipeline or a second pipeline to the image of the purchase document based on the type of the purchase document; obtain purchase facts corresponding to a respective one of the at least one product memorialized in the image of the purchase document; and map the obtained purchase facts against a products database to identify the at least one product memorialized in the image of the purchase document.

Example 12 includes the apparatus of example 11, wherein the processor circuitry is to extract the text by applying an optical character recognition (OCR) algorithm over the image.

Example 13 includes the apparatus of any one of examples 11-12, wherein the image corresponds to a receipt, and wherein the processor circuitry is to apply the first pipeline by at least one of instantiating or executing the machine readable instructions to label first text extracted from the image that corresponds to ones of the purchase facts; identify lines of text within the image using the text and a first convolutional neural network; and group corresponding ones of the lines of text within the image that correspond to a same product.

Example 14 includes the apparatus of any one of examples 11-13, wherein the ones of the purchase facts correspond to at least one of a product description of a first product, a quantity of the first product, a price of the first product, or a product code of the first product.

Example 15 includes the apparatus of any one of examples 11-14, wherein the processor circuitry is to at least one of instantiate or execute the machine readable instructions to identify a first line of text that includes a first label, the first label corresponding to a first product description; identify a second line of text that is vertically adjacent the first line of text; and in response to determining that the second line of text includes a second label that corresponds to at least one of a first quantity, a first price, or a first product code, group the first line of text and the second line of text as corresponding to the same product.

Example 16 includes the apparatus of any one of examples 11-15, wherein the processor circuitry is to at least one of instantiate or execute the machine readable instructions to label the first text corresponding to the ones of the purchase facts by applying a trained model to the image and to the text.

Example 17 includes the apparatus of any one of examples 11-12, wherein the image corresponds to an invoice, and wherein the processor circuitry is to apply the second pipeline by at least one of instantiating or executing the machine readable instructions to apply a column detection model to the image to detect columns within a table of the image.

Example 18 includes the apparatus of example 17, wherein processor circuitry is to at least one of instantiate or execute the machine readable instructions to detect rows within the detected columns; detect cells at intersections of the detected rows and the detected columns; and detect a first row of cells, the first row of cells corresponding to headers of the detected columns.

Example 19 includes the apparatus of any one of examples 17-18, wherein the processor circuitry at least one of instantiate or execute the machine readable instructions to classify the columns by classifying text within the first row cells.

Example 20 includes the apparatus of any one of examples 17-19, wherein the classified columns include at least one of a product description column, a product code column, a quantity column, price column, or an out-of-scope column.

Example 21 includes a non-transitory machine readable storage medium comprising instructions that, when executed, cause processor circuitry to at least receive an image corresponding to a purchase document, the image to include a listing of purchased products; extract text data from the image corresponding to the purchase document; determine a type of the purchase document to which the image corresponds; input the image into a receipt pipeline or an invoice pipeline based on the determination; extract purchase facts corresponding to ones of the purchased products; and map the purchase facts corresponding to respective ones of the purchased products against a products library to identify the respective ones of the purchased products.

Example 22 includes the non-transitory machine readable storage medium of example 21, wherein the instructions, when executed, cause the processor circuitry to extract the text data by applying an optical character recognition (OCR) algorithm over the image.

Example 23 includes the non-transitory machine readable storage medium of any one of examples 21-22, wherein the image corresponds to a receipt, and wherein the instructions, when executed, apply the receipt pipeline by causing the processor circuitry to tag words from the text data that correspond to ones of the purchase facts; identify lines of text data within the image using the text data and a first convolutional neural network; and group corresponding ones of the lines of text data within the image that correspond to a same purchased product.

Example 24 includes the non-transitory machine readable storage medium of any one of examples 21-23, wherein the ones of the purchase facts include at least one of a product description of a first product, a quantity of the first product, a price of the first product, or a product code of the first product.

Example 25 includes the non-transitory machine readable storage medium of any one of examples 21-24, wherein the instructions, when executed, cause the processor circuitry to identify a first line of text data that includes a first tag, the first tag corresponding to a first product description:
identify a second line of text data that is vertically adjacent the first line of text data; and in response to determining that the second line of text data does includes a second tag that corresponds to at least one of a quantity, a price, or a product, group the first line of text and the second line of text as corresponding to the same product.

Example 26 includes the non-transitory machine readable storage medium of any one of examples 21-25, wherein the instructions, when executed, cause the processor circuitry to tag the words corresponding to the ones of the purchase facts by applying a trained model to the image and to the extracted text.

Example 27 includes the non-transitory machine readable storage medium of any one of examples 21-22, wherein the image corresponds to an invoice, and wherein the instructions, when executed, apply the invoice pipeline by causing the processor circuitry to apply a column detection model to the image to detect columns within a table of the image.

Example 28 includes the non-transitory machine readable storage medium of example 27, wherein the instructions, when executed, cause the processor circuitry to detect rows within the detected columns; detect cells at intersections of the detected rows and the detected columns; and detect a first row of cells, the first row of cells corresponding to headers of the detected columns.

Example 29 includes the non-transitory machine readable storage medium of any one of examples 27-28, wherein the instructions, when executed, cause the processor circuitry to classify the columns by classifying text within the first row cells.

Example 30 includes the non-transitory machine readable storage medium of any one of examples 27-29, wherein the classified columns include at least one of a product description column, a product code column, a quantity column, price column, or an out-of-scope column.

Example 31 includes a method for decoding an image, the method comprising extracting, by executing instructions with at least one processor, text from a purchase document image corresponding to an image of a purchase document, the purchase document image to include an indication of one or more products; identifying, by executing instructions with the at least one processor, a type of the purchase document to which the purchase document image corresponds; transmitting, by executing instructions with the at least one processor, the purchase document image to one of a first pipeline or a second pipeline based on the identification; extracting, by executing instructions with the at least one processor, purchase facts corresponding to ones of the one or more products; and decoding, by executing instructions with the at least one processor, the purchase document image by mapping the purchase facts against a products library to identify the one or more products.

Example 32 includes the method of example 31, wherein the extracting the text includes applying an optical character recognition (OCR) algorithm over the purchase document image.

Example 33 includes the method of any one of examples 31-32, wherein the purchase document image corresponds to a receipt, the method including applying the first pipeline by labeling words from the purchase document image that corresponds to ones of the purchase facts; identifying lines of the text within the purchase document image using the text and a first convolutional neural network; and grouping corresponding ones of the lines of the text within the purchase document image that correspond to a same purchased product.

Example 34 includes the method of any one of examples 31-33, wherein the ones of the purchase facts correspond to at least one of a product description of a first product, a quantity of the first product, a price of the first product, or a product code of the first product.

Example 35 includes the method of any one of examples 31-34, further including identifying a first line of the text that includes a first tag, the first tag corresponding to a first product description; identifying a second line of the text that is vertically adjacent the first line of the text; and in response to determining that the second line of the text includes a second tag that corresponds to at least one of a product description, a quantity, or a product code, grouping the first line of the text and the second line of the text as corresponding to the same product.

Example 36 includes the method of any one of examples 31-35, wherein the labeling includes applying a trained model to the purchase document image and to the text.

Example 37 includes the method of any one of examples 31-32, wherein the purchase document image corresponds to an invoice, the method including applying the second pipeline by applying a column detection model to the purchase document image to detect columns within a table of the purchase document image.

Example 38 includes the method of example 37, further including detecting rows within the detected columns; detecting cells at intersections of the detected rows and the detected columns; and detecting a first row of cells, the first row of cells corresponding to headers of the detected columns.

Example 39 includes the method of any one of examples 37-38, further including classifying the columns by classifying text within the first row cells.

Example 40 includes the method of any one of examples 37-39, wherein the classifying the columns includes classifying at least one of a product description column, a product code column, a quantity column, price column, or an out-of-scope column.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The invention claimed is:

1. An apparatus to decode an image comprising:
   interface circuitry to receive an image corresponding to a purchase document, the purchase document to include an indication of one or more products; and
   processor circuitry including one or more of:
      at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
      a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or
      Application Specific Integrated Circuitry (ASIC) including logic gate circuitry to perform one or more third operations;
   the processor circuitry to perform at least one of the first operations, the second operations, or the third operations to instantiate:
      fact extraction circuitry to obtain purchase facts from the image, the purchase facts corresponding to the one or more products indicated in the image, the fact extraction circuitry to:
         extract text from the image;
         determine a type of the purchase document to which the image corresponds;
         apply a first pipeline or a second pipeline to the image based on the type of the purchase document; and
         extract the purchase facts for ones of the one or more products in the image; and
      product mapper circuitry to map the extracted purchase facts against a library of products to identify the one or more products in the purchase document.

2. The apparatus of claim 1, wherein the processor circuitry is to perform at least one of the first operations, the second operations, or the third operations to instantiate the fact extraction circuitry to extract the text by applying an optical character recognition (OCR) algorithm over the image.

3. The apparatus of claim 1, wherein the image corresponds to a receipt, and wherein the processor circuitry is to perform at least one of the first operations, the second operations, or the third operations to apply the first pipeline by instantiating the fact extraction circuitry to:
   tag words from the text that correspond to first ones of the purchase facts;
   identify lines of text within the image using the text and a convolutional neural network (CNN); and
   group ones of the lines of text within the image that correspond to a same product.

4. The apparatus of claim 3, wherein the first ones of the purchase facts corresponds to at least one of a product description of a first product, a quantity of the first product, a price of the first product, or a product code of the first product.

5. The apparatus of claim 3, wherein the processor circuitry is to perform at least one of the first operations, the second operations, or the third operations to instantiate the fact extraction circuitry to group the ones of the lines of text that correspond to the same product by:
   identifying a first line of text that includes a first tag, the first tag corresponding to a first product description;
   identifying a second line of text that is vertically adjacent the first line of text; and
   in response to determining that the second line of text includes a second tag that corresponds to one of a first quantity, a first price, or a first product code, grouping the first line of text and the second line of text as corresponding to the same product.

6. The apparatus of claim 3, wherein the processor circuitry is to perform at least one of the first operations, the second operations, or the third operations to instantiate the fact extraction circuitry to tag the words that correspond to the first ones of the purchase facts by applying a trained model to the image and to the text.

7. The apparatus of claim 1, wherein the image corresponds to an invoice, and wherein the processor circuitry is to perform at least one of the first operations, the second operations, or the third operations to apply the second pipeline by instantiating the fact extraction circuitry to apply a column detection model to the image to detect columns within a table of the image.

8. The apparatus of claim 7, wherein the processor circuitry is to perform at least one of the first operations, the second operations, or the third operations to instantiate the fact extraction circuitry to:
   detect rows within the columns;
   detect cells at intersections of the rows and the columns; and
   identify a first row of cells, the first row of cells corresponding to headers of the columns.

9. The apparatus of claim 8, wherein the processor circuitry is to perform at least one of the first operations, the second operations, or the third operations to instantiate the fact extraction circuitry to classify the columns by classifying text within the first row of cells.

10. The apparatus of claim 9, wherein the classified columns include at least one of a product description column, a product code column, a quantity column, price column, or an out-of-scope column.

11. A non-transitory machine readable storage medium comprising instructions that, when executed, cause processor circuitry to at least:
   receive an image corresponding to a purchase document, the image to include a listing of purchased products;

extract text data from the image corresponding to the purchase document;

determine a type of the purchase document to which the image corresponds;

input the image into a receipt pipeline or an invoice pipeline based on the determination;

extract purchase facts corresponding to ones of the purchased products; and map the purchase facts corresponding to respective ones of the purchased products against a products library to identify the respective ones of the purchased products.

12. The non-transitory machine readable storage medium of claim 11, wherein the image corresponds to a receipt, and wherein the instructions, when executed, apply the receipt pipeline by causing the processor circuitry to:

tag words from the text data that correspond to ones of the purchase facts;

identify lines of text data within the image using the text data and a first convolutional neural network; and group corresponding ones of the lines of text data within the image that correspond to a same purchased product.

13. The non-transitory machine readable storage medium of claim 12, wherein the ones of the purchase facts include at least one of a product description of a first product, a quantity of the first product, a price of the first product, or a product code of the first product.

14. The non-transitory machine readable storage medium of claim 12, wherein the instructions, when executed, cause the processor circuitry to:

identify a first line of text data that includes a first tag, the first tag corresponding to a first product description;

identify a second line of text data that is vertically adjacent the first line of text data; and in response to determining that the second line of text data includes a second tag that corresponds to at least one of a quantity, a price, or a product, group the first line of text and the second line of text as corresponding to the same purchased product.

15. The non-transitory machine readable storage medium of claim 12, wherein the instructions, when executed, cause the processor circuitry to tag the words corresponding to the ones of the purchase facts by applying a trained model to the image and to the extracted text.

16. A method for decoding an image, the method comprising:

extracting, by executing instructions with at least one processor, text from a purchase document image corresponding to an image of a purchase document, the purchase document image to include an indication of one or more products;

identifying, by executing instructions with the at least one processor, a type of the purchase document to which the purchase document image corresponds;

transmitting, by executing instructions with the at least one processor, the purchase document image to one of a first pipeline or a second pipeline based on the identification;

extracting, by executing instructions with the at least one processor, purchase facts corresponding to ones of the one or more products; and decoding, by executing instructions with the at least one processor, the purchase document image by mapping the purchase facts against a products library to identify the one or more products.

17. The method of claim 16, wherein the purchase document image corresponds to a receipt, the method including applying the first pipeline by:

labeling words from the purchase document image that corresponds to ones of the purchase facts;

identifying lines of the text within the purchase document image using the text and a first convolutional neural network; and grouping corresponding ones of the lines of the text within the purchase document image that correspond to a same purchased product.

18. The method of claim 17, wherein the ones of the purchase facts correspond to at least one of a product description of a first product, a quantity of the first product, a price of the first product, or a product code of the first product.

19. The method of claim 17, further including:

identifying a first line of the text that includes a first tag, the first tag corresponding to a first product description;

identifying a second line of the text that is vertically adjacent the first line of the text; and in response to determining that the second line of the text includes a second tag that corresponds to at least one of a product description, a quantity, or a product code, grouping the first line of the text and the second line of the text as corresponding to the same purchased product.

20. The method of claim 17, wherein the labeling includes applying a trained model to the purchase document image and to the text.

\* \* \* \* \*